United States Patent [19]

Moritoki et al.

[11] Patent Number: 5,170,338
[45] Date of Patent: Dec. 8, 1992

[54] APPARATUS FOR CARRYING OUT SERIAL CONTROL AND METHOD OF CONTROLLING SAID APPARATUS

[75] Inventors: Masakazu Moritoki; Masao Hagiwara; Yukinori Katayama, all of Kanagawa, Japan

[73] Assignee: Kabushiki Kaisha Komatsu Seisakusho, Tokyo, Japan

[21] Appl. No.: 434,694

[22] PCT Filed: Feb. 28, 1989

[86] PCT No.: PCT/JP89/00209

§ 371 Date: Oct. 26, 1989

§ 102(e) Date: Oct. 26, 1989

[87] PCT Pub. No.: WO89/08362

PCT Pub. Date: Sep. 8, 1989

[30] Foreign Application Priority Data

Feb. 29, 1988 [JP] Japan .................. 63-44100
May 18, 1988 [JP] Japan ................ 63-121288
Dec. 2, 1988 [JP] Japan ................ 63-305583
Dec. 5, 1988 [JP] Japan ................ 63-307595

[51] Int. Cl.⁵ .................. G06F 15/46; G06F 13/37; G06F 11/00
[52] U.S. Cl. .................. 364/131; 364/138; 364/241.1; 364/940.5; 371/20.1; 371/20.6
[58] Field of Search .......... 364/131, 132, 140, 183, 364/200 MS File, 900 MS File, 138; 371/16.5, 20.6, 29.1, 55, 20.1; 370/13

[56] References Cited

U.S. PATENT DOCUMENTS 4,241,398 12/1980 Caril ........................ 371/33
4,451,898 5/1984 Palermo et al. .......... 364/900
4,468,791 8/1984 Masek ...................... 360/42
4,663,706 5/1987 Allen et al. ............. 364/200
4,907,227 3/1990 Unno ....................... 371/20.6
4,910,736 3/1990 Tanaka et al. .......... 371/37.7
4,914,654 4/1990 Matsuda et al. ......... 370/94.1
5,105,426 4/1992 Hagiwara ................ 371/20.1

OTHER PUBLICATIONS

IBM-Technical Disclosure Bulletin, "Fault Location In Serial Loop Data-Transmission Systems", C. E. Owen, vol. 15, No. 2, Jul. 1972.

Primary Examiner—Jerry Smith
Assistant Examiner—Paul Gordon
Attorney, Agent, or Firm—Vincent L. Ramik

[57] ABSTRACT

An apparatus for carrying out serial control and a method of controlling the apparatus wherein the apparatus and the method are employable for a centralized control system for various machinery such as press, machine tool, ship, aircraft or the like machine as well as a centralized control system for unmanned conveyor, unmanned warehouse or the like installation. The apparatus comprises a plurality of nodes connected in series one after another and a main controller connected to the nodes. A data row length of data included in a signal from the node at the preceding stage is counted by a data row length counter and the counted data row length is compared with data row length data included in the signal from the node at the preceding stage. When the counted data row length does not coincide with a data row length representative of the data row length data, this non-coincidence is determined as a data row length abnormality thereby to generate an error signal. The data row length data included in the signal from the node at the preceding stage is converted into data row length data corresponding to a row length of data outputted from own node and the converted data row length data are delivered to the node at the subsequent stage.

36 Claims, 37 Drawing Sheets

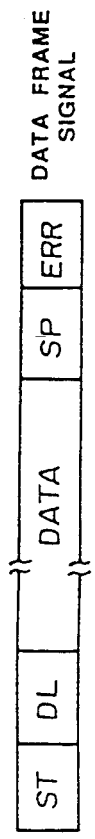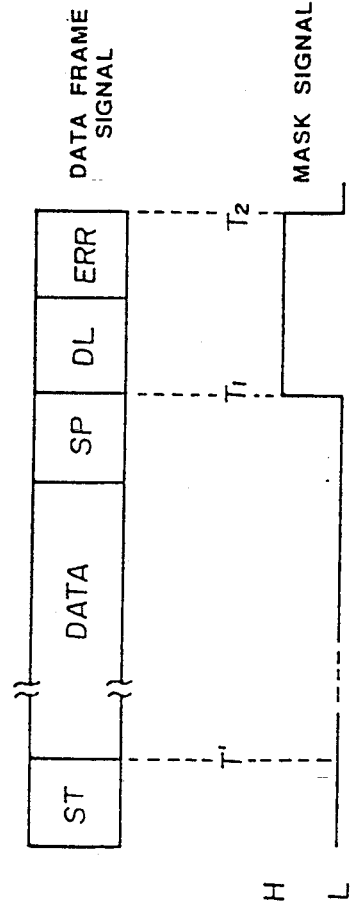
FIG. 33 (a)
FIG. 33 (b)
FIG. 34 (a)
FIG. 34 (b)

FIG.41 (a)
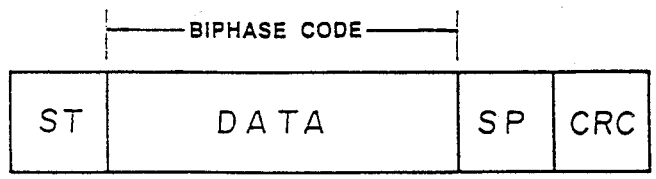
FIG.41 (b)
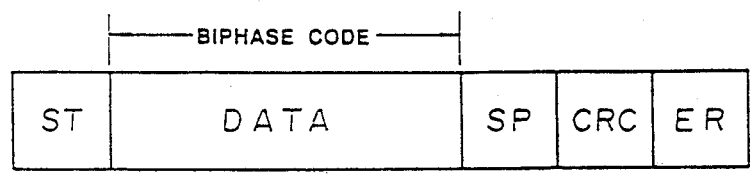
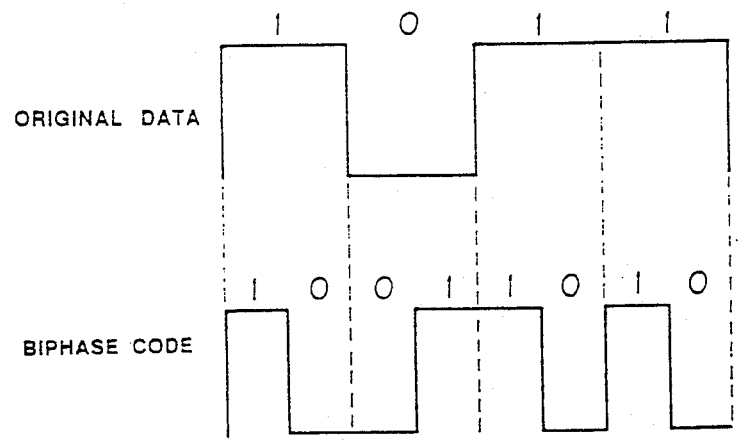
FIG.42

APPARATUS FOR CARRYING OUT SERIAL CONTROL AND METHOD OF CONTROLLING SAID APPARATUS

TECHNICAL FIELD

The present invention relates to an apparatus for carrying out serial control and a method of controlling the method wherein the apparatus and the method are preferably employable for a centralized control system for various machinery such as press, machine tool, construction machine, ship, aircraft or the like machine as well as a centralized control system for unmanned conveyor, unmanned warehouse or the like installation.

BACKGROUND ART

A number of sensors for detecting an operative state of each location in an installation such as press, machine tool, construction machine, ship, aircraft, unmanned conveyor, unmanned warehouse or the like as well as a number of actuators for controlling an operative state of each location in the above-described installation are required to centrally control the installation. For example, in the case of a press, more than 3,000 sensors and actuators are required. With respect to other installations, much more sensors and actuators will be required.

Hitherto, a centralized control system for centrally control this kind of installation is constructed such that a number of sensors and a number of actuators are connected to a main controller which receives outputs from the sensors and then controls the actuators in response to signals from the main controller.

With such conventional centralized control system, when the number of sensors and the number of actuators become very large, the result is that the number of conductors extending between the main controller and the sensors/actuators becomes very large and input-/output sections in the main controller become very complicated in structure.

In view of the aforementioned fact, there has been made such a proposal that a plurality of nodes are connected in series one after another, one or plural sensors and one or plural actuators are connected to each node and these nodes are annularly connected to each other via a main controller to control each node in response to a signal from the main controller. In the case of this proposal, basically, the main controller requires only signal input conductors and signal output conductors and also each node requires only signal input conductors and signal output conductors. Consequently, the number of required conductors can be reduced remarkably.

However, in the case where the nodes are connected to each other in series in the above-described manner, there arises a problem in respect of how concurrence of receiving an output from each sensor and concurrence of controlling each actuator are assured for each node. For example, in the case where an address is allocated to each node which in turn is controlled based on this address, there arises another problem that time delay occurs due to a necessity for address processing. Therefore, the aforementioned proposal fails to assure satisfactory concurrence in relation to receiving of an output from each sensor and controlling of each actuator.

For the reason, the inventors have abandoned the above-described technical concept that a plurality of nodes are connected to each other in series and a certain address is allocated to each node. Instead of this technical concept, they have proposed a new approach to an apparatus for carrying out serial control wherein the respective nodes are distinguished from each other in accordance with an order of connecting the nodes to each other with the result that any address processing is not required, time delay accompanied by such address processing does not occur and each node can substantially be simplified in structure.

According to this proposal, each node is constructed such that a signal from each actuator is successively added to a signal from the node at the preceding stage in accordance with a predetermined rule and then a predetermined signal is successively subtracted from the signal from the node at the preceding stage in accordance with another predetermined rule to output the resultant signal to another actuator. In this case, no address is required for each node and thereby no address processing is required. Consequently, time delay appearing at each node can be minimized to such an extent that timing only is controlled correctly. Moreover, each node can substantially be simplified in structure.

In the case of the aforementioned proposal, the respective nodes and the main controller make a determination with reference to an order of signals (positions assumed by data among a number of data) as to from which node a certain signal (data) is received or to which node the signal (data) should be sent. However, if an error is caused by addition or removal of a signal at each node, the main controller can not make a determination as to from which node the signal is received and to which node it should be sent. Consequently, the apparatus becomes inoperative in control. Sometimes, there is a danger that the apparatus runs recklessly.

As will be apparent from the above description, with the conventional apparatus, when an error is caused by addition or removal of a signal, i.e., when incorrect bit addition or incorrect bit removal occurs, the resultant incorrect signal is transmitted to the node at the subsequent stage and the main controller, whereby the node at the subsequent stage and the main controller do not operate correctly. In an extreme case, the apparatus may run recklessly. Such a problem becomes remarkable particularly in a case where any address is not allocated to each node but the respective nodes are distinguished from each other in accordance with an order of connection of the nodes.

Thus, the present invention has been made with the foregoing background in mind and its object resides in providing an apparatus for carrying out serial control which assures that a data row length abnormality due to incorrect bit removal or bit addition at each node can be detected reliably and incorrect operation and reckless running of an associated apparatus or installation to be controlled can be prevented without fail.

DISCLOSURE OF THE INVENTION

According to the present invention, data row length data representing a data row length of data to be received at each node, i.e. data row length data representing a data row length of data from the node at the preceding stage are given to each node. This node detects a data row length abnormality based on the given data row length data.

Specifically, the present invention provides an apparatus for carrying out serial control, the apparatus including a plurality of nodes which are connected in series one after another, each of the nodes having one or plural terminals connected thereto, each node being such that a signal from the terminals connected to own node is added to data included in a signal from the node at the preceding stage and a signal to the terminals connected to own node is then removed thereby to send the resultant signal to the node at the subsequent stage, wherein the signal from the node at the preceding stage includes data row length data representing a row length of data included in the signal, and each node includes counting means for counting a data row length of data included in the signal from the node at the preceding stage, comparing means for comparing a counted value counted by the counting means with the data row length data, the comparing means generating an error signal when it is found that the counted value counted by the counting means does not coincide with a data row length represented by the data row length data, and data row length data converting means for converting the data row length data included in the signal from the node at the preceding node into data row length data corresponding to a data row length of data outputted from own node, the data row length data converting means being such that the thus converted data row length data are delivered to the node at the subsequent stage while they are included in a signal to be sent to the node at the subsequent stage.

Further, the present invention provides an apparatus for carrying out serial control, the apparatus including a plurality of nodes which are connected in series one after another, the nodes being connected to a main controller, each of the nodes having one or plural terminals connected thereto, each node being such that a signal from the terminals connected to own node is added to data included in a signal from the node at the preceding stage and a signal to the terminal connected to own node is removed from the data thereby to send the resultant signal to the node at the subsequent stage, wherein the apparatus includes distributing means for distributing data row length data corresponding to a data row length outputted from each node, to each node from the main controller, counting means disposed at each node for counting a data row length included in a signal from the node at the preceding stage and comparing means for comparing an output from the counting means with the data row length data distributed by the distributing means, the comparing means generating an error signal when it is found that the counted value counted by the counting means does not coincide with a data row length represented by the data row length data.

A data row length of data in a signal from the node at the preceding stage is counted by the counting means and the data length counted by the counting means is compared with the data row length data of data in the signal from the node at the preceding stage. If it is found that the data row length counted by the counting means does not coincide with the data row length represented by the data row length data, this non-coincidence is determined as a data row length abnormality thereby to generate an error signal. The data row length data included in the signal from the node at the preceding stage is converted into data row length data corresponding to data outputted from own node, whereby the resultant data row length data are delivered to the node at the subsequent stage while they are included in a signal to be sent to the node at the subsequent stage.

Data row length data corresponding to each node representing a data row length of data included in the signal from the node at the preceding stage are delivered from the main controller to each node by the distributing means. The distributed data row length data are transmitted to each node using, e.g., signals each having a sub-frame structure different from signals, each having a main frame structure. The data row length of the data included in the signal from the node at the preceding stage are counted by the counting means and the data row length counted by the counting means is compared with the data row length data distributed by the distributing means. If it is found that the data row length data counted by the counting means do not coincide with the data row length represented by the data row length data, this non-coincidence is determined as a data row length abnormality thereby to generate an error signal.

BRIEF DESCRIPTION OF THE DRAWINGS

The present invention is illustrated in the following drawings in which;

FIGS. 2(a)-3(f) show a plurality of timing charts, respectively, which illustrate by way of example operations to be performed by the apparatus.

FIGS. 5(a)-8(m) show a plurality of timing charts, respectively, which illustrate operations to be performed at the node shown in FIG. 4.

FIGS. 10(a)-13e show a plurality of timing charts, respectively, which illustrate operations to be performed at the node shown in FIG. 9.

FIGS. 17(a)-20-(o) show a plurality of timing charts, respectively, which illustrate operations to be performed at the node shown in FIG. 16.

FIGS. 22a-23(v) show a plurality of timing charts, respectively, which illustrate operations to be performed at the node shown in FIG. 21.

FIGS. 25(a)-27(j) show a plurality of timing charts, respectively, which illustrate operations to be performed at the node shown in FIG. 24.

FIGS. 31(a)-32(d) show a plurality of timing charts, respectively, which illustrate operations to be performed at the node shown in FIG. 30.

FIGS. 33(a) and 33(b) show timing charts which schematically illustrate a relationship of a data frame signal to a mask signal for the apparatus in accordance with the embodiment shown in FIG. 30.

FIGS. 34(a) and 34(b) show timing charts which schematically illustrate a relationship of a data frame signal to a mask signal for the apparatus in accordance with the embodiment shown in FIG. 30.

FIGS. 41(a) and 41(b) show explanatory views which schematically illustrate the structure of a frame representing a data frame signal.

FIG. 42 shows explanatory views which schematically illustrate a relationship of original data to a biphase code for the apparatus in accordance with the embodiment shown in FIG. 40.

BEST MODE FOR CARRYING OUT THE INVENTION

Now, the present invention will be described in detail hereinafter with reference to the accompanying drawings which illustrate a plurality of preferred embodiments thereof.

Figure 1:
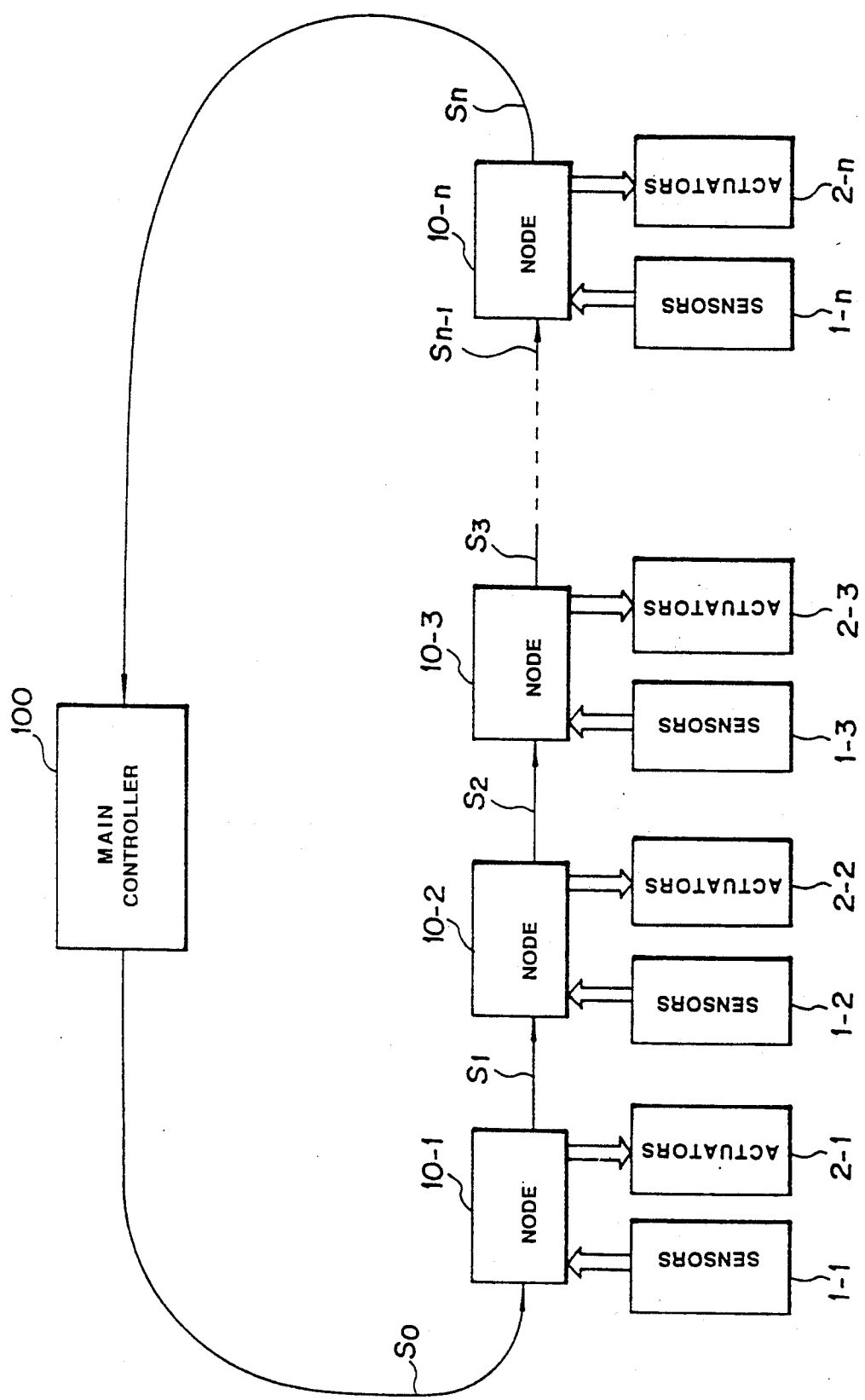
FIG. 1 is a block diagram which schematically illustrates the whole structure of an apparatus for carrying out serial control according to the present invention.

FIG. 1 is an explanatory view which schematically illustrating an apparatus for carrying out serial control in accordance with an embodiment of the present invention. The apparatus in accordance with this embodiment is preferably employable for a centralized control system for, e.g., a press. The apparatus includes a main controller 100 which is installed in a controller section for the press. As is apparent from the drawing, the main controller 100 is connected, via a number of nodes which will be described in more details later, to plural group of sensors 1-1 to 1-n corresponding to a plurality of sensors each detecting an operative state of respective section in the press and plural group of actuators 2-1 to 2-n corresponding to a plurality of actuators each driving the respective section in the press. The group of sensors 1-1 and the group of actuators 2-1 are connected to a node 10-1, the group of sensors 1-2 and the group of actuators 2-2 are connected to a node 10-2 and the group of sensors 1-3 and the group of actuators 2-3 are connected to a node 10-3. Similarly, the group of sensors 1-n and the group of actuators 2-n are connected to a node 10-n. It should be noted that the nodes 10-1 to 10-n are connected in series one after another via the main controller 100.

The main controller 100 receives a number of output signals from the group of sensors 1-1 to 1-n connected to the nodes 10-1 to 10-n and outputs a number of signals for driving the group of actuators 2-1 to 2-n connected to the nodes 10-1 to 10-n.

Figure 2:
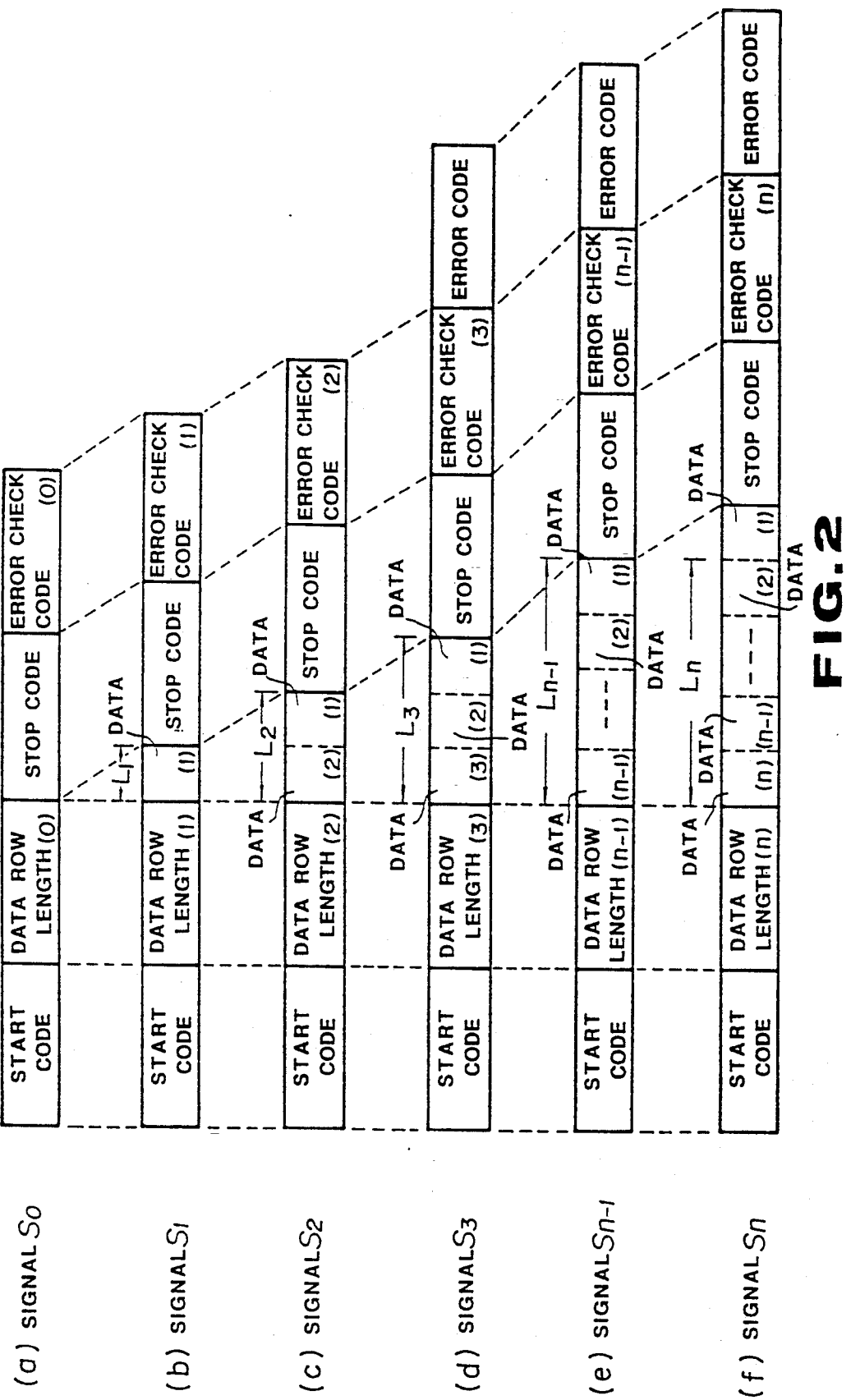

Next, description will be made below with reference to FIG. 2 as to an operation of receiving output signals outputted from the group of sensors 1-1 to 1-n in response to signals from the main controller 100. During this operation, no signal is outputted to the group of actuators 2-1 to 2-n from the nodes 10-1 to 10-n.

First, the main controller 100 outputs a signal $S_0$ having a frame structure as shown in FIG. 2(a) Specifically, the main controller 100 sends the signal $S_0$ having the shown frame structure comprising a start code located in the first place, data row length data (0) representative of a length of data included in the signal So (in the shown case, since no data is included in the signal $S_0$, the data length is zero), a stop code and an error check code for checking any error relative to the data included in the signal $S_0$. These codes are arranged in such an order as shown in FIG. 2(a). Here, the error check code is provided in the form of a code for carrying out a well-known circular redunduncy check (hereinafter referred to as CRC) or a hitherto known parity inspection for the purpose of detecting a data error. The signal $S_0$ from the main controller 100 is added to the node 10-1.

The node 10-1 is such that signals inputted thereinto in parallel from the group of sensors 1-1 is converted into serial signals in a predetermined order immediately after data row length data in the signal $S_0$ are inputted, the converted signals are inserted therein as data (1) and they are then converted into data row length data (1) representative of a data row length $L_1$ of the inserted data (1), whereby the converted data (1) are outputted as a signal S1 (see FIG. 2(b)). Then, a new error check code (1) is created on the basis of the data (1) inserted in the node 10-1 so that the error check code (1) is outputted in place of the error check code (0).

The node 10-1 includes means for counting a data row length of the data included in the signal $S_0$. The main controller 100 compares the counted data row length with with a data row length representative of the data row length data (0) included in the signal $S_0$ to detect whether a data row length abnormality occurs or not. Further, the main controller 100 inspects whether a data error is present or not, on the basis of an error check code (0) included in the signal $S_0$. If the main controller 100 detects a data row length abnormality or a data error on the basis of the error check code (0), an error code indicative of an occurrence of the error is additionally provided behind the error check code (1). It should be noted that the illustrated embodiment represents a case where no error code is added on the assumption that data abnormality and data error are not detected. Signals outputted from the node 10-1 are added to the node 10-2.

The node 10-2 is such that signals, (data (2)) outputted from the group of sensors 1-2 are inserted therein immediately after the data row length data (1) included in the signal $S_1$ are outputted, the data row length data (1) are converted into data row length data (2) corresponding to a data row length $L_2$ of data which have varied by insertion of the data (2), a new error check code (2) is created based on new data with the converted data (2) inserted therein and then this error check code (2) is substituted for the error check code (1), whereby the error check code (2) is outputted as a signal $S_2$ (see FIG. 2(c)). Also with the node 10-2, a data row length abnormality is checked based on the data row length data (1) and moreover a data error is checked based on the error check code (1) in the same way as with the node 10-1. In the shown case, however, since any data row length abnormality and any data error are not detected, no error code is added to the node 10-2. The signals $S_2$ outputted from the node 10-2 are inputted into the node 10-3.

Like the node 10-2, the node 10-3 is such that signals (data (s)) outputted from the group of sensors 1-3 are inserted therein immediately after data row length data (2) included in the signals $S_2$ are outputted, the inserted signals are converted into a data row length data (3) corresponding to a data row length $L_3$ of data which have varied by insertion of the data row, length data (2) and a new error check code (3) is then created based on new data with the data row length data (3) inserted therein, whereby this error check code (3) is substituted for the error check code (2). With the node 10-3, however, it is assumed that a data row length abnormality or a data error is detected by checking any data row length abnormality with reference to the data row length data (2) or by checking any data error based on the error check code (2). In this case, an error code is added immediately after the created new error check code (3) is inputted into the node 10-3. FIG. 2(d) shows a signal $S_3$ to be outputted from the node 10-3 in the above-described manner. Once the error code is added, subsequent nodes 10-4 (not shown) to 10-n are added with such error code, respectively, irrespective of whether a data row length abnormality or a data error is detected or not.

The node 10-n-1 (not shown) is such that a signal outputted from the node 10-n-1, i.e., a signal to be inputted into the node n becomes a signal $S_{n-1}$ in which data (n-1) are inserted so that the data row length data become data row length data (n-1) and the error check code becomes an error check code (n-1), as shown in FIG. 2(e).

The node 10-n is added with data (n) from the group of sensors 1-n, the data row length data (n-1) are converted into data row length data (n) and an, error check code (n) is substituted for the error check code (n-1), whereby a signal $S_n$ shown in FIG. 2(f) is outputted from the node 10-n. This signal $S_n$ is inputted into the main controller 100.

The main controller 100 makes a determination on the basis of an order of data arrangement in a data region extending from the rear end of the data row length data (n) included in the signal $S_n$ to the fore end of a stop code, as to from which node having a group of sensors connected thereto the data row length data (n) are derived. Thus, the main controller 100 can receive signals from the group of sensors 1-1 to 1-n which are connected to the respective nodes 10-1 to 10-n.

In addition, since the signal $S_n$ is added with an error code, the main controller 100 can know in which node among the nodes 10-1 to 10-n a data row length abnormality or a data error occurs. Thus, when any data row length abnormality or any data error does not occur in any one of the nodes 10-1 to 10-n, the signal $S_n$ is not added with an error code. In this case, the main controller 100 can receive data, without any trouble, from the group of sensors 1-1 to 1-n which are connected to the respective nodes 10-1 to 10-n.

Figure 3:
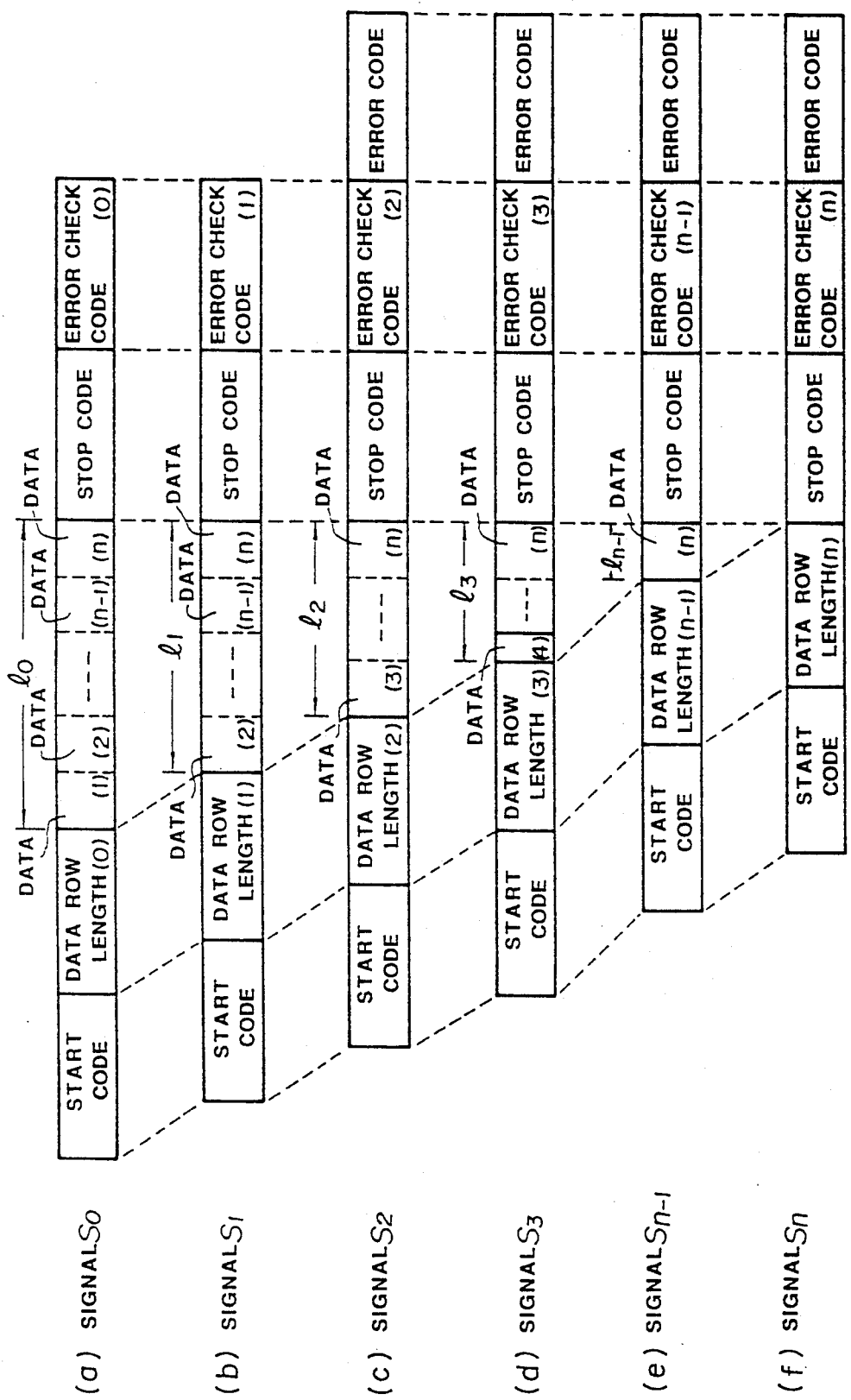

FIG. 3 shows a plurality of timing charts which illustrate operations of the main controller 100 in case where driving data are delivered to the group of actuators 2-1 to 2-n connected to the respective nodes 10-1 to 10-n. In this case, operations of the main controller 100 will be described on the assumption that signals from the group of sensors 1-1 to 1-n are not inputted into the respective nodes 10-1 to 10-n.

First, the main controller 100 outputs a signal $S_0$ as shown in FIG. 3(a). This signal $S_0$ assumes a frame structure comprising a start code placed in the first place, data row length data (0), a data region including data (n) to be delivered to the group of actuators 2-n connected to the node 10-n, data (n-1) to be delivered to the group of actuators 2-n-1 connected to the node 10-n-1,—, data (2) to be delivered to the group of actuators 2-2 connected to the node 10-2 and data (1) to be delivered to the group of actuators 2-1 connected to the node 10-1, a stop code and an error check code (0). These codes included in the signal $S_0$ are arranged in such an order as shown in FIG. 3(a). The signal $S_0$ is added to the node 10-1.

At the node 10-1, the data (1) to be delivered to the group of actuators 2-1 are extracted from the rear end of the data region in the signal $S_o$ and they are then converted into parallel signals which in turn are outputted to each actuator in the group of actuators 2-1. In addition, at the node 10-1, the data row length data (0) are converted into data row length data (1) corresponding to a data row length $l_1$ covering the remaining data derived from removal of the data (1), and an error check code (1) derived in correspondence to the remaining data with the date (1) removed from the data region is substituted for the error check code (0). The resultant signal is outputted from the node 10-1 as a signal $S_1$ (see FIG. 3(B)). The main controller 100 checks a data row length abnormality by comparing the actually counted data row length with the data row length data (0) included in the signal $S_0$ at the node 10-1 and moreover checks a data error based on the error check code (1). In case where the main controller 100 detects some abnormality by the above-described checking, an error code is additionally provided just behind the error check code (1). In case where no abnormality is detected, however, any error code is not provided additionally.

At the node 10-2, data to be delivered to the group of actuators 2-2 are extracted from the rear end of the data region in the signal $S_1$. Then, the data row length data (1) are converted into data row length data (2) corresponding to the remaining data row length $l_2$ derived from the foregoing data extraction and an error check code (2) corresponding to the remaining data after the data extraction is then substituted for the error check code (1). Thereafter, data at the rear end of the data region are successively extracted at the respective nodes in the same manner as mentioned above (see FIGS. 3(c) to (f)).

In the shown example, since a data row length abnormality or a data error occurs at the node 10-2, an error code is additionally provided just behind the error check code (2) substituted in the above-described manner. In case where a data row length abnormality or a data error occurs for some reason, the extracted data to be delivered to the group of actuators 2-2 are not added to each actuator among the group of actuators 2-2 so as to prevent the respective actuators from being operated incorrectly. Once an error code is added, outputting of the extracted data is inhibited at any one of the subsequent nodes 10-3 to 10-n because of the error code.

The signal $S_n$ outputted from the node 10-n (see FIG. 3(f)) is introduced into the main controller 100. Thus, the main controller 100 can know via the presence or absence of the error code whether or not an abnormality occurs at the respective nodes. In case where any data row length abnormality or any abnormality does not occur at the respective nodes 10-1 to 10-n, data corresponding to the group of actuators connected to the nodes 10-1 to 10-n are successively extracted from the data region and the extracted data are converted into parallel signals by latching them in an adequate timing relationship. Then, they are fed to each actuator among the corresponding group of actuators.

The present invention has been described above as to a case where a group of sensors and a group of actuators are connected to the respective nodes. Alternatively, only the group of sensors may be connected to the nodes or only the group of actuators may be connected to the nodes. Further, the group of sensors may comprise a single sensor or the group of actuators may comprise a single actuator.

The present invention has been described above as to a case where new data are inserted just behind the data row length data, i.e., at the fore end of the data region so that the main controller 100 receives data from the group of sensors 1-1 to 1-n. Alternatively, new data may be inserted at the rear end of the data region.

Further, the present invention has been described above as to a case where data are successively extracted and outputted from the rear end of the data region so that they are outputted to the group of actuators 2-1 to 2-n. Alternatively, data may successively be extracted from the fore end of the data region.

To facilitate understanding of the present invention, the present invention has been separately described as to a case where the main controller 10 receives data from the group of sensors 1-1 to 1-n and a case where the main controller 100 receives date from the group of actuators 2-1 to 2-n. Alternatively, it is possible to carry out control in such a manner that the main controllers 100 receives data from the group of sensors and outputs them to the group of actuators. Such a type of control will be described in more details later.

Figure 4:
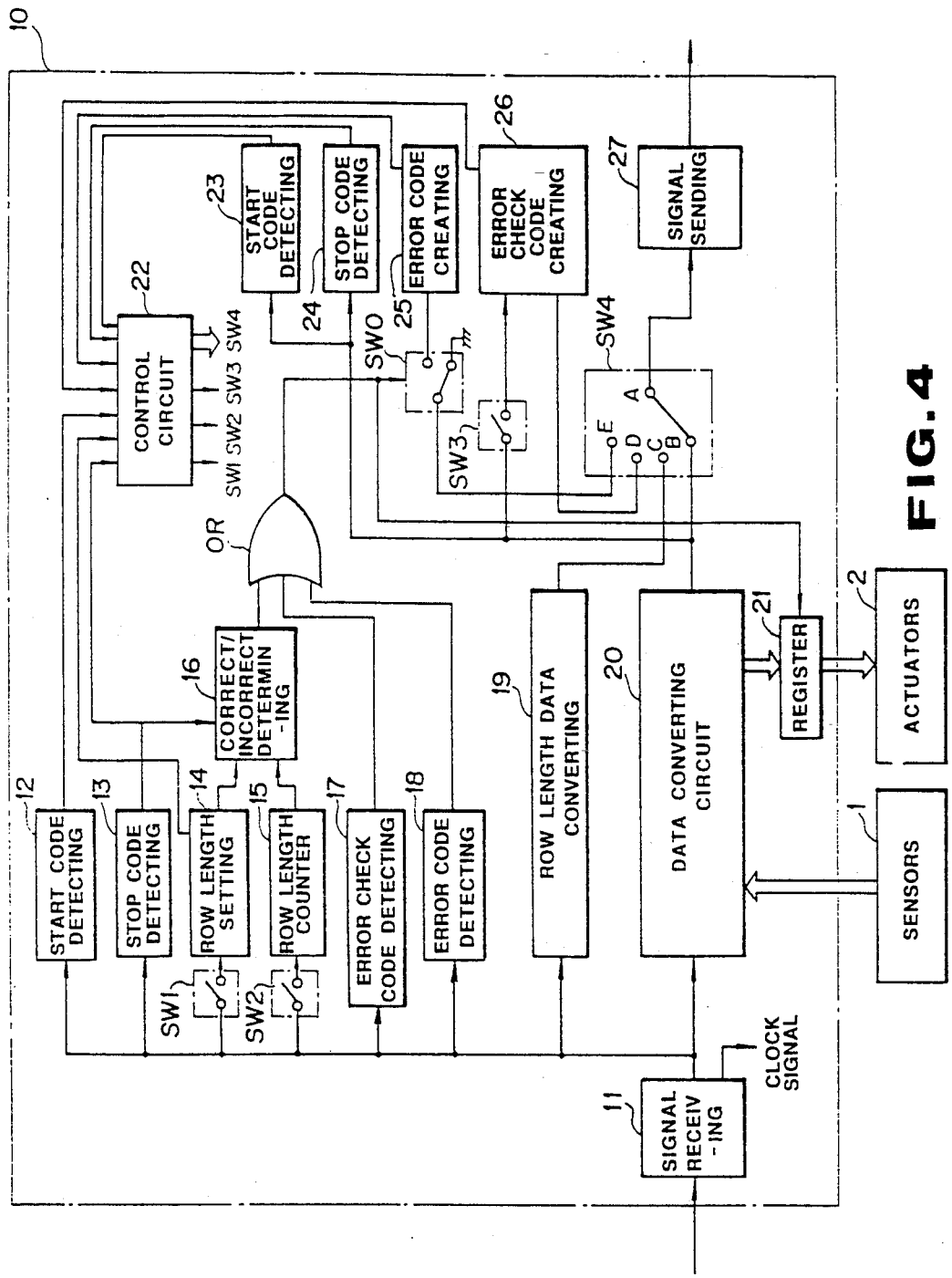
FIG. 4 is a block diagram which schematically illustrates by way of example the structure of a node for the apparatus in accordance with an embodiment of the present invention.

FIG. 4 is a block diagram which schematically illustrates by way of example a detailed structure of the nodes 10-1 to 10-n shown in FIG. 1. Since the nodes 10-1 to 10-n are identical to each other in structure, a single node 10 is typically shown in FIG. 4 instead of the group of nodes 10-1 to 10-n.

Here, a group of sensors 1 corresponds to any one of the group of sensors 1-1 to 1-n shown in FIG. 1, while a group of actuators 2 corresponds to any one of the group of actuators 1-1 to 2-n in FIG. 1. It should be noted that in this embodiment, data transmission between respective nodes 10 is executed using a coded mark inversion code (hereinafter referred to as a CMI code). This is intended to reduce transmission error attributable to noise or the like during a step of transmission as far as possible and make it possible to regenerate (extract) clock signal at each node. In this case, it is unnecessary that each node is provided with a clock generator and thereby structure of each node can be simplified further. In this embodiment, data inputted from the group of sensors 1 at each node are added to the fore end of a data region including data transmitted from the node at the preceding stage and data to be outputted to the group of actuators 2 among the transmitted data are extracted from the rear end of the data region including the transmitted data and then transmitted to the final node. Thus, data (in the form of a input signal) transmitted from the node at the preceding stage are arranged in a frame structure as shown in FIG. 5(a). Here, data row length data represent a data row length L included in the input signal. An error code is added in case where an error signal is generated at any one of nodes located before the preceding stage, and no error is added in case where no error signal is generated at any one of the nodes before the preceding stage.

Referring to FIG. 4, a signal receiving circuit 11 receives signals from the node at the preceding stage. Since signals from the node at the preceding stage are modulated using the CMI code as mentioned above, the signal receiving circuit 11 remodulates the CMI code to a non return zero code corresponding to ordinary "1" and "0". The signal receiving circuit 11 regenerates clock signals from the input signals which have been modulated to the CMI code, in synchronization with the transmitted data to be used at the node 10.

The input signal remodulated in the signal receiving circuit 11 is added to a start code detecting circuit 12, a stop code detecting circuit 13, an error check code inspecting circuit 17, an error code detecting circuit 18, a data row length data converting circuit 19 and a data converting circuit 20 and moreover it is added to a data row length setting circuit 14 and a data row length counter 15 via switches SW1 and SW2.

In detail, the start code detecting circuit 12 detects a start code (representing a start code on the input side) included in the input signal. The start code to be used is provided, e.g., in the form of a 8 bit digital code signal having a predetermined pattern. The stop code detecting circuit 13 detects a stop code included in the input signal. The stop code is provided, e.g., in the form of a 8-bit digital code signal having a predetermined pattern different from that of the aforementioned start code.

The data row length setting circuit 14 reads data row length data included in the input signal and sets a data row length to be used for the purpose of inspecting a data row length abnormality relative to data included in the input signal. The data row length data are provided, e.g., in the form of a 8-bit binary code. The data row length setting circuit 14 outputs a data row length data reading completion signal on completion of reading of the data row length data, i.e., after a period of time equivalent to 8 bits corresponding to the data row length data elapses from the start of reading of the data row length data.

The data row length counter 15 counts a data row length of data included in the input signal to count an actual data row length of the data included in the input signal. Counting of the actual data row length is performed by counting clock signals in synchronization with input data outputted from the signal receiving circuit 11.

The error check code inspecting circuit 17 detects a transmitted data code error by inspecting the error check code included in the input signal. The error check code is provided for the purpose of executing the circular redundancy check or the patch check as mentioned above.

Figure 5:
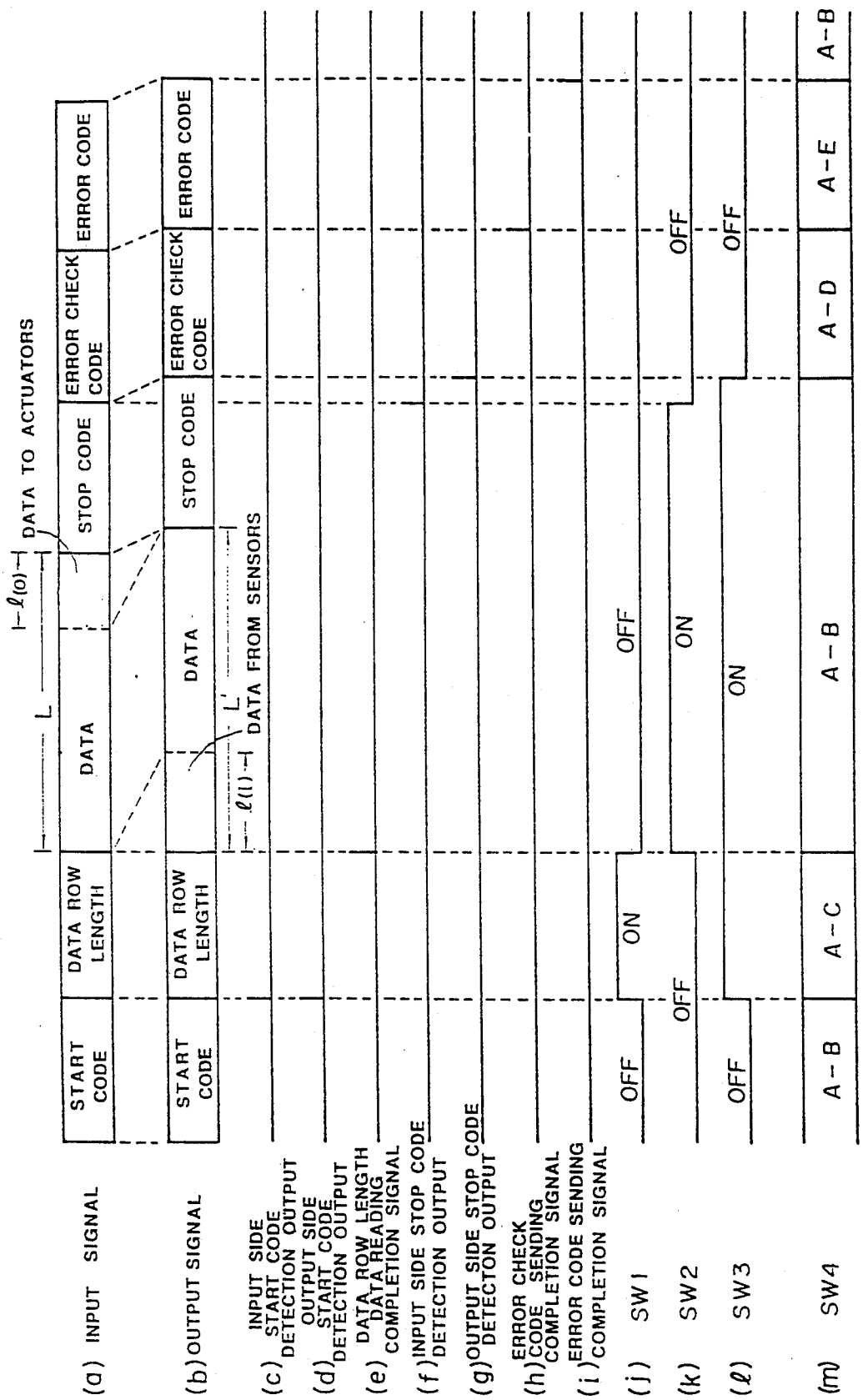

The error code detecting circuit 18 detects whether an error code is included in the input signal or not. When a date row length abnormality or a code error is detected at any one of the nodes before the preceding stage, the error code is added at the detected node and then it is transmitted to the nodes at the respective subsequent stages as it is. In response to transmission of the error code, the error code detecting circuit 18 detects whether the error code is added to or not. Here, the error code is provided, e.g., in the form of a 8-bit code signal having a predetermined pattern different from that of the start code and the stop code. The data row length data converting circuit 19 converts data row length data from the node at the preceding stage included in the input signal into data row length data corresponding to a data row length of data generated in the node 10. For example, when it is assumed that a data row length of data included in an input signal inputted from the node at the preceding stage is represented by L bits and a data row length of data included in an output signal outputted to the node at the subsequent stage is represented by L' bits, as shown in FIGS. 5 (a) and (b), the data row length data converting circuit 19 converts data row length data indicative of the data row length L bit into data row length data indicative of the data row length L'. An output from the data row length data converting circuit 19 is added to a contact C of a switch SW4.

The data converting circuit 20 performs such a processing that parallel signals from a group of sensors 1 in a data region included in the input signal are converted into serial signals in a predetermined order and added thereto, data to be delivered to a group of actuators 2 from the data region included in the input signal are extracted from the data included in the input signal and the extracted serial data are converted into parallel signals and delivered to the group of actuators 2 via a register 21.

A data row length set in the data row length setting circuit 14 and a data row length counted in the data row length counter 15 are added to a data row length correct/incorrect determining circuit 16.

The data row length correct/incorrect determining circuit 16 compares the data row length set in the data row length setting circuit 15 with the actual data row length counted in the data row length counter 15 based on a timing of outputting from the stop code detecting circuit 13. If the both data row lengths do not coincide with each other, the data row length correct/incorrect determining circuit 16 detects them as a data row length abnormality.

An output from the data row length correct/incorrect determining circuit 16, an output from the error check code inspecting circuit 17 and an output from the error code detecting circuit 18 are added to a switch SW0 via an OR circuit OR.

In case where a data row length abnormality is detected by the data row length correct/incorrect determining circuit 16 when an output from the OR circuit OR is at a high level, i.e., when an output from any one of the data row length correct/incorrect determining circuit 16, the error check code inspecting circuit 17 and the error code detecting circuit 18 is at a high level or in case where a code error is detected by the error check code detecting circuit 17 or in case where an error code is detected by the error code detecting circuit 18, the switch SW0 is shifted from the shown state, whereby a predetermined error code generated in the error code generating circuit 25 is added to a contact of the switch SW4. However, in case where an output from each of the data row length correct/incorrect determining circuit 16, the error check code inspecting circuit 17 and the error code detecting circuit 18 is at a low level, the switch SW0 fails to be shifted from the shown state, whereby a low level signal is added to a contact E of the switch SW4. On completion of creation of an error code, the error code generating circuit 25 outputs an error code sending completion signal.

An output from the data converting circuit 20 is added to a contact B of the Switch SW4. Further, it is added to a start code detecting circuit 23 and a stop code detecting circuit 24. Additionally, it is added to an error check code generating circuit 26 via a switch SW3.

The start code detecting circuit 23 detects a start code (representative of a start code on the output side) outputted from the data converting circuit 20 and the stop code detecting circuit 24 detects a stop code outputted from the data converting circuit 20.

The error check code generating circuit 26 is such that converted data outputted from the data converting circuit 20 are inputted therein and an error check code for the purpose of executing the circular redundancy check or the parity check is created based on the converted data. On completion of sending of the error check code, the error check code generating circuit 20 outputs an error check code sending completion signal.

The switch SW4 selects any one of an output from the data converting circuit 20 to be added to the contact B, an output from the data row length data converting circuit 19 to be added to the contact C, an output from the error check code creating circuit 26 to be added to the contact D and an output from the switch SW0 to be added to the contact E. An output from the switch SW0, i.e., a signal from the contact A is added to the signal sending circuit 27. The signal sending circuit 27 performs a predetermined modulating processing for converting the added signal into a CMI code and outputs the modulated signal to the node at the next stage.

In addition, an input side start code detection output outputted from the start code detecting circuit 12, an input side stop code detection output outputted from the stop code detecting circuit 13, a data row length reading completion signal outputted from the data row length setting circuit 14, an output side start code detection output from the start code detecting circuit 23 and an output side stop code detection output outputted from the stop code detecting circuit 24 are added to a control circuit 22.

The control circuit 22 controls a switch timing of the switches SW1, SW2, SW3 and SW4.

Now, operations of the node 10 will be described below as to a case where a data row length l(i) bits to be added to the data converting circuit 20 is longer than a data row length l(o) bits to be extracted, i.e.,(l(i)>l(o)). Operations to be performed in this case are represented by a plurality of timing charts shown in FIG. 5.

In this case, the start code of an input signal received in the signal receiving circuit 11 (see FIG. 5(a)) passes through the data converting circuit 20 as it is so that it is added to the switch SW4. At this moment, since the switch SW4 is held in such a state that the contact A is connected to the contact B, i.e., a state (A-B) (see FIG. 5(m)), the start code which has passed through the data converting circuit 20 passes past the switch SW4 so that it is outputted to the node at the next stage via a signal sensing circuit 27 (see FIG. 5(b)).

The start code of the input signal is detected in the start code detecting circuit 12 and an input side start code detection output is generated from the start code detecting circuit 12 (see FIG. 5(c)). The control circuit 22 permits the switch SW1 to be shifted from ON to OFF in response to the input side start code detection output (see FIG. 5(j)).

When the switch SW1 is shifted to ON, the data row length data setting circuit 14 starts reading of the data row length data included in the input signal.

The start code detecting circuit 23 detects a start code from the output of the data converting circuit 20 to generate an output side start code detection output (see FIG. 5(b)). Then, the control circuit 22 causes the switch SW3 to be shifted to ON in response to the output side start code detection output (see FIG. 5(e)). When the switch SW3 is shifted to ON, an output from the data converting circuit 20 is added to the error check code creating circuit 26. The error check code creating circuit 26 creates a required error check code in response to the output from the data converting circuit 20. In response to the output side start code detection output, the control circuit 22 allows the switch SW4 to be shifted from the aforementioned state (A-B) to a state (A-C) in which the contact A is connected to the contact C (see FIG. 5(m)). This causes an output from the data row length data converting circuit 19 to appear at the contact A of the switch SW4. Here, an output from the data row length data converting circuit 19 becomes data row length data corresponding to the whole data row length (L+l(i)-l(o)) bits which have varied due to addition of data represented by the data row length (i) bits and removal of data represented by the data row length l(o) bits. This data row length data are outputted from the signal sending circuit 27 subsequent to the start code (see FIG. 5(b)).

When reading of the data row length data in the data row length data setting circuit 14 is completed and a data row length data reading completion signal is generated (see FIG. 5(e)), the control circuit 22 is operated such that the switch SW1 is shifted to OFF (see FIG. 5(i)) and at the same time the switch SW2 is shifted to ON (see FIG. 5(k)). When the switch SW2 is shifted to ON, the data row length counter 15 starts a counting operation. Specifically, the data row length counter 15 counts a data row length in the data region included in the input signal, i.e., the number of bits by counting clock signals outputted from the signal receiving circuit 11.

When reading of the data row length data from the data row length data converting circuit 19 is completed, i.e., after a period of time represented by 8 bits corresponding to the data row length data elapses from the time when an output side start code detection output is generated from the start code generating circuit 23, the switch SW4 is shifted from the state (A-C) to the state (A-B) in which the contact A is connected to the contact B (see FIG. 5(m)). Thus, an output from the data converting circuit 20 is added to the contact A in the switch SW4, i.e., data from the group of sensors 1 are added to the fore end of the data region in the input signal, whereby data extracted from the rear end of the data region are outputted to the group of actuators 2. The data are outputted subsequent to the data row length data which have been previously outputted via the signal sending circuit 27 (see FIG. 5(b)).

Then, a stop code included in the input signal is detected by the stop code detecting circuit 13 so that an input side stop code detection output is generated (see FIG. 5(f)). When the switch SW2 is shifted to OFF, a counting operation of the data row length counter 15 is completed. Namely, the data row length counter 15 counts a data row length from a start point of the data region to an end point of the stop code. Since the data code has a known row length, e.g., in the form of 8 bits, the data row length counter 15 has practically counted a data row length of the data region in the input signal. The value derived from counting of the data row length counter 15 (representing a value derived by subtracting a stop code row length from the counted value of the data row length counter 15) is compared in the data row length correct/incorrect determining circuit 16 with a data row length set in the data row length setting circuit 14 in such a timing that an input side stop code detected output is outputted from the stop code detecting circuit 13 (see FIG. 5(f)). If the counted value derived from the data row length counter 15 does not coincide with the data row length set in the data row length setting circuit 14, this non-coincidence is determined as a data row length abnormality and an error signal is then outputted at a high level.

When a stop code included in the signal outputted from the data converting circuit 20 is detected in the stop code detecting circuit 24 to generate an output side stop code detection output (see FIG. 5(g)), the switch SW4 is shifted from the state (A-B) to a state (A-D) in which the contact A is connected to the contact D (see FIG. 5(m)). This causes an error check code created in the error check code creating circuit 26 to appear at the contact A of the switch SW4. The error check code is outputted from the signal sending circuit 27 subsequent to the stop code which has been outputted from the data converting circuit 20 (see FIG. 5(b)). When sending of the error check code from the error check code generating circuit 26 is completed and then an error check code sending completion signal is generated (see FIG. 5(h)), the control circuit 22 is operated such that the switch SW4 is shifted from the state (A-D) to a state (A-E) in which the contact A is connected to the contact E.

When a high level error signal is not generated from the data row length correct/incorrect determining circuit 16, a high level error signal is not generated while any incorrect code is not detected in the error check code inspecting circuit 17 and a high level signal is not generated while any error code in the input signal is not detected in the error code detecting circuit 18 and an output from the OR circuit OR is held at a low level, whereby the switch SW0 remains in such a state that an earthed level has been selected. Consequently, at this time, an earthed level signal is generated at the contact A of the switch SW4 and this signal is outputted from the signal sending circuit 27 subsequent to the error check code. Namely, at this time, no error code is added.

When a data row length abnormality is detected in the data row length correct/incorrect determining circuit 16 or an incorrect code is detected in the error check code inspecting circuit 17 or an error code is detected in the error code detecting circuit 18 while an output from any one of the data row length counter 15, the error check code inspecting circuit 17 and the error code detecting circuit 18 is increased to a high level, the OR circuit OR is energized to a high level, whereby the switch SW0 is shifted to the shown state to select the error code generating circuit 25 side. Thus, a predetermined error code which has been generated in the error code generating circuit 25 appears at the contact A of the switch SW4. In this case, this error code is outputted from the signal sending circuit 27 subsequent to the error check code. Namely, a certain error code is added (see FIG. 5(b)).

Incidentally, in this case, the register 21 become inoperative in response to an output from the OR circuit OR and sending of control data to the group of actuators 2 is inhibited.

When sending of the error code from the error code generating circuit 25 is completed and an error code sending completion signal is then outputted (see FIG. 5 (i)) or a predetermined number of bits (e.g., 8 bits) corresponding to the error code elapses from the time when the error code sending completion signal has been outputted, the control circuit 22 is operated such that the switch SW4 is shifted from the state (A-E) to the initial state (A-B). As a result, a processing at this node is completed.

Figure 6:
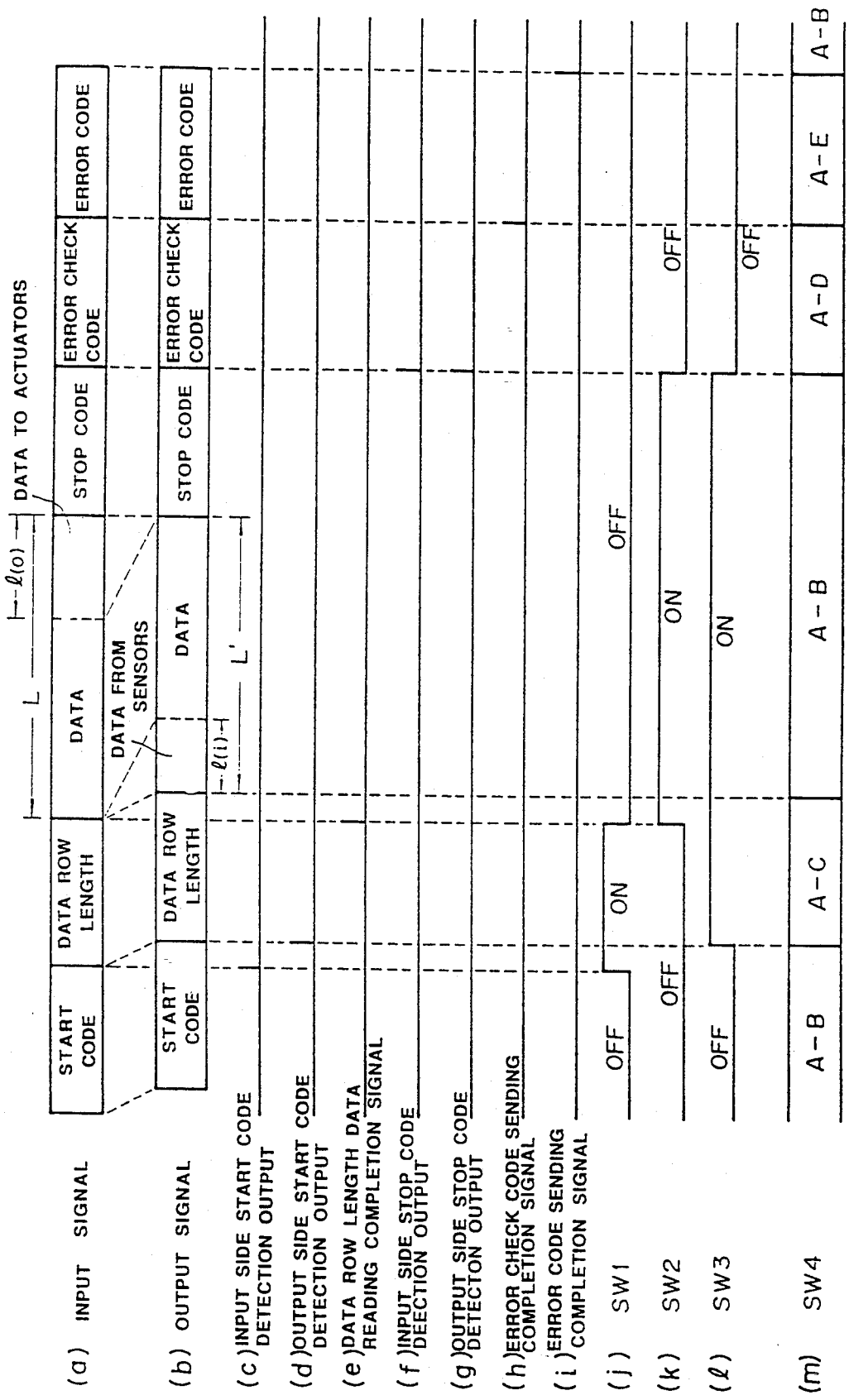

Next, operations to be performed at this node 10 will be described below as to a case where data row length l(i) bits including data to be added in the data converting circuit 20 are shorter than data row length l(o) bits including data to be extracted, i.e., (l(i)<l(o)). Operations to be performed in this case are represented in FIG. 6 which shows a plurality of timing charts.

Specifically, in case where data row length l(i) bits including data to be added in the data converting circuit 20 are shorter than data row length l(o) bits including data to be extracted, the data converting circuit 20 outputs an input signal (see FIG. 6(a)) with delay by data row length l(i)-l(o) bits which are equal to a difference between data row length (i) bits and data row length l(o) bits. In response to this outputting, the data row length data converting circuit 19 outputs the converted data row length data with delay by data row length (l(i)-l(o)) bits relative to the inputted data row length.

Accordingly, in this case, an input signal received in the signal receiving circuit 11 (see FIG. 6(a)) is delayed in the data converting circuit 20 by data row length ((i) −(o)) bits so that it is outputted via the switch SW4 and the signal sending circuit 27 (see FIG. 6(b)).

Then, when a start code is detected in the start code detecting circuit 23 to generate an output side start code detection signal see FIG. 6(d)), the switch SW3 is shifted to ON and the switch SW4 is shifted from the state (A-B) to a state (A-C). In response to shifting of the switch SW3 to the ON side, the error check code creating circuit 26 starts receiving of an output from the data converting circuit 20. Since data row length data converted in the data row length data converting circuit 19 in the above-described manner are outputted with delay by (l(i) -l(o)) bits relative to data row length data included in the input signal, the data row length data, which have been converted in the data row length data converting circuit 19 in such a timing that the switch SW4 is shifted to the state (A-C), appears at the contact A of the switch 4 so that they are outputted subsequent to the start code via the signal sending circuit 27 (see FIG. 6(b)).

When a stop code outputted from the data converting circuit 20 is detected in the stop code detecting circuit 24 to generate an output side stop code detection output, the switch SW3 is shifted to OFF and receiving of an output from the data converting circuit 20 in the error check code creating circuit 26 is completed. At the same time, the switch SW4 is shifted from the state (A-B) to the state (A -D) (see FIG. 6(m)), whereby a new error check code created in the error check code creating circuit 26 is outputted from the signal sending circuit 27 subsequent to the aforementioned stop code (see FIG. 6(m)). Other operations are same as those shown in FIG. 5. Specifically, When sending of the error check code from the error check code creating circuit 26 is completed and an error check code sending completion signal is outputted (see FIG. 6(h)), the switch SW4 is shifted to the sate (A-E) (see FIG. 6(m)). In addition, when an error code sending completion signal is outputted from an error code creating circuit 25 (see FIG. 6(i)), the switch SW4 is shifted to the state (A-B) which represents an initial state.

The switch SW1 is held on the ON side for a period of time from the time when an input side start code detected output is generated in the start code detecting circuit 12 (see FIG. 6(c)) till the time when a data row length reading completion signal is generated in the data row length setting circuit 14 (see FIG. 6(j)), and the data row length setting circuit 14 performs reading of data row data included in the input data for the aforementioned period of time.

Additionally, the switch SW2 is held on the ON side (see FIG. 6(k)) for a period of time from the time when a data row length data reading completion signal is generated in the data row length setting circuit 14 (see FIG. 6(e)) till the time when an input side stop code detecting output is generated in the stop code detecting circuit 13 (see FIG. 6(f)), whereby the data row length counter 15 counts a data row length in the data region included in the input signal.

Figure 7:
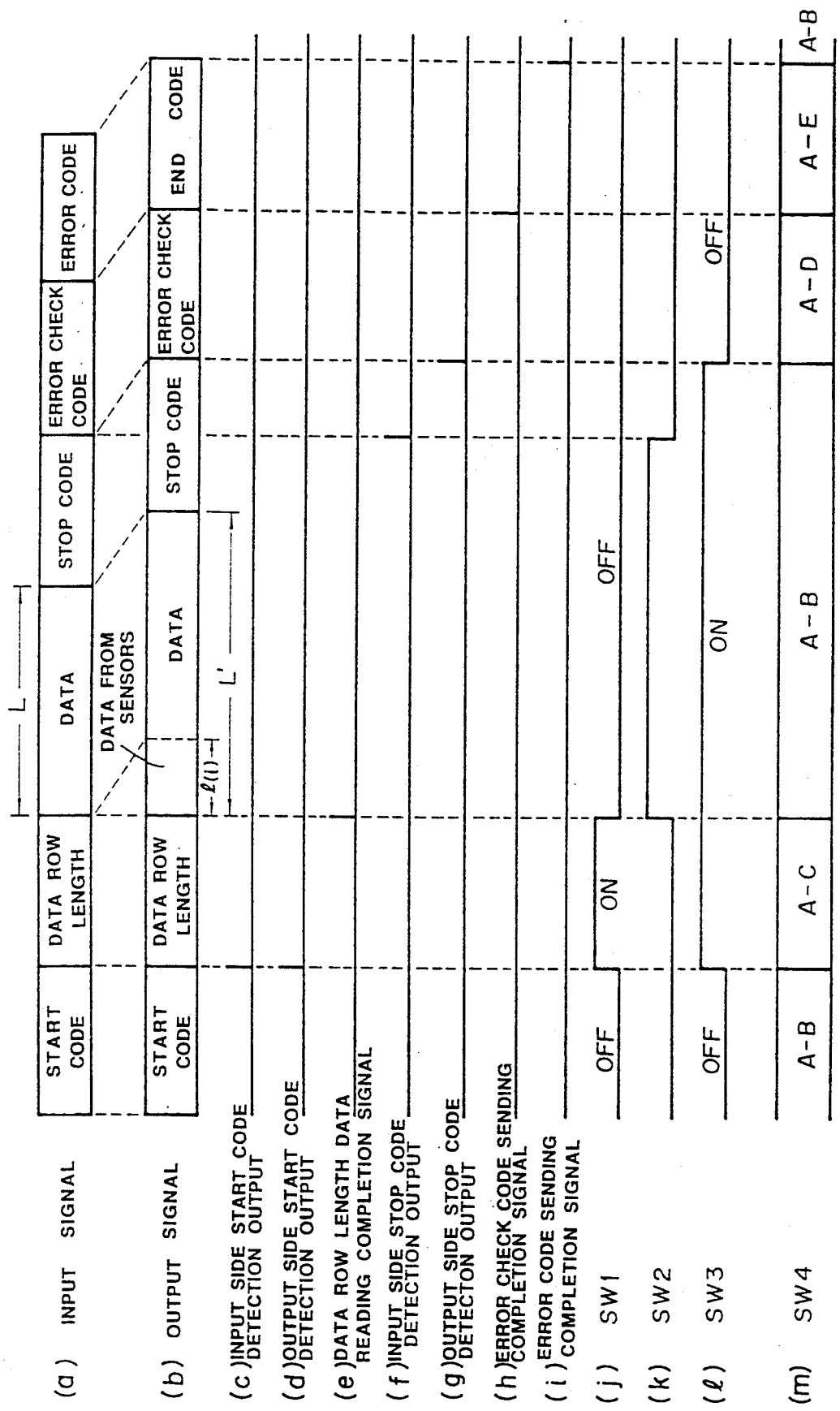

FIG. 7 shows a plurality of timing charts which represent operations to be performed in the case where receiving of data from and adding of data to the group of sensors 1 are performed but extracting of data from and outputting of data to the group of actuators 22 are not performed at the node 10, as described above with reference to FIG. 2. In this case, operations to be performed at the node 10 are same as those shown in FIG. 5, provided that a bit length of data extracted at the node 10, i.e., l(o) bits is reduced to zero. In this case, an additive operation only is performed with data from the group of sensors 1 in the data converting circuit 20, and data row length data corresponding to $L' = L + l(i)$ (bits) with (i) bits added to data row length data representing L bits included in the input signal are outputted from the data row length data converting circuit 19.

Figure 8:
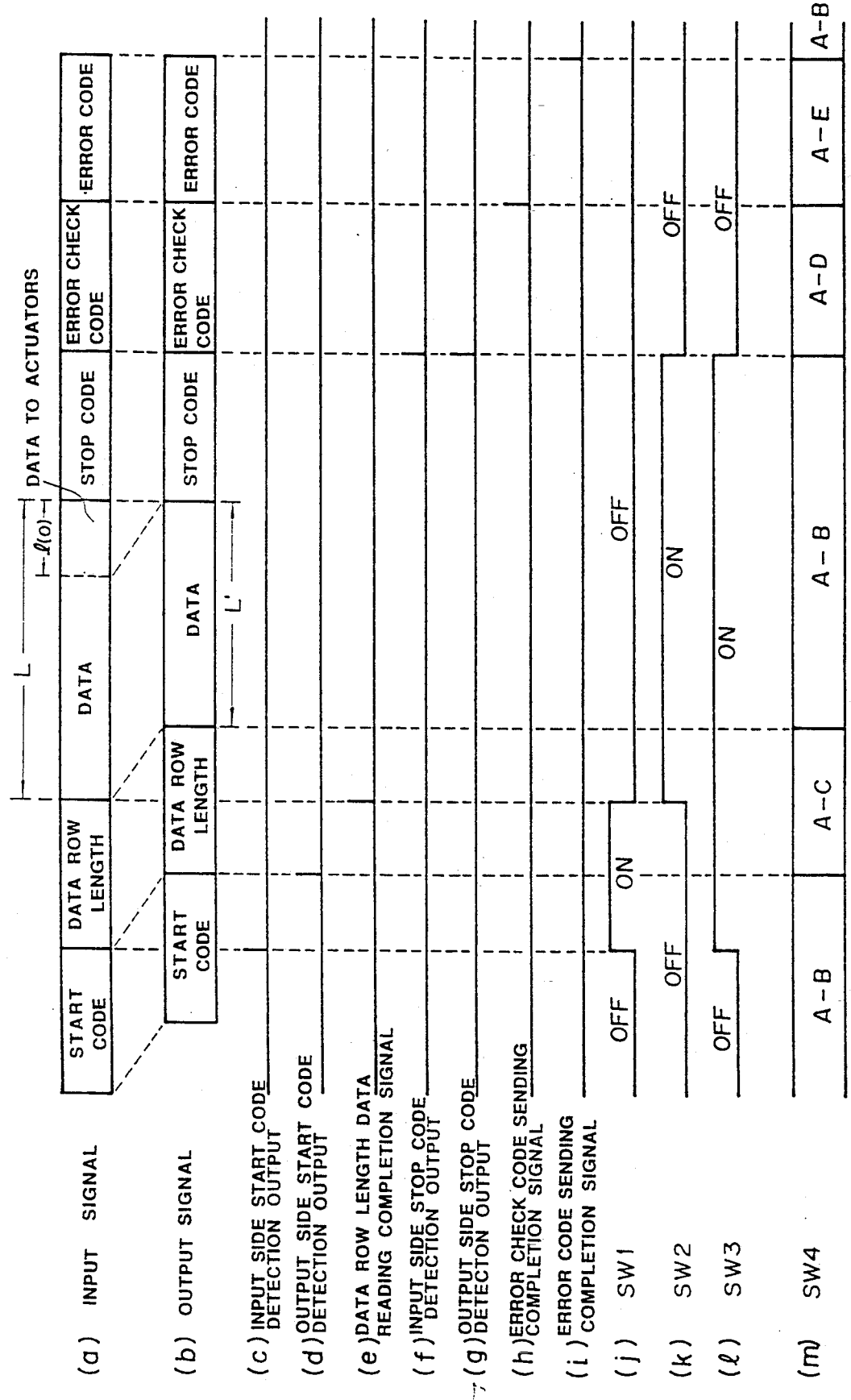

FIG. 8 shows a plurality of timing charts which represent operations to be performed in the case where extracting of data and outputting of data to the group of actuators 2 are performed but receiving of data from and adding of data to the group of sensors 1 are not performed at the node 10, as described above with reference to FIG. 3. In this case, operations to be performed at the node 10 are same as those represented by the timing charts in FIG. 6, provided that a bit length l(i) of data to be added at the node 10 is reduced to zero. In this case, a processing of extracting and a processing of outputting only are performed with data from and to the group of actuators 2 in the data converting circuit 20 and the processed data are outputted therefrom with delay by (o) bits. Then, data row length data corresponding to $L' = L - l(o)$ with l(o) bits representing data to be extracted subtracted from data row length data representing L bits included in the input data signal are formed in the data row length data converting circuit 19 and the thus formed data are outputted therefrom with delay represented by l(o).

Alternatively, in place of the structure as shown in FIG. 4, the present invention may be embodied in such a manner that the start code detecting circuit 23 and the stop code detecting circuit 24 are not provided but an input side start code detection output from the start code detecting circuit 12 and an input side stop code detection output from the stop code detecting circuit 13 form signals equivalent to outputs from the start code detecting circuit 23 and the stop code detecting circuit 24, in the form of signals delayed by a predetermined number of bits (representing the number of bits delayed in the data converting circuit 20), respectively.

Further, a signal having an input side start code detection output from the start code detecting circuit 12 delayed by a bit number (e.g., 8 bits) of data row length data may be used in place of a data reading completion signal outputted from the data row length setting circuit 14.

Further, a signal having an output side start code detection output from the stop code detecting circuit 24 delayed by a bit number corresponding to error check code may be used in place of an error check code sending completion signal outputted from the error check code generating circuit 26. Additionally, a signal having an error check code sending completion signal delayed by a bit number corresponding to an error code may be used in place of the error code sending completion signal outputted from the error code generating circuit 24.

In this embodiment, to facilitate detecting of the start code and the stop code, the data converting circuit 20 is constructed such that data in the data region receive a predetermined processing. Specifically, if a data row length in the data region coincides with the start code or the stop code, this coincidence may incorrectly be detected as a start code or a stop code. In view of such incorrect detection, according to this embodiment, a predetermined processing is carried out for data in the data region in order that a data row length in the data region does not become the same data row length as that of the start code or the stop code.

In detail, according to this embodiment, a datum "1" is converted into "10" and a datum "0" is converted into "01" in the data converting circuit 20. This conversion assures that three or more "1" are not present in series in the data region. Thus, when the start code and the stop code are set in a pattern including three or more "1" arranged in series, it is assured that data in the data region are not detected as a start code or a stop code by mistake. Consequently, the start code and the stop code can be detected without fail. It should be noted that modification may be made without problem such that a datum "1" is converted into "0", a datum "1" is converted into "10" or a datum "0" is converted into "00" and a datum "1" is converted into "10" or a datum "0" is converted into "00" and a datum "1" is converted into "01".

If a predetermined number of converted data, e.g., 5 converted data are present in series, a measure may be taken such that "0" is automatically inserted in the data converting circuit 20. In this case, since six or more "1" are not present in series in the data region, the start code and the stop code should be set in a pattern including a part where six and more "1" are arranged in series. This setting assures that data can be distinguished from the start code and the stop code without fail.

According to the above-described embodiment, to receive data from a group of sensors connected to each node or to send control signal to a group of actuators connected to each node, data row length data are included in a signal sent to each node (signal having a main frame structure) and they are read in the data row length setting circuit, whereby a data row length is set so as to inspect a data row length abnormality. Alternatively, modification may be made such that besides the main frame structure, a sub-frame structure is provided to include a signal therein and data row length data representing a data row length of the input signal inputted at each node are distributed at the respective nodes by utilizing signals each having a sub-frame structure.

Figure 9:
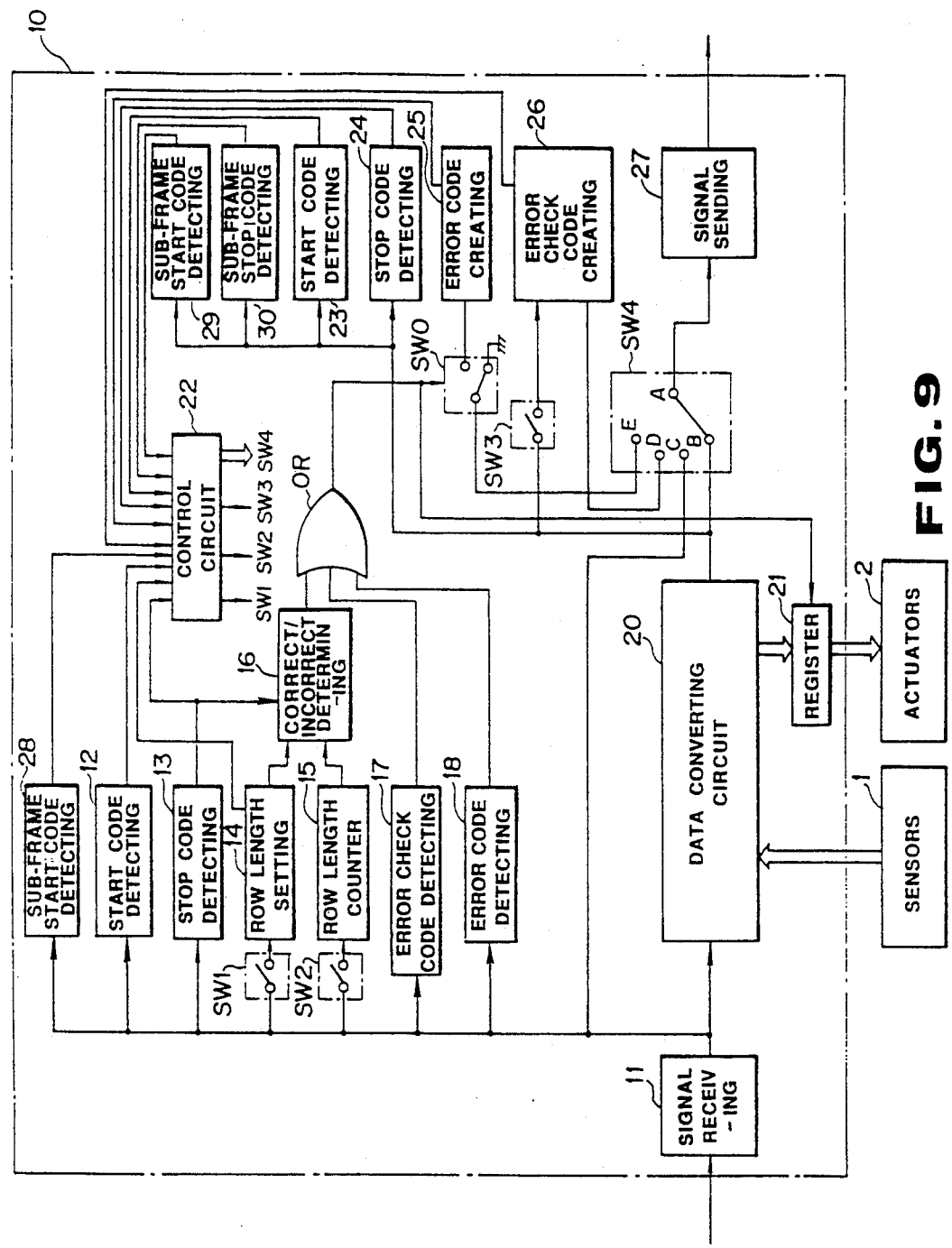
FIG. 9 is a block diagram which schematically illustrates by way of example the structure of a node in accordance with other embodiment of the present invention.

FIG. 9 is a block diagram which illustrates a node 10 in accordance with other embodiment of the present invention. According to this embodiment, a main controller 100 (see FIG. 1) receives data from a group of sensors connected to each node and outputs signals in a sub-frame structure to distribute data row length data to each node in addition to signals in a main frame structure which are used to send data from a group of actuators connected to the respective nodes. FIG. 10(a) illustrates by way of example an input signal having a main frame structure to be inputted into each node and FIG. 12(a) illustrates by way example an input signal having a sub-frame structure. According to this embodiment, as is apparent from FIG. 10(a), the input signal having a main frame structure is provided such that data row length data are removed from the input signal shown in FIG. 5. Further, according to this embodiment, as shown in FIG. 12(a), the input signal having a sub-frame structure is provided such that a sub-frame start code is arranged in the first place, thereafter, data row length data DLK at own node (in this case, provided that own node represents a number K of node), data row length data DL (K+1),—, data row length data DLn at a n number of node are arranged one after another and a sub-frame stop code is arranged in the final place. It should be noted that signal each having a sub-frame structure are sent to each node at the time when the apparatus of the present invention is initially activated or at every time when signals each having a sub-frame structure is sent by a predetermined number of times.

In fact, this embodiment is practiced such that a sub-frame start code detecting circuit 28, a sub-frame start code detecting circuit 29 and a sub-frame stop code detecting circuit 30 are provided in addition to the structure as shown in FIG. 4, the data row length data converting circuit 19 shown in FIG. 4 is removed and an output from the signal receiving circuit 11 is connected to the contact C in the switch SW4.

The sub-frame start code detecting circuit 28 is such that a sub-frame start code is detected from input signals each having a sub-frame structure which are inputted from the node at the preceding stage and received in the signal receiving circuit 11. Further, the sub-frame start code detecting circuit 29 and the sub-frame stop code detecting circuit 30 are intended to detect a sub-frame start code and a stop code which are outputted from the data converting circuit 20.

Figure 10:
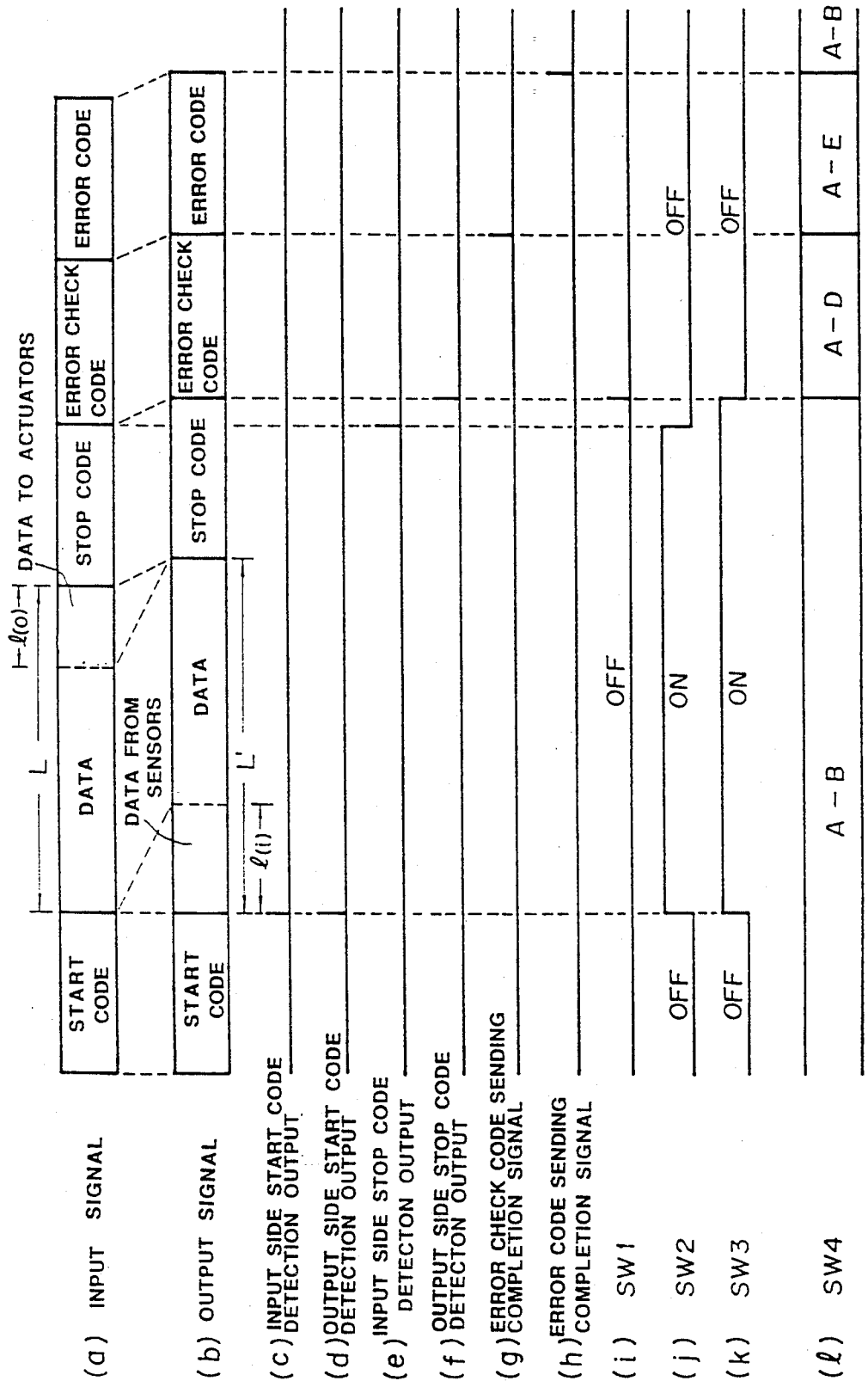

FIG. 10 shows a plurality of timing charts which represent operations to be performed at the node 10 in response to input signals each having a main frame structure in a case where a bit number l(i) of data to be added in the data converting circuit 20 is larger than a bit number l(o) of data to be extracted, i.e., (l(i)>l(o)). Operations to be performed in this case are same as those described above with reference to FIG. 7 with the exception that since data row length data are not included in input signals each having a main frame structure, the switch SW2 is shifted from OFF to ON in response to the input side start code detection output from the start code detecting circuit 12 in place of a data row length data reading completion signal from the data row length setting circuit 14 and that the switch SW4 is not shifted from the state (A–B) to the state (A–C) in response to the output side start code detection signal outputted from the start code detecting circuit 23, unless the switch SW1 is actuated. This is attributable to the facts that according to this embodiment, since data row length data are not included in input signals each having a main frame structure, there is a need of starting to count a data row length immediately after detection of the start code, that an operation for setting a data row length is not performed in the data row length setting circuit 14 when signals each having a main frame structure are inputted and that due to the absence of any data row length converting circuit, there is no need of shifting the switch SW4 to the state (A–C) for the purpose of sending data row length data to any one of the nodes at the subsequent stage.

In this case, since the switch SW1 is not shifted to ON, the data row length data are not read in the data row length setting circuit 14. Reading of the data row length data in the data row length setting circuit 14 is carried out only when signals each having a sub-frame structure are inputted into the node 10, as will be described later. Accordingly, in response to inputting of signals each having a main frame structure, the data row length correct/incorrect determining circuit 16 compares the data row length data read in the data row length setting circuit 14 when signals each having a sub-frame structure are inputted, with an actual data row length in the main frame measured in the data row length counter 15, whereby a data row length abnormality is detected.

Figure 11:
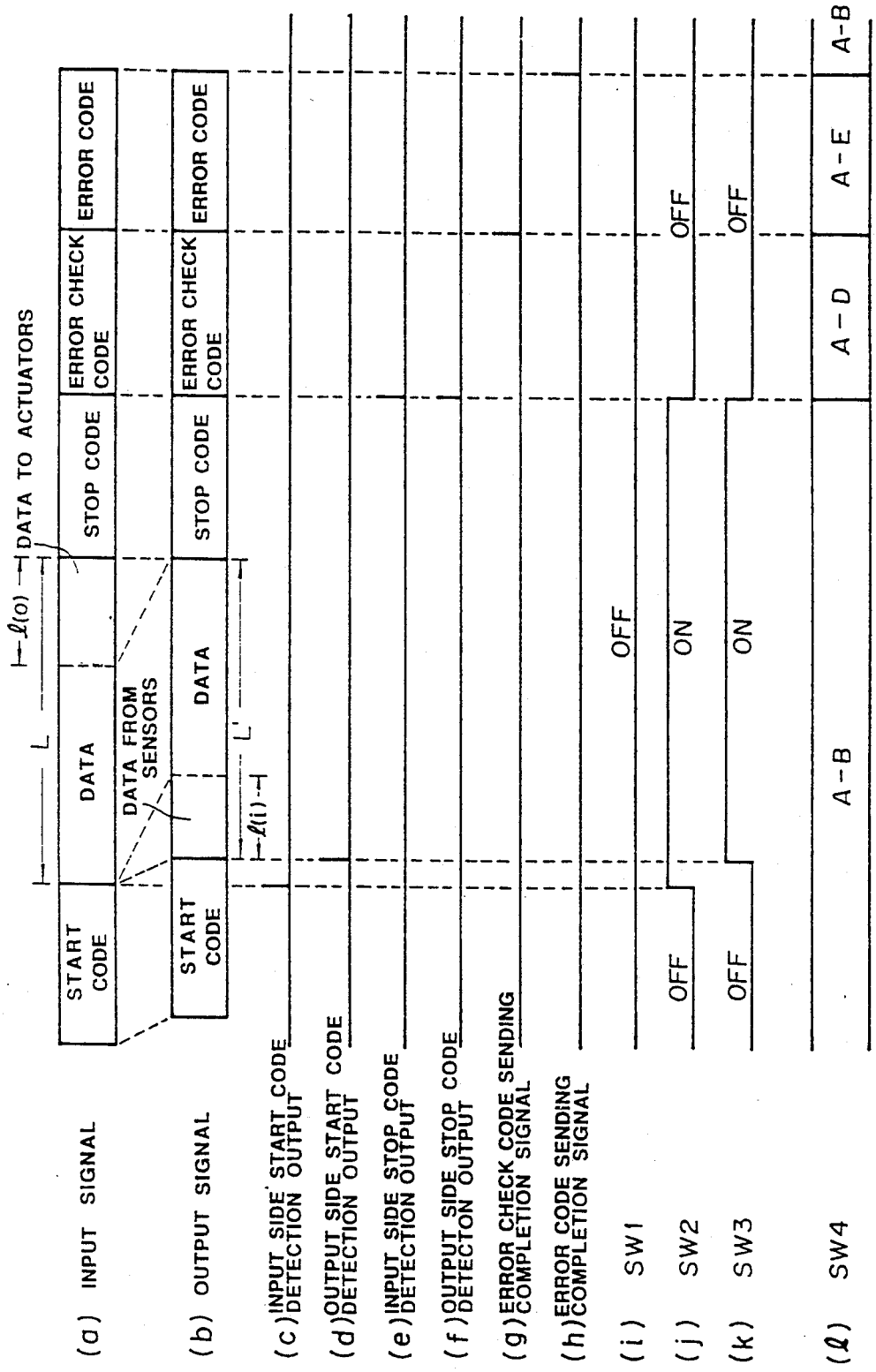

FIG. 11 shows a plurality of timing charts which represent operations to be performed at the node 10 in response to input signals each having a main frame structure in a case where a bit number l(i) of data to be added in the data converting circuit 20 is smaller than a bit number l(o) to be extracted, i.e., (l(i)<l(o)). Operations to be performed in this case are same as those described above with reference to FIG. 11 with the exception that the data converting circuit 20 outputs input signals with delay represented by (l(o)-l(i)) bits.

Figure 12:
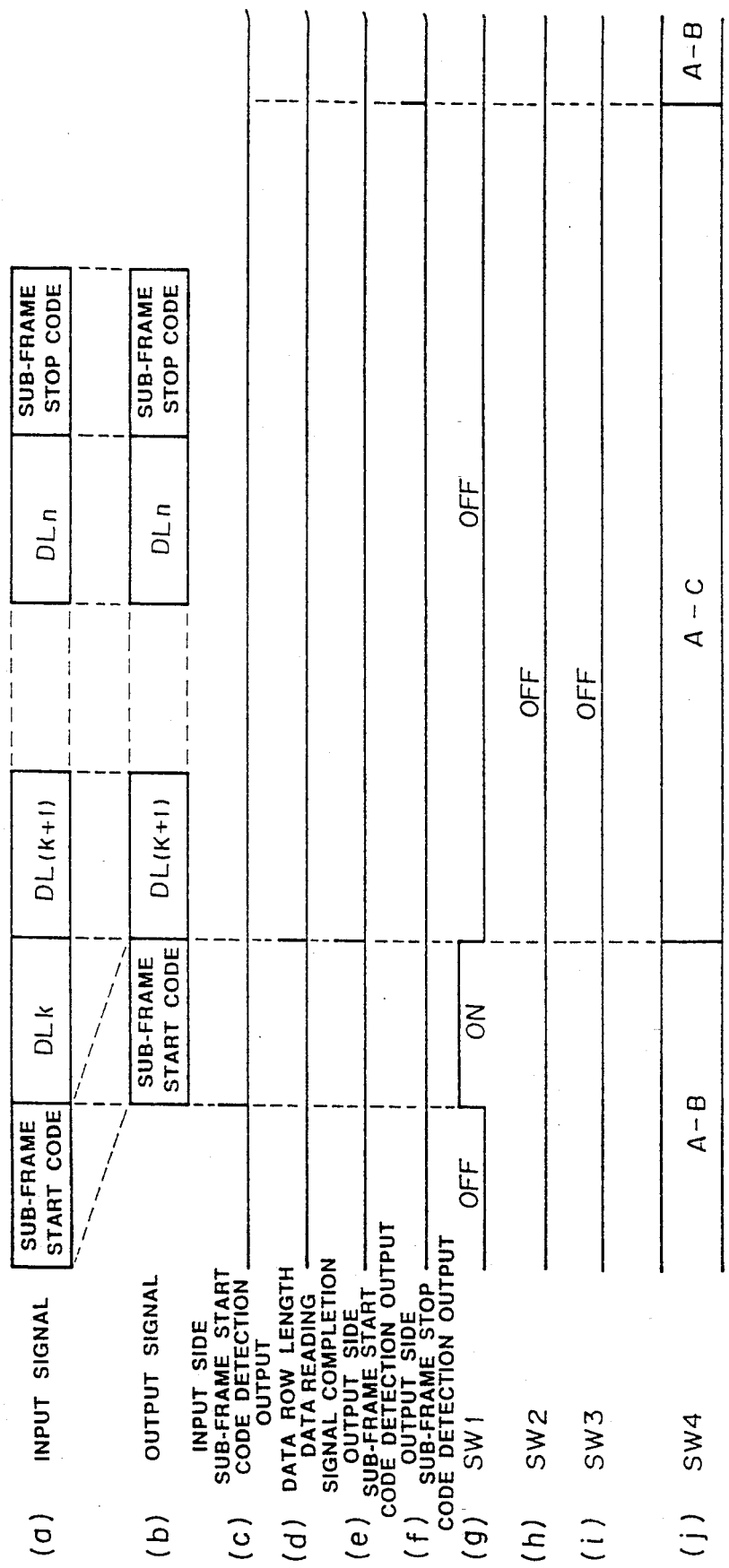
Figure 13:
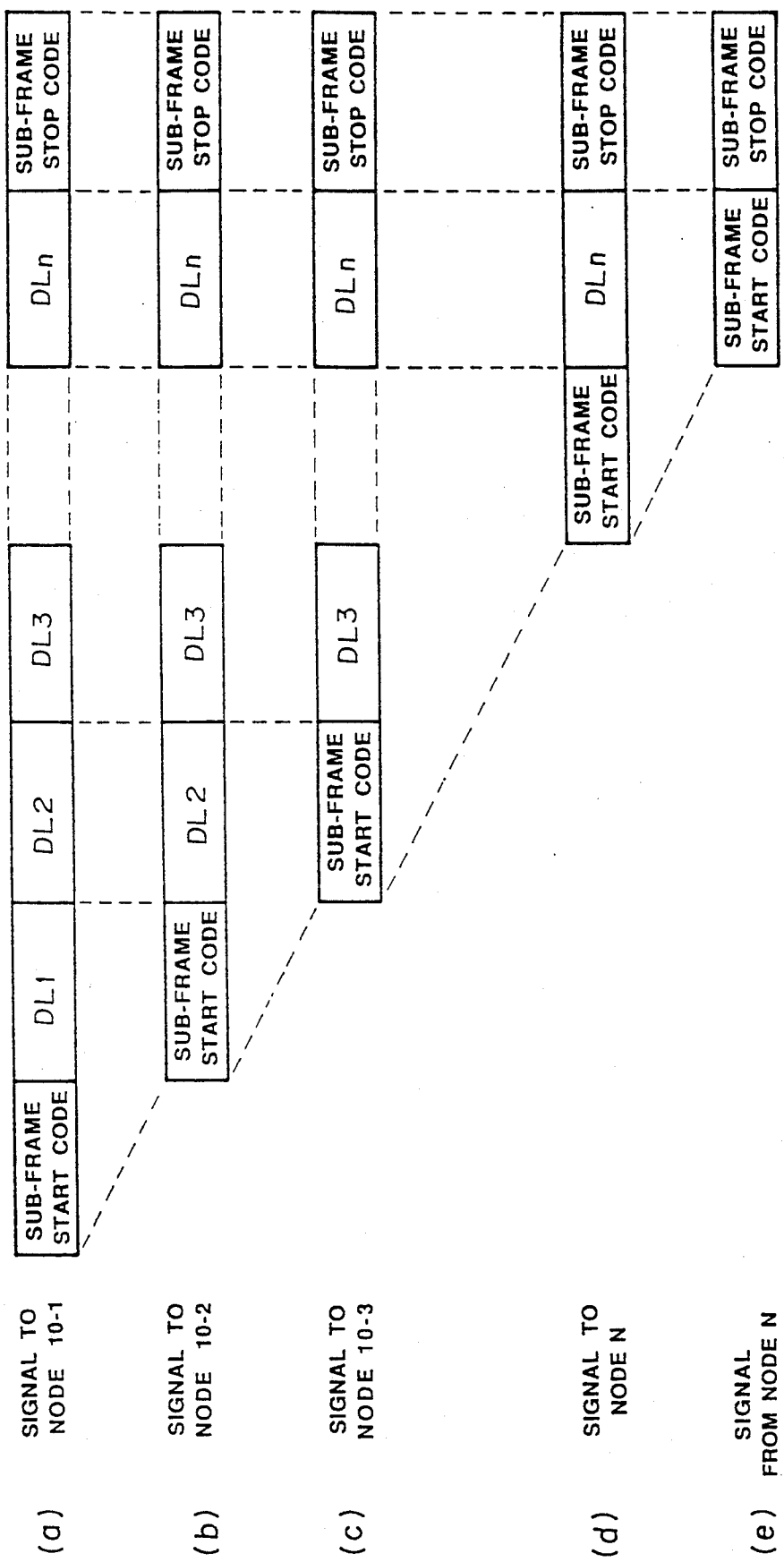

FIG. 12 shows operations to be performed at the node 10 in response to input signals each having a sub-frame structure. According to this embodiment, a signal having a sub-frame structure is outputted from the main controller 100 in a frame configuration as shown in FIG. 13(a) so that it is first inputted into the node 10-1. As will be apparent from FIG. 13(a), the signal includes a sub-frame start code in the first place. Thereafter, data row length data corresponding to the node 10-1, data row length data corresponding to the node 10-2, data row length data corresponding to the node 10-3,—, data row length data corresponding to the node 10-n are arranged one after another in this order, and a sub-frame stop code is put in the final place. When the signal having a sub-frame structure is inputted into each node, the data row length data located just behind the sub-frame start code are extracted as data row length data specific to own node and they are then stored in each own node. This operation is successively repeated. In detail, when a signal having a sub-frame structure as shown in FIG. 13(a) is inputted into the node 10-1 in the first place from the main controller 100, data DL1 just behind the sub-frame start code are received in the node 10-1 as data row length data specific to own node and the data DL1 are then extracted therefrom so that they are outputted to the node 10-2 at the next stage in the form of a signal as shown in FIG. 13(b). When the signal shown in FIG. 13(b) is inputted into the node 10-2, data DL2 just behind the sub-frame start code included in the signal are received in the node 10-2 as data row length data specific to own node and the data DL2 are then extracted therefrom so that they are outputted to the node 10-3 at the next stage in the form of a signal as shown in FIG. 13(c). In this manner, the signal having a sub-frame structure from the main controller 100 is inputted into each node and then data row data corresponding to each node are successively extracted therefrom. Finally, the signal as shown FIG. 13(e) is outputted from the final node 10-n. Thus, the main controller 100 can know that the data row length data have been distributed to each node.

An input signal having a sub-frame structure as shown in FIG. 12(a) is added to the number k of node 10 so that it is received in the signal receiving circuit 11. A start code outputted from the signal receiving circuit 11 is detected in the sub-frame start code detecting circuit 28 and an input side frame start code detected signal is then generated from the sub-frame start code detecting circuit 28 (see FIG. 12(c)). The input side sub-frame start code detected output is added to the control circuit 22. The control circuit 22 causes the switch SW1 to be shifted from OFF to ON (see FIG. 12(g)). Once the switch SW has been shifted to ON, the data row length data DLk outputted from the signal receiving circuit 11 in correspondence to the node 10 are read in the data row length setting circuit 14, whereby a data row length is set at the node 10. When reading of the data row length data DLk in the data row length data setting circuit 14 is completed, a data row length reading completion signal is outputted from the data row length data DLk (see FIG. 12(d)). In response to the data row length data reading completion signal, the control circuit 22 causes the switch SW1 to be shifted from ON to OFF (see FIG. 12(g)).

Then, an output from the signal receiving circuit 11 is added to the data converting circuit 20. When a signal having a sub-frame structure is inputted into the data converting circuit 20, this data converting circuit 20 outputs a signal with delay by a bit number representing data row length data (e.g., 8 bits). An output from the data converting circuit 20 is added to the switch SW4. Since the switch SW4 is held at this moment in such a state that the contact A is connected to the contact B, i.e., The state (A-B) (see FIG. 12(*j*)), the output from the data converting circuit 20 is outputted to the node at the next stage via the switch SW4 and the signal sending circuit 27. Consequently, a sub-frame start code is first outputted from the signal sending circuit 27 with 8 bits delayed from the input signal (see FIG. 12(*j*)). When a sub-frame start code is outputted from the data converting circuit 20, it is detected in the sub-frame start code detecting circuit 29 to generate an output side sub-frame start code detection output (see FIG. 12(*e*)) which in turn is added to the control circuit 22. Thus, the control circuit 22 permits the switch SW4 to be shifted from the state (A-B) to a state (A-C) in which the contact A is connected to the contact C. Since the output from the signal receiving circuit 11 is added directly to the contact C of the switch SW4 as described above, data row length data DL (k+1) subsequent to the data row length data DLk appears at the contact A. The data row length data DL (k+1) is added to the signal sending circuit 27 and it is then outputted therefrom subsequent to the above-described sub-frame start code. In this manner, the signal having the data row length data DLk extracted from this node is outputted from the signal sending circuit 27 (see FIG. 12(*b*)). When a sub-frame stop code is outputted from the data converting circuit 20, it is detected in the sub-frame stop code detecting circuit 30 to generate an output side sub-frame stop code detection signal (see FIG. 12(*f*)). The output side sub-frame stop code detection signal is added to the control circuit 22. Thus, the control circuit 22 causes the switch SW4 to be shifted to the state (A-B) which represent an initial state.

With respect to the structure shown in FIG. 9, modification may be made such that a signal equivalent to the output from the sub-frame start code detecting circuit 29 is generated in the form of a signal with the input side sub-frame start code detection output from the sub-frame start code detecting circuit 28 delayed by a predetermined number of bits (bit number representing the data row length data), while the aforementioned sub-frame start code detecting circuit 29 is removed from the node structure.

Figure 14:
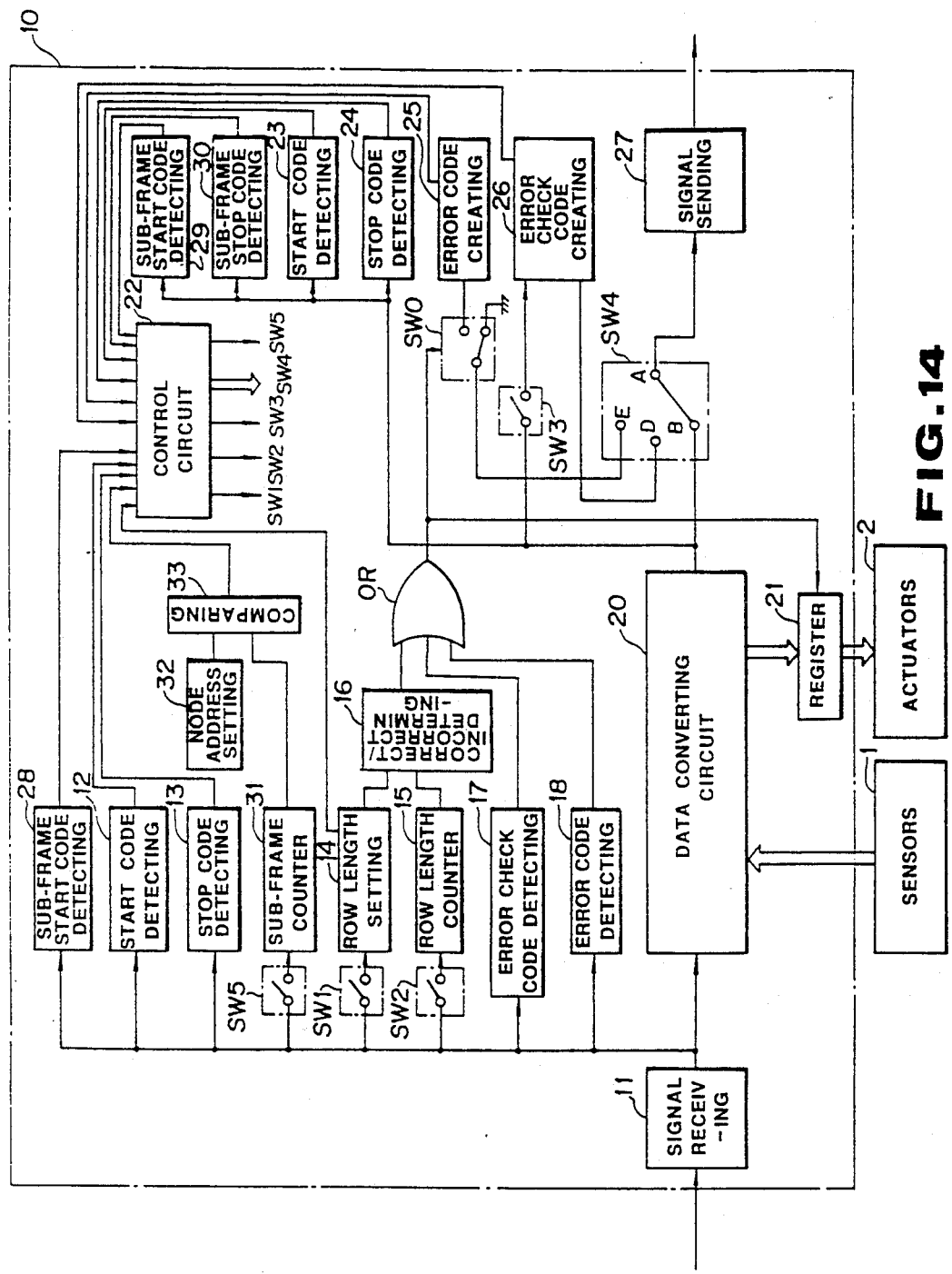
FIG. 14 is a block diagram which schematically illustrates by way of example the structure of a node for the apparatus in accordance with another embodiment of the present invention.

FIG. 14 is a block diagram which illustrates the structure of a node in accordance with other embodiment of the present invention wherein data row length data are set at the respective nodes using signals each having a sub-frame structure.

The node 10 used for practicing this embodiment is constructed such that the node shown in FIG. 9 is added with a switch SW5, a sub-frame counter 31, a node address setting circuit 32 and a comparing circuit 33 but the lead wire extending from the signal receiving circuit 11 to the switch SW4 is removed from the node shown in FIG. 9.

The sub-frame counter 31 is connected to the signal receiving circuit 11 via the switch SW5 to count a frame in the form of a sub-frame under a condition that the switch SW5 is shifted to ON. The node address setting circuit 32 is set with a node address which represents an address of the node 10. According to this embodiment, by comparing the node address set in the node address setting circuit 32 with a counted value of the sub-frame counter 31 in the comparing circuit 33, data row length data at own node are searched from signals each having a sub-frame structure and then a data row length is set by reading the thus searched data row length data in the data row length setting circuit 14. Next, an operation for setting the data row length will be described below with reference to FIG. 15 which illustrates a plurality of timing charts.

Figure 15:
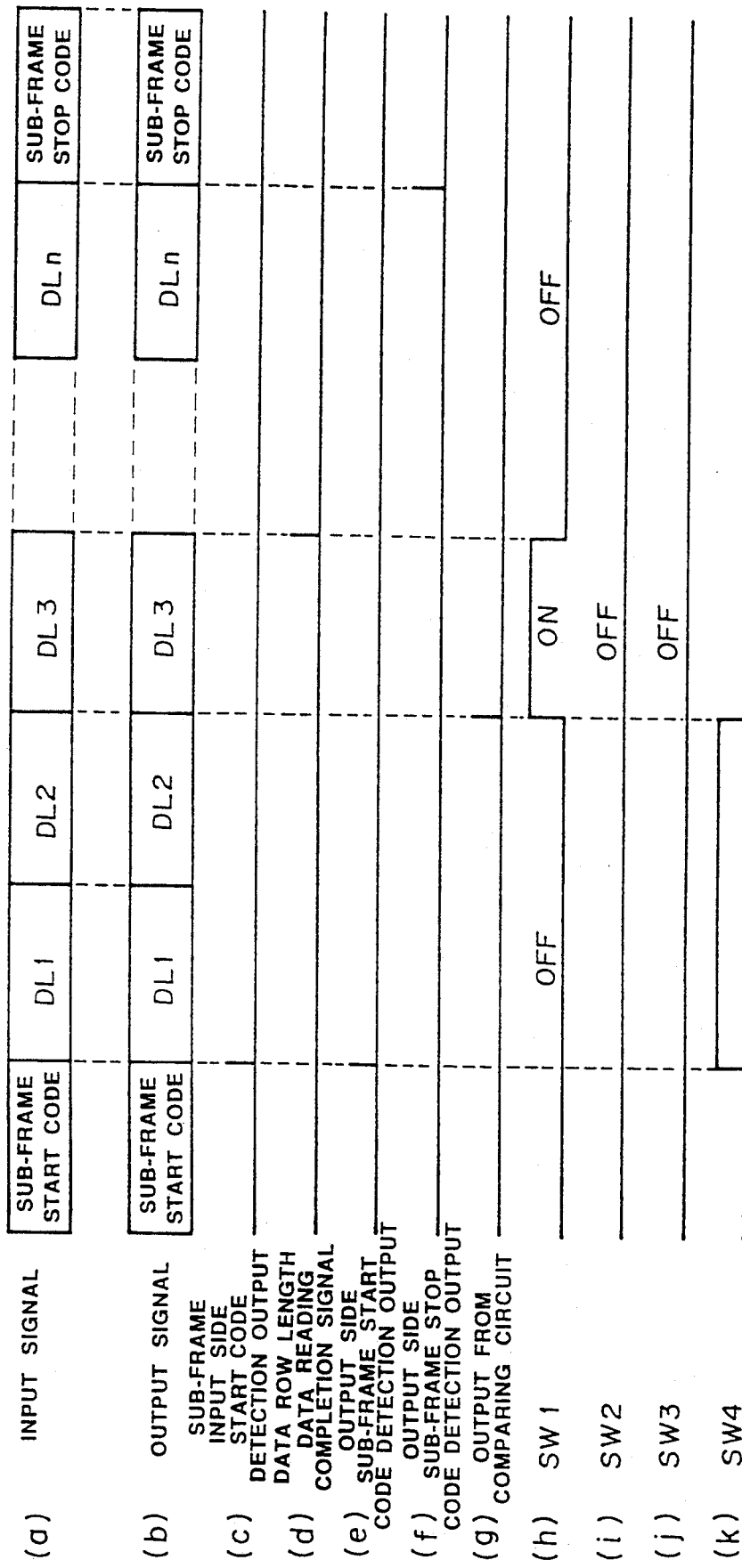
FIGS. 15(a)-15k show a plurality of timing charts which illustrate operations to be performed at the node shown in FIG. 14.

According to this embodiment, an input signal having a sub-frame structure to be inputted into the signal receiving circuit 11 is as shown in FIG. 15(*a*). This input signal is same as the signal added to the node 10-1 at the first stage shown in FIG. 13. In this embodiment, however, it should be noted that since data row length data at each node are not extracted therefrom, a same signal is inputted into each node. At each node, data row length data corresponding to own node are searched from the signal and the searched data row length data are read in the data row length setting circuit 14. Here, it is assumed that a node number of the node 10 is "3". In this case, "3" is set in the node address setting circuit 32. When an input signal having a sub-frame structure (see FIG. 15(*a*)) is inputted into the signal receiving circuit 11 and a sub-frame start code is outputted from the signal receiving circuit 11, the sub-frame start code is detected in the sub-frame start code detecting circuit 28 to generate an input side sub-frame start code detected output. Thus, the control circuit 22 causes the switch SW5 to be shifted to ON (see FIG. 15(*k*)). Once the switch SW5 has been shifted to ON, the sub-frame counter 31 starts an operation of counting the number of frames in the form of a sub-frame. An initial value is set to "1" in the sub-frame counter 31, whereby the counted value becomes "2" at the fore end of data row length data DL2 and the counted value becomes "3" at the fore end of data row length data DL3. As a result, a coincidence output is generated in the comparing circuit 33 at the fore end of the data row length data DL3 (see FIG. 15(*g*)). An output from the comparing circuit 33 is added to the control circuit 22. Thus, the control circuit 22 is operated such that the switch SW5 is shifted to OFF and the switch SW1 is shifted to ON (see FIG. 15(*h*)). When the switch SW1 is shifted to ON, the data row length setting circuit 14 starts reading of the data row length data DL3, whereby the data row length data DL3 are set in the data row length setting circuit 14. When a data row length data reading completion signal is outputted from the data row length setting circuit 14 (see FIG. 15(*d*)), the switch SW1 is shifted to OFF. It should be noted that when signals each having a sub-frame structure are received in the signal receiving circuit 11, the data converting circuit 20 allow the signals each having a sub-frame structure to pass therethrough as they are, and the switch SW4 is immovably held in the state (A-B).

It should be added that operations to be performed in a case where input signals each having a main frame structure are added to the node structure shown in FIG. 14 are same as those represented by a plurality of timing charts in FIGS. 10 and 11.

Incidentally, setting of a node number in the node address setting circuit 32 may be effected by actuating a predetermined switch at each node. Alternatively, setting may be effected by sending signals each having a secondary sub-frame structure (not shown in the drawings) from the main controller 100 and receiving such signals each having a secondary sub-frame structure in the node address setting circuit 32.

Figure 16:
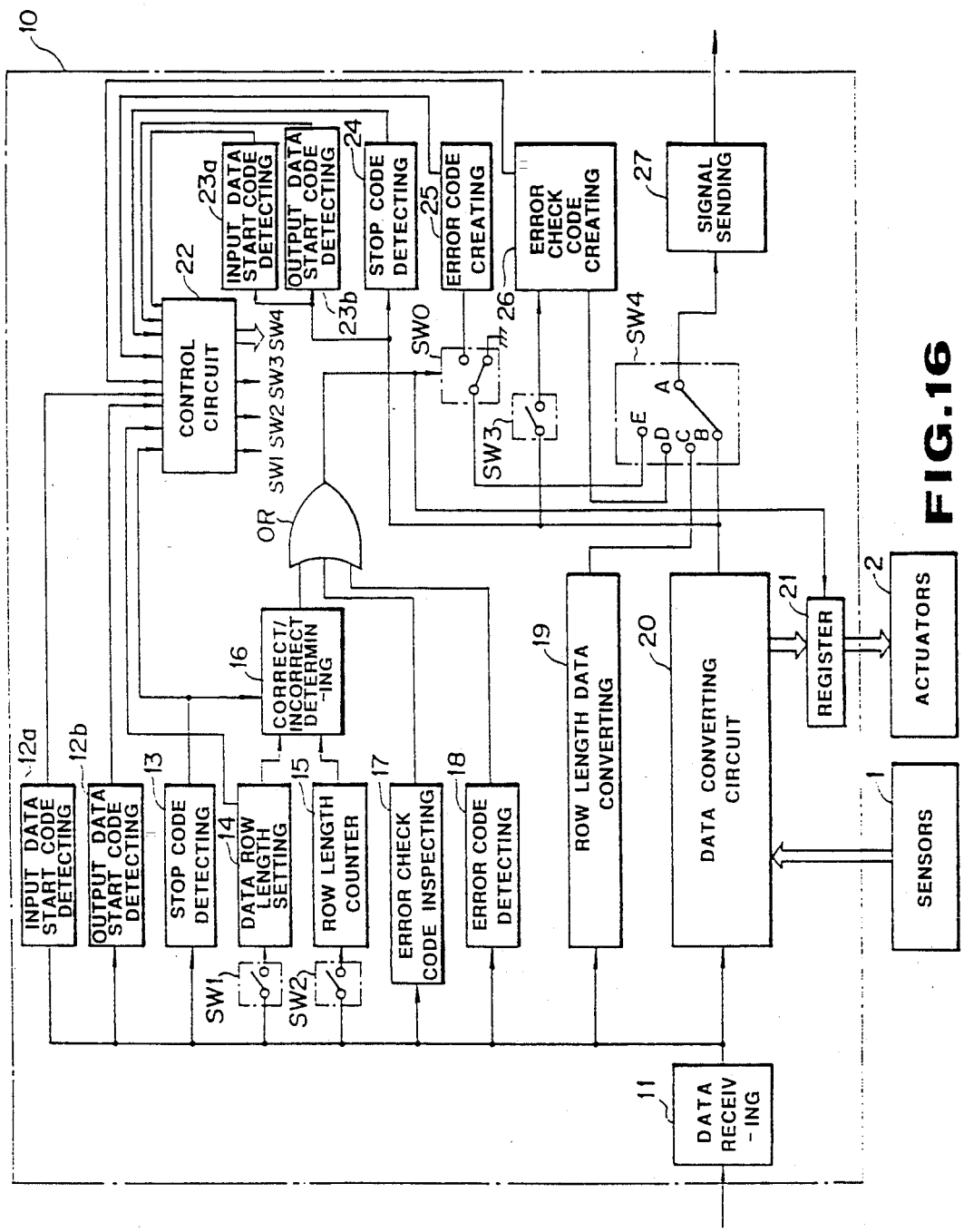
FIG. 16 is a block diagram which schematically illustrates by way of example the structure of a node for the apparatus in accordance with another embodiment of the present invention.

FIG. 16 is a block diagram which illustrate a node 10 in accordance with another embodiment of the present invention wherein a frame structure as shown in FIG. 17(a) is employed for the node 10. According to this embodiment, two start codes comprising an input data start code and an output data start code are used and moreover signals each having a frame structure as shown in FIG. 17(a) to separately allocate input data representing a data region where data from the group of sensors 1 are added and output data representing a data region where data to the group of actuators 2 are extracted are used. Here, data row length data to be inserted behind the input data start code represent a data row length corresponding a sum of data row length L(i) bits of the input data and data row length L(o) bits of the output data.

The node structure employed for the embodiment shown in FIG. 16 is similar to that of the node 10 shown in FIG. 10 with the exception that an input data start code detecting circuit 12a and an output data start code detecting circuit 12b are substituted from the start code detecting circuit 12 and an input data start code detecting circuit 23a and an output data start code detecting circuit 23b are substituted for the start code detecting circuit 23.

Figure 17:
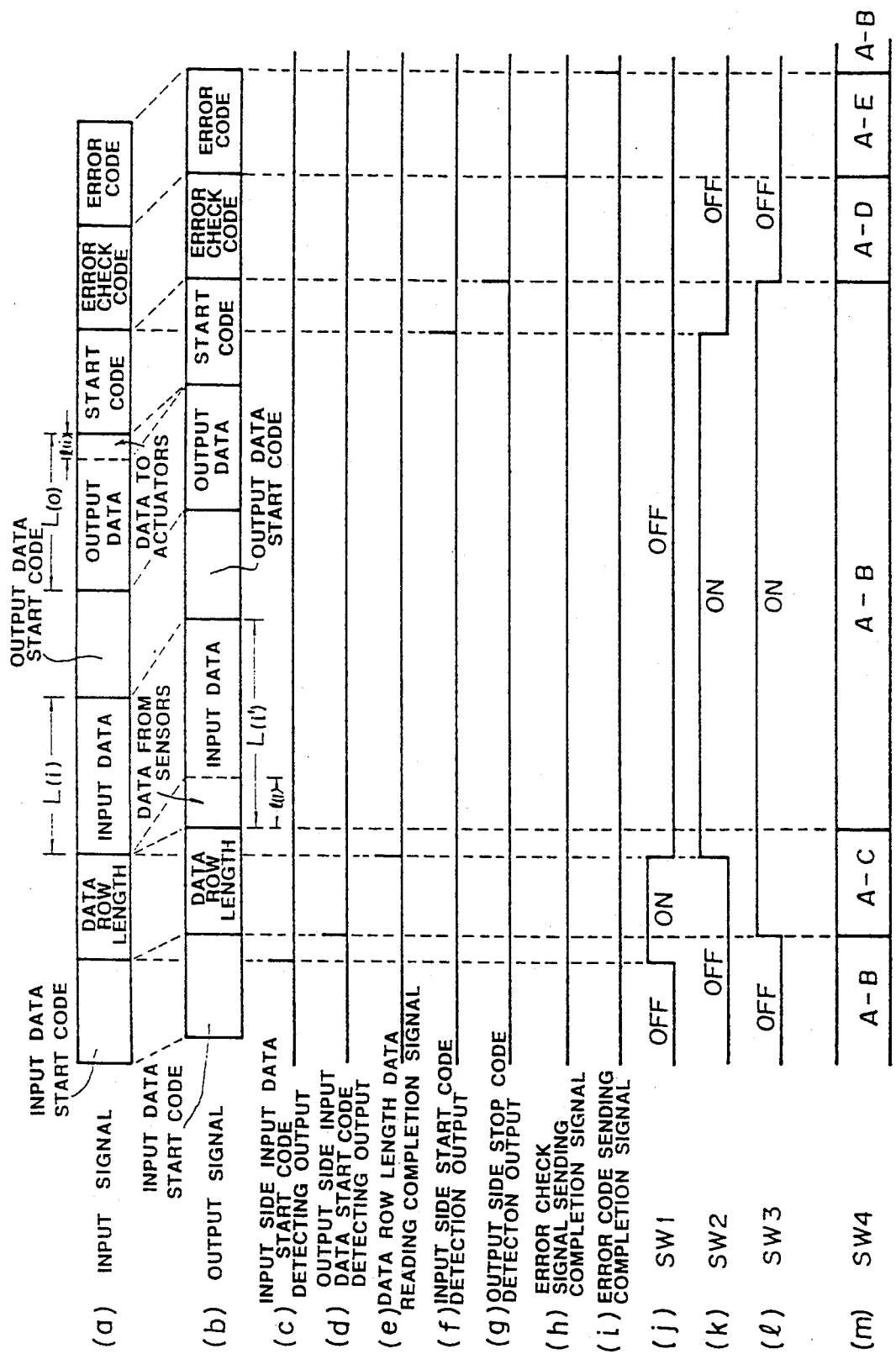
Figure 18:
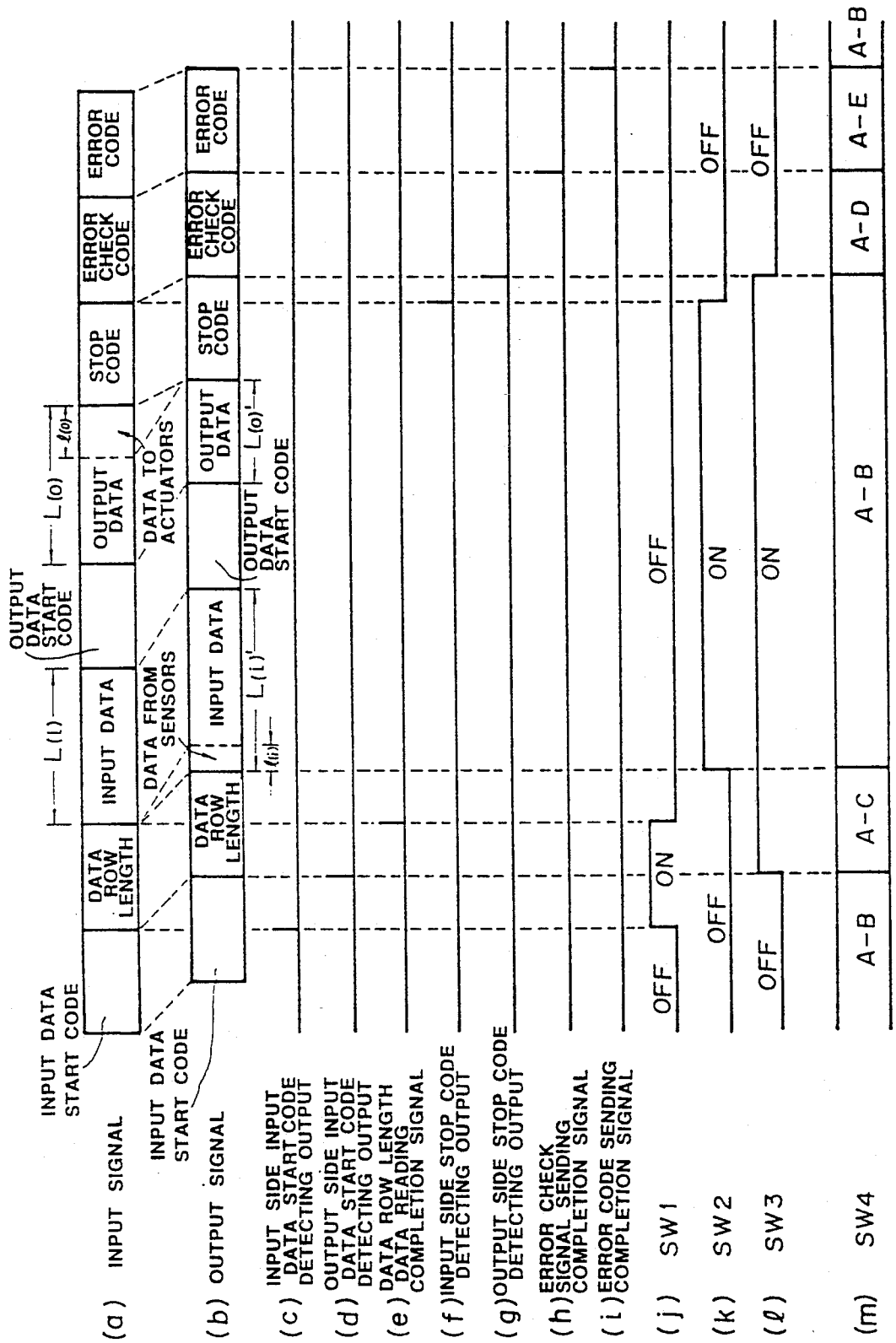

Operations to be performed in accordance with this embodiment in a case where a data bit length l(i) from the group of sensors 1 to be added to the input data is larger than a data bit length l(o) comprising data extracted from the output data to be outputted to the group of actuators 2, i.e.,(l(i)>l(o)) are illustrated by a plurality of timing charts in FIG. 17. Further, operations to be performed in accordance with this embodiment in a case where the data bit length l(i) from the group of sensors 1 is smaller than the data bit length l(o) comprising data extracted from the output data to be outputted to the group of actuators 2, i.e. (l(i)<l(o)) are illustrated by a plurality of timing charts in FIG. 18. Here, the timing charts shown in FIG. 17 are identical to those shown in FIG. 5 with the exception that the data shown in FIG. 5 are divided into input data and output data with the output start code interposed therebetween. Similarly, the timing charts shown in FIG. 18 are identical to those shown in FIG. 6 with the exception that the data shown in FIG. 5 are divided into input data and output data with the output data start code interposed therebetween. Referring to FIGS. 17 and 18, the switch SW2 is shifted to ON within a range from the fore end of input data to the rear end of a stop code, and the data row length counter 15 counts a data row length within this range. But, since a bit length of the output data start code and a bit length of the stop code are known, the data row length counter 15 counts a data row length representing a sum of the data row length L(i) of input data and the data row length L(o) of output data. According to this embodiment, a data row length abnormality is detected in dependency on whether or not the data row length representing the data row length data to be inputted subsequent to the input data start code coincides with a data row length representing a sum of the actually counted input data and the aforementioned input data.

Figure 19:
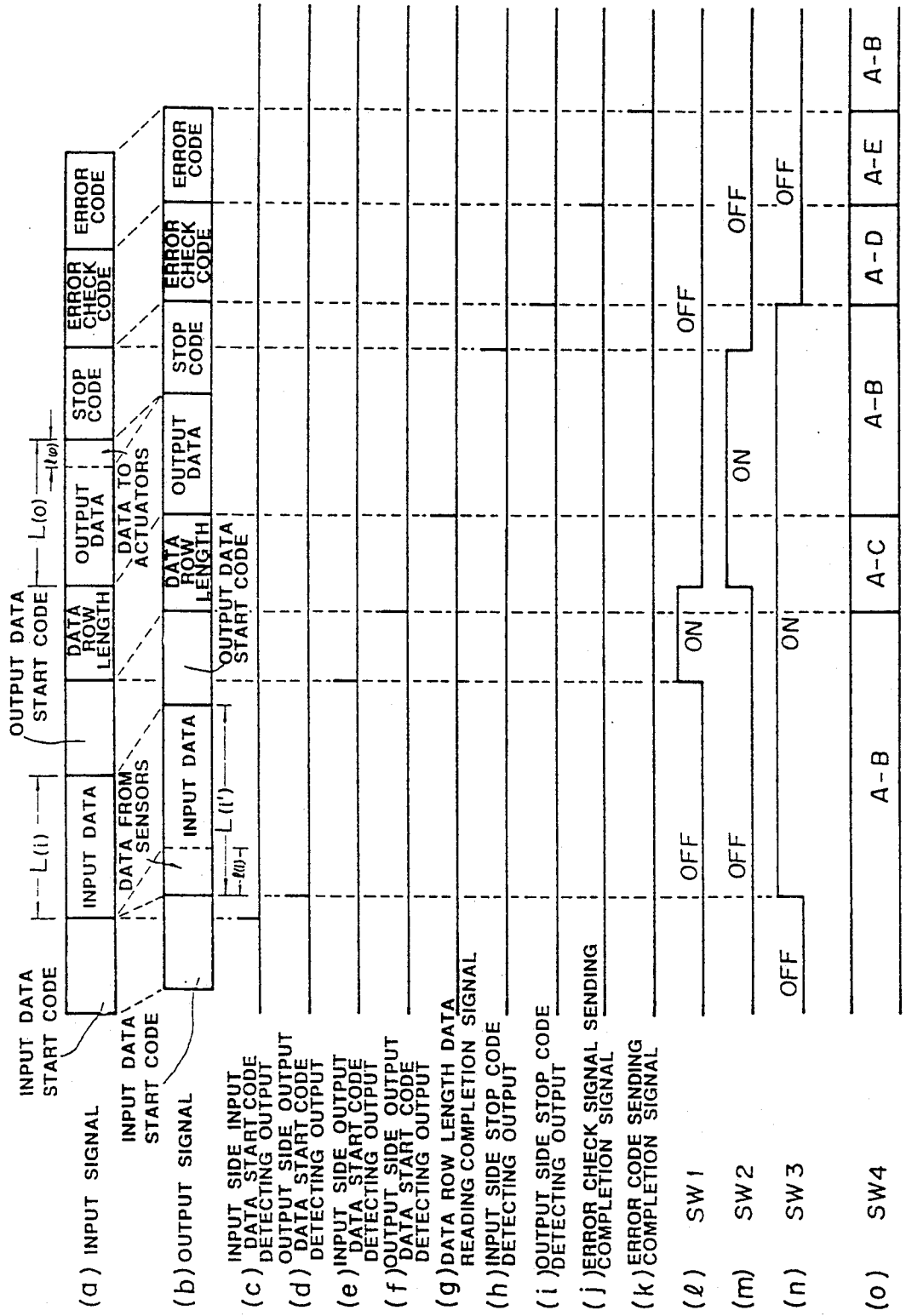
Figure 20:
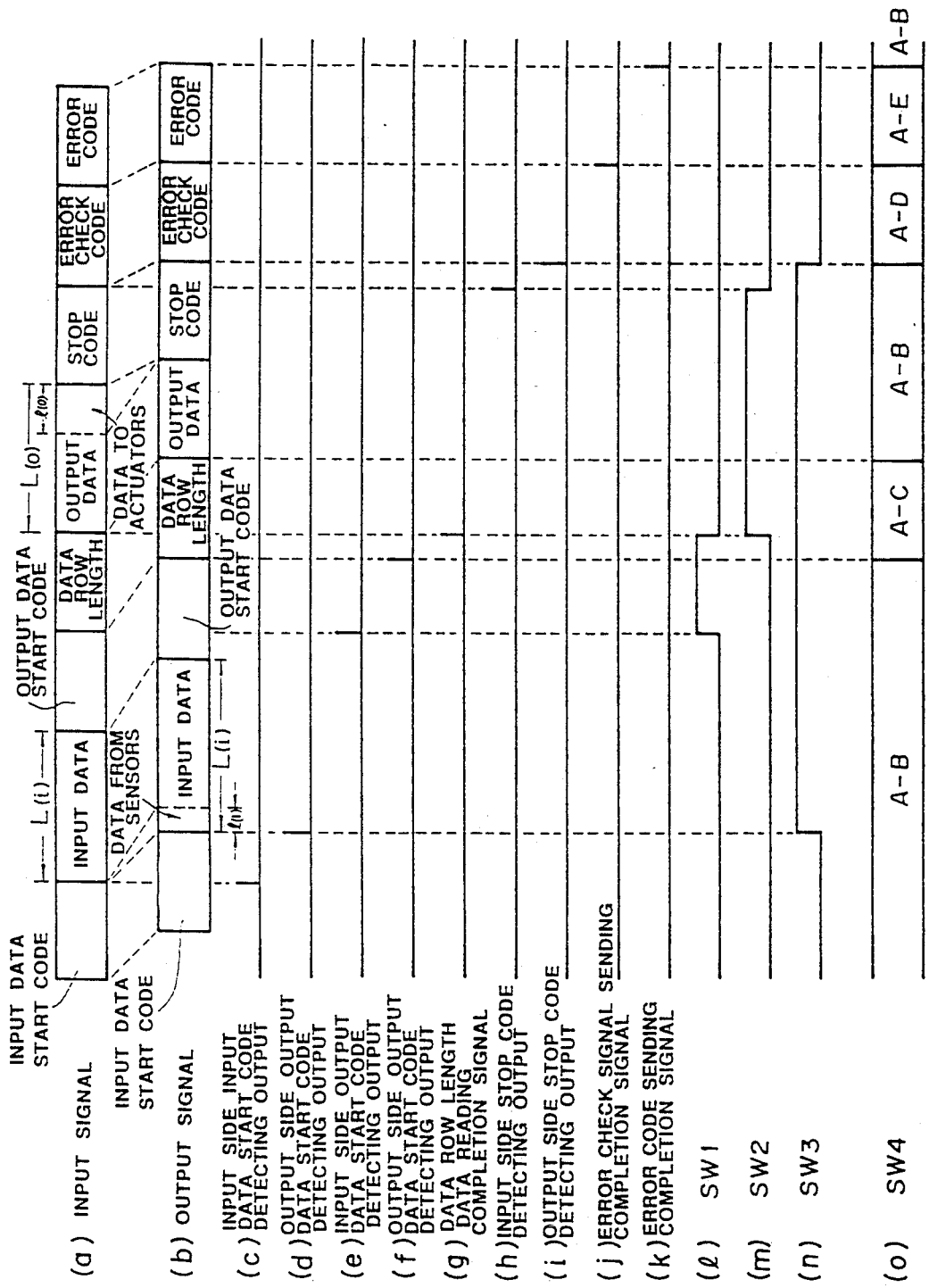

FIG. 19 illustrates operations to be performed in accordance with another embodiment of the present invention in a case where signals each having a frame structure as shown in FIG. 19(a) are used under a condition of l(i) >l(o), while FIG. 20 illustrates operations to be performed in accordance with another embodiment of the present invention in a case where signals each having a frame structure as shown in FIG. 20(a) are used under a condition of l(i)<l(o). In these cases, the data row length data correspond only to the data row length L(o) of the output data. According to this embodiment, a data row length abnormality is detected in dependency on whether nor not the data row length representing the data row length data coincides with the data row length of the actually counted output data. Further, according to this embodiment, the switch SW1 is shifted to ON (see FIG. 19 (l) or FIG. 20 (l)) for a period of time from the time when the input side output data start code detection output (see FIG. 19 (e) or FIG. 20 (e)) is generated from the output data start code detecting circuit 12b, till the time when the data row length data reading completion signal (see FIG. 19 (g) or FIG. 20 (g)) is generate length setting circuit, whereby the data row length data are read in the data row length data setting circuit 14. On the other hand, the switch SW2 is shifted to ON (see FIG. 19 (m) or FIG. 20 (m)) for a period of time from the time when the data row length data reading completion signal is generated, till the time when a stop code is detected in the stop code detecting circuit 13 see FIG. 19 (e) or FIG. 20 (e)), whereby the data row length counter 15 is activated for this period of time to count the output data row length L(0).

The switch SW4 is shifted from the state (A-B) to the state (A-C) in response to the output side output data start code detection output (see FIG. 19 (f) or FIG. 20 (f)) from the output data start code detecting circuit 24. Then, the switch SW4 is shifted from the state (A-C) to the state (A-B) after time elapses by a bit length of the data row length data (e.g., 8 bits) from generation of the output side output data start code detection output. Further, the switch SW4 is then shifted from the state (A-B) to the state (A-D) in response to the output side stop code detection output (see FIG. 19 (i) or FIG. 20 (i)) from the stop code detecting circuit 24. Operations to be performed thereafter are identical to those shown, in FIGS. 5 and 6.

The timing charts shown in FIGS. 19 and 20 illustrate the structure of a node with which only a data row length abnormality of output data is detected. Alternatively, the node structure may be modified such that only a data row length abnormality of input data is detected in the same manner as mentioned above. In this case, modification may be made such that data row data are set using signals each having such a frame structure, e.g., as shown in FIG. 17(a) so as to show only a data row length of the data row length data and the switch SW2 is shifted to ON for a period of time from the time when a data row length data reading completion signal is generated, till the time when an output data start code is detected so that the date row length counter 15 is activated for the above period of time to count only a data row length of the input data.

Figure 21:
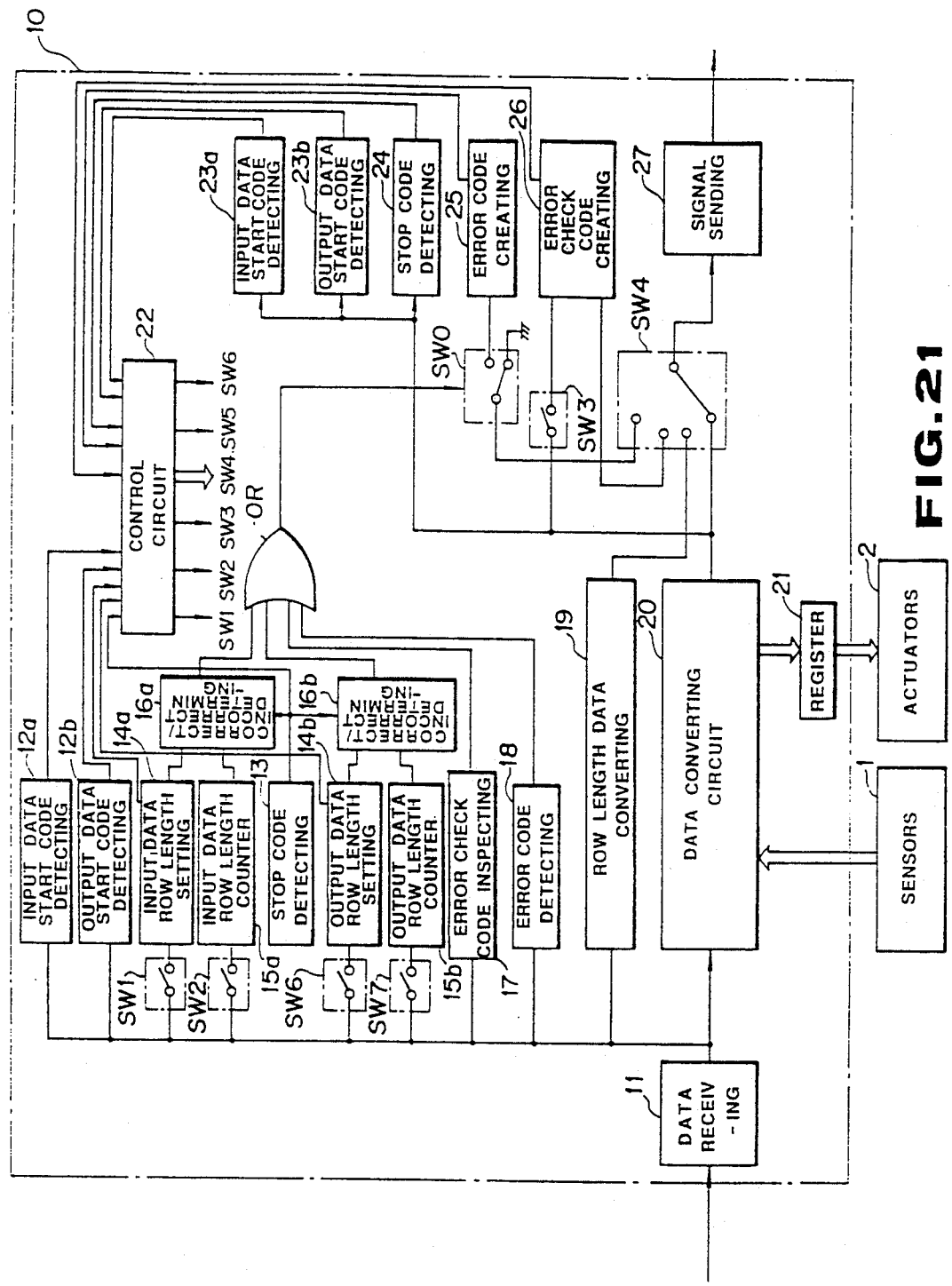
FIG. 21 is a block diagram which schematically illustrates by way of example the structure of a node for the apparatus in accordance with another, embodiment of the present invention.

FIG. 21 is a block diagram which schematically illustrates the structure of a node in accordance with another embodiment of the present invention which is constructed using signals each having such a frame structure as shown in FIG. 22(a). In this case, as shown in FIG. 22(a), two kinds of data row length data, i.e., input data-data row length data and output data-data row length data are introduced into the node structure, whereby a data row length abnormality of the input data and a data row length abnormality of the output, data can be checked separately.

With the node structure shown in FIG. 21, an input data-data row length setting circuit 14a and an output data-data row length setting circuit 14b are substituted for the data row length setting circuit 14 in FIG. 16, an input data-data row length counter 15a and an output data-data row length counter 15b are substituted for the data row length counter 15 in FIG. 16 and an input data-data row length correct/incorrect determining circuit 16a and an output data-data row length correct/incorrect determining circuit 16b are substituted for the data row length correct/incorrect determining circuit 16 in FIG. 16. In addition, a switch SW6 is disposed on the input side of the output data-data row length setting circuit 14b and a switch SW7 is disposed on the input side of the output data-data row length counter 15b.

Figure 22:
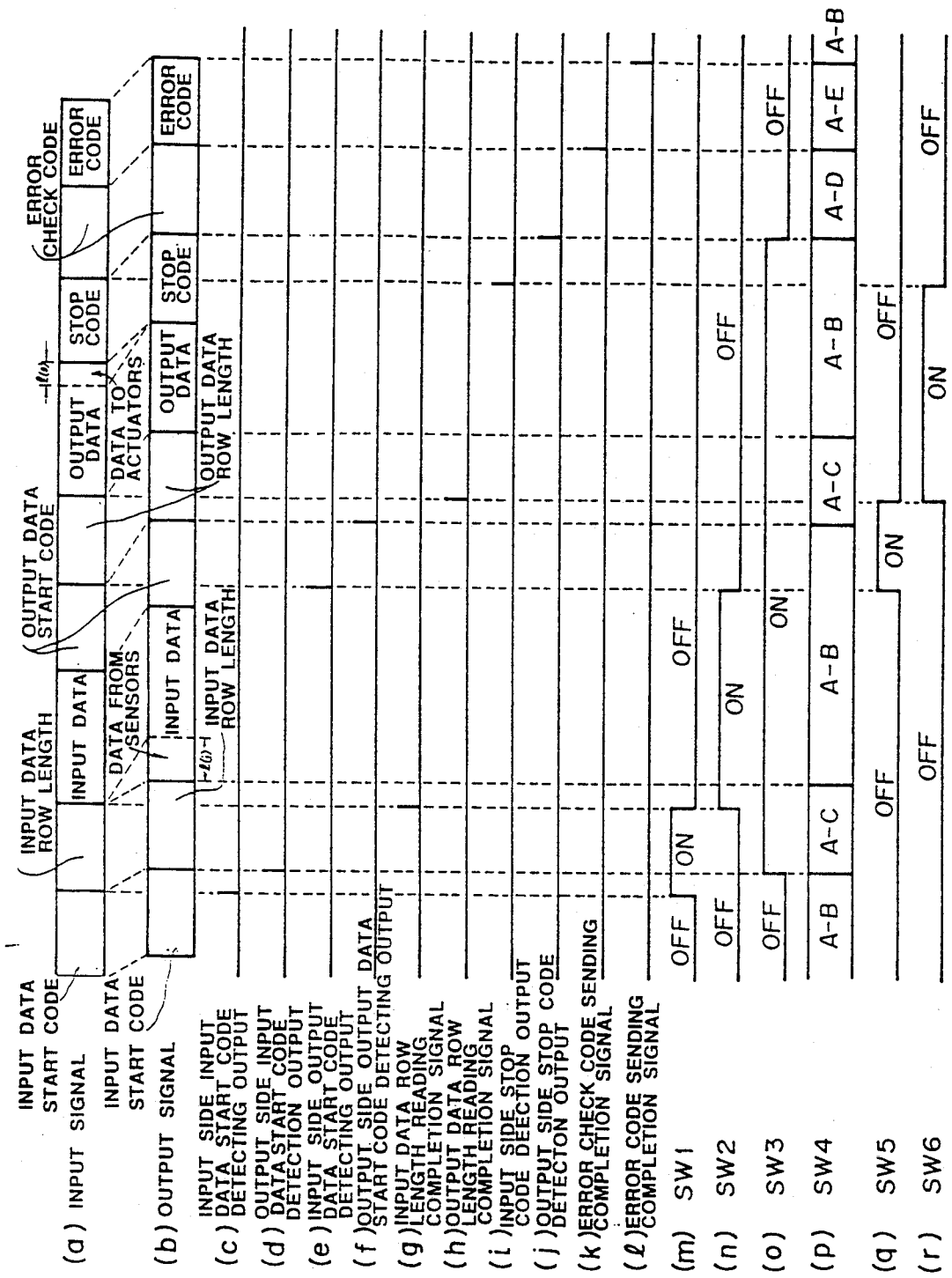
Figure 23:
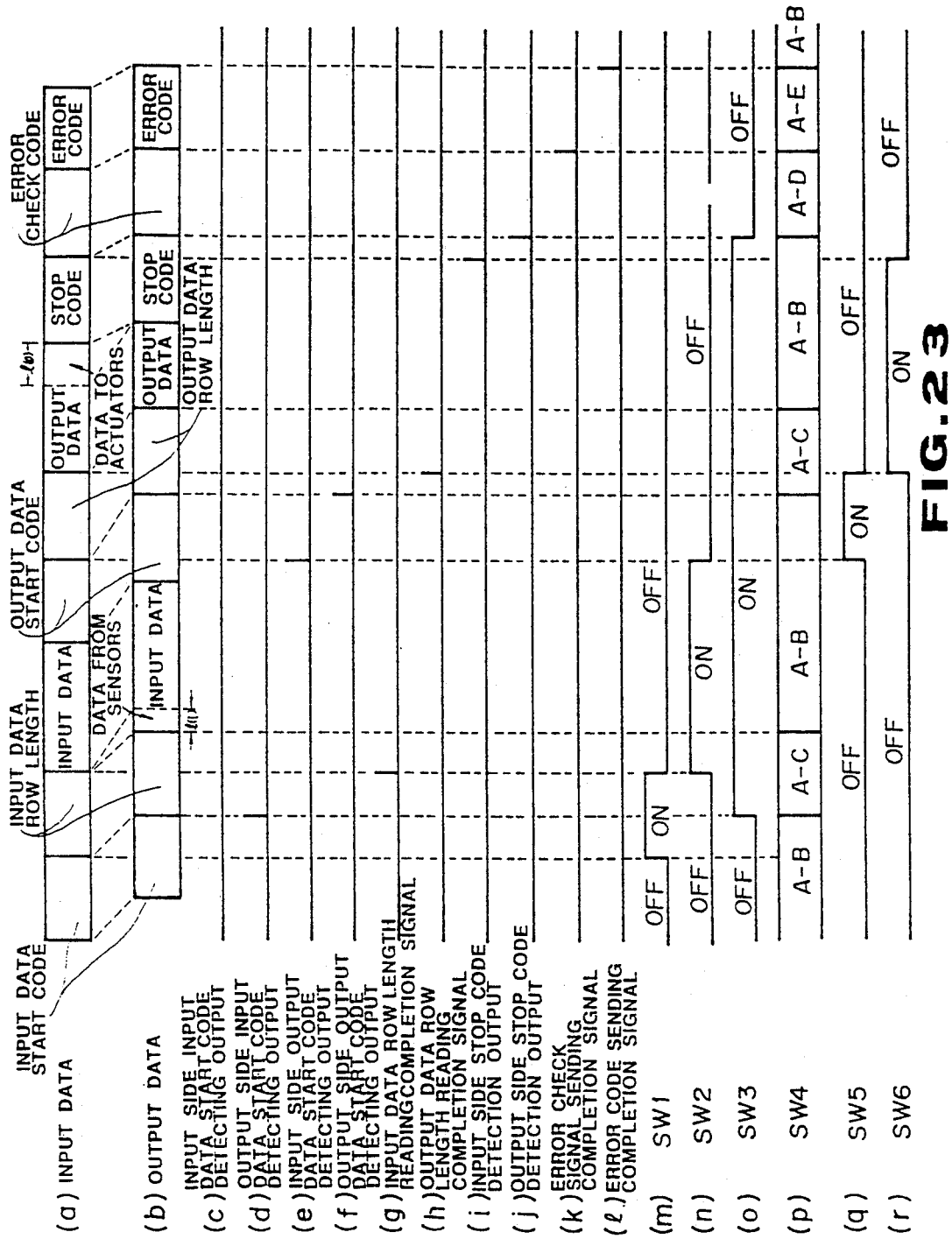

Operations to be performed at the node in accordance with the embodiment shown in FIG. 21 are illustrated in FIGS. 22 and 23. Here, FIG. 22 illustrates a case where a data row length l(i) of data to be added is larger than a data row length l(o) of data to be extracted, i.e., (l(i) > l(0)) and FIG. 23 illustrates a case where the data row length (i) to be added is smaller than the data row length l(0) of data to be extracted, i.e., (l(i) < l(o)).

According to this embodiment, the switch SW1 is shifted to ON (see FIG. 22(m) or FIG. 23(m)) for a period of time from the time when the input side input data start code detection output is generated from the input data cord detecting circuit 12a (see FIG. 22(c) or FIG. 23(c)), till the time when the input data-data row length data reading completion signal is outputted from the input data-data row length setting circuit 14a (see FIG. 22(g) or FIG. 23(g)) so that the input data-data row length data are read in the input data-data row length setting circuit 14a. On the other hand, the witch SW6 is shifted to ON (see FIG. 22(g) or FIG. 23(g)) for a period of time from the time when the input side data start code detected output is generated from the output data start code detecting circuit 12b (see FIG. 22(e) or FIG. 23(e)), till the time when the output data-data row length reading completion signal is outputted from the output data-data row length setting circuit 14b (see FIG. 22(h) or FIG. 23(h)) so that the output data-data row length data are read in the output data-data row length setting circuit 14b. The switch SW2 is shifted to ON (see FIG. 22(n) or FIG. 23(n)) for a period of time from the time when the input data-data row length reading completion signal is generated, till the time when the input side output data start code detection output is generated from the output data start code detecting circuit 12b (see FIG. 22(e) or FIG. 23(e)) so that the input, data-data row length counter 15a is activated for the above period of time to count a data row length of the input data-data. The switch SW7 is shifted to ON (see FIG. 22(r) or FIG. 23(r)) for a period of time from the time when an output data-data row length reading completion signal is generated (see FIG. 22(h) or FIG. 23(h)), till the time when the input side stop code detection output is generated from the stop code detecting circuit 13 (see FIG. 22(i) or FIG. 23(i)) so that the output data data row length counter 15b is activated for the above period of time to count a data row length of the output data-data row length.

The input data-data row length correct/incorrect determining circuit 16a compares the output from the input data-data row length setting circuit 14a with the output from the input data-data row length counter 15a, and if it is found that the both outputs do not coincide with each other, this non-coincidence is detected as an input data-data row length abnormality. Further, the output data-data row length correct/incorrect determining circuit 16b compares the output from the output data-data row length setting circuit 14b with the output from the output data-data row length counter 15b, and if it is found that the both outputs do not coincide with each other, this non-coincidence is detected as an output data-data row length abnormality.

In case where an input data-data row length abnormality is detected by the input data-data row length correct/incorrect determining circuit 16a or in case where an output data-data row length abnormality is detected by the output data-data row length correct/incorrect determining circuit 16b or in case where a code error is detected by the error check code detecting circuit 17 or in case where an error code is detected by the error code detecting circuit 18, an output from the OR circuit OR is raised up to a high level, whereby the switch SW0 is shifted to the error code detecting circuit 18 side and an error code is added to each output signal. Other operations to be performed in accordance with this embodiment are identical to those shown in FIG. 16.

Figure 24:
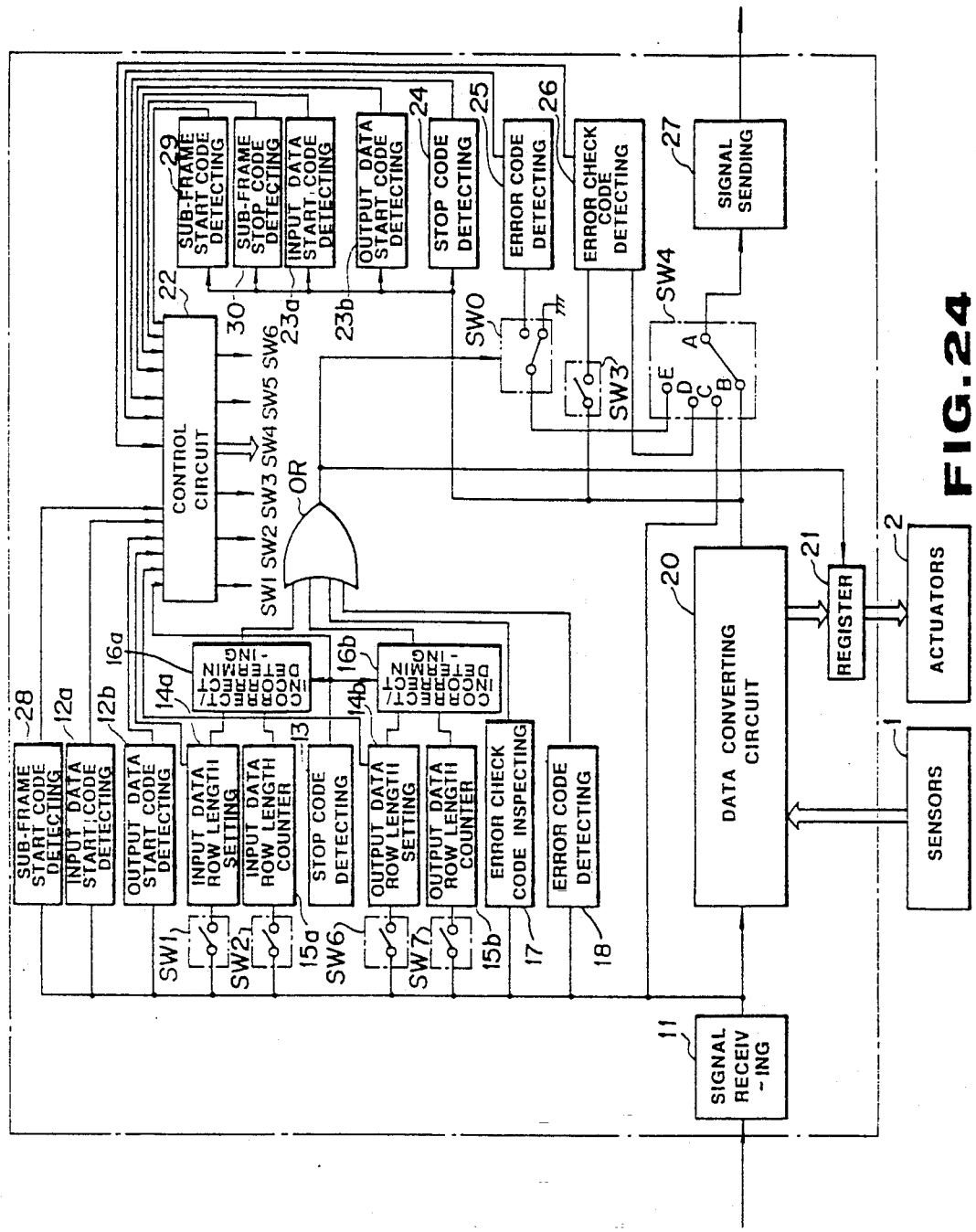
FIG. 24 is a block diagram which schematically illustrate by way of example the structure of a node for the apparatus in accordance with another embodiment of the present invention.

FIG. 24 is a block diagram which schematically illustrates the structure of a node in accordance with another embodiment of the present invention wherein input data-data row length data and output data-data row length data are delivered to each node using signals each having a sub-frame structure different from signals each having a main frame structure. This embodiment is identical to the embodiment shown in FIG. 21 with the exception that input data-data row length data are removed from signals each having a main frame structure, that the data row length data converting circuit 19 is removed, and an output from the signal receiving circuit 11 is connected directly to the contact C of the switch SW4 and that input data-data row length data and output data-data row length data are delivered to each node using signals each having a sub-frame structure as shown in FIG. 27(a).

The node structure shown in FIG. 24 is such that a sub-frame start code detecting circuit 28, a sub-frame start code detecting circuit 28 and a sub-frame stop code detecting circuit 30 are provided in addition to the node structure shown in FIG. 21.

Figure 25:
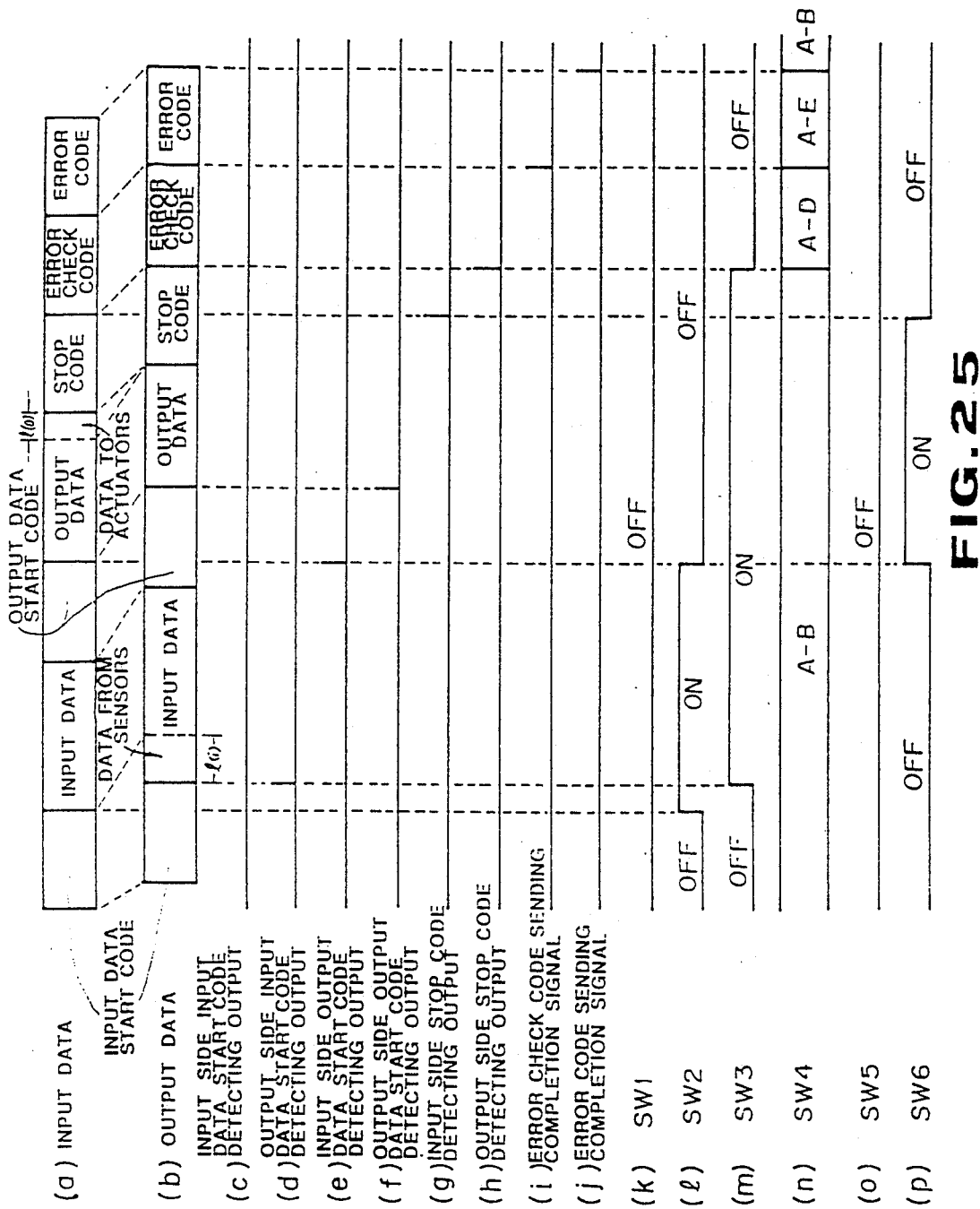
Figure 26:
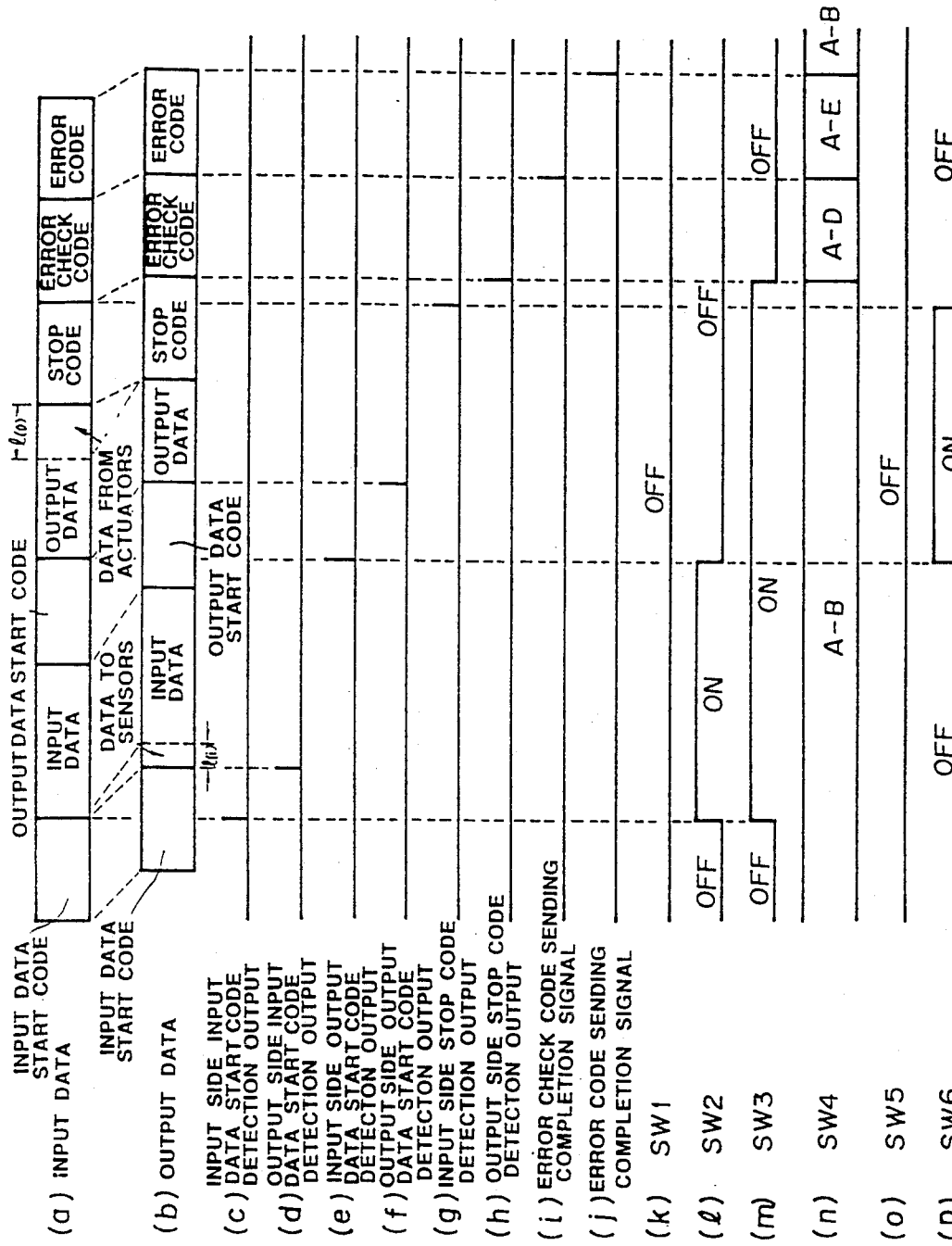

FIGS. 25 and 26 show a plurality of timing charts, respectively, which illustrate operations to be performed at each node when signals each having a main frame structure are inputted into the node in accordance with this embodiment. FIG. 25 illustrates operations to be performed in case where a data row length l(i) of data to be added to an input data region is larger than a data row length l(o) of data to be extracted from an output data region and FIG. 26 illustrates operations to be performed in case where the data row length l(i) of data to be added to the input data region is smaller than the data row length l(o) of data to be extracted from the output data region. The timing charts shown in FIGS. 25 and 26 are basically identical to those shown in FIGS. 22 and 23 with the exception that input data-data row length data and output data-data row length data are processed. In detail, referring to FIGS. 25 and 26, since input data-data row length data and output data-data row length data are not included in each input signal, the switch SW1 and the switch SW6 are kept in such a state that they are shifted to OFF (see FIGS. 25 (k) and (o) or FIGS. 26(k) and (o)) so that input data-data row length data are not read in the input data-data row length setting circuit 14a and output data-data row length data are not read in the output data-data row length setting circuit 14b.

The switch SW2 is shifted to ON for a period of time from the time when the input side input data start code detected output (see FIG. 25(c) or FIG. 26(c)) is generated from the input data start code detecting circuit 12a, till the time when the input side output data start code detection output (see FIG. 25(e) or FIG. 26(e)) is generated from the output data start code detecting circuit 12b, whereby an input data-data row length is counted by the input data-data row length counter 15a. The switch SW7 is shifted to ON for a period of time from the time when the input side output data start code detected output is generated, till the time when an input side stop cord signal (see FIG. 25(g) or 26(g)) is generated from the stop code detecting circuit 13 so that the output data-data row length is counted by the output data-data row length counter 15b. The switch SW4 is not shifted to the state (A-C).

Figure 27:
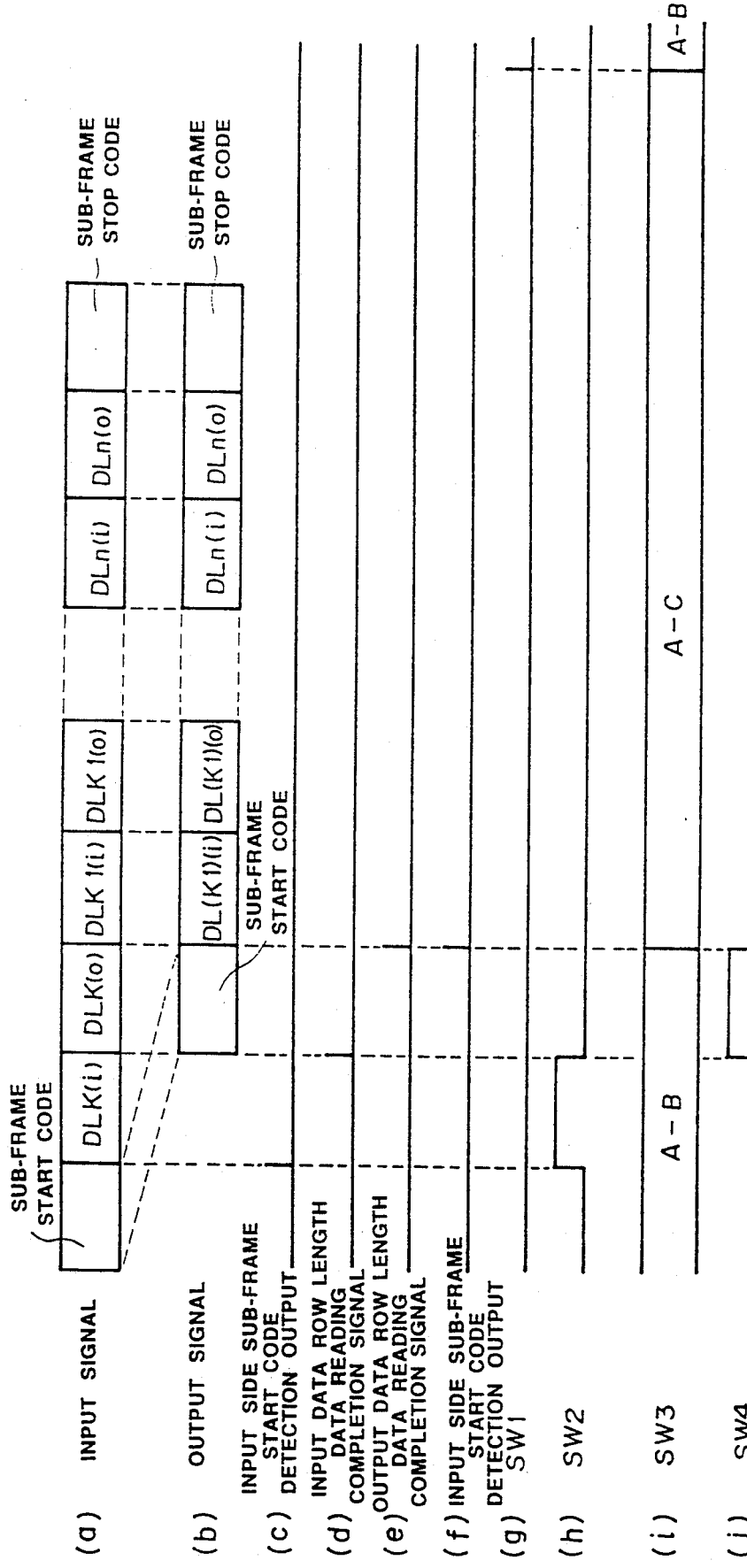

FIG. 27 shows a plurality of timing charts which represent operations to be performed at each node in accordance with this embodiment in case where signals each having a sub-frame structure as shown in FIG. 27(a) are inputted into the node. Operations to be performed in response to the signals each having a sub-frame are basically identical to those described above with reference to FIGS. 12 and 13. In this case, however, since signals each having a sub-frame structure include two kinds of data row length data, i.e., input data-data row length data and output data-data row length data to be delivered to each node, as shown in FIG. 27(a), an operation of reading respective data row length data is different from that shown in FIGS. 12 and 13. Specifically, referring to FIG. 27, the switch SW1 is shifted to ON for a period of time from the time when the input side sub-frame start code detection output (see FIG. 27(c)) is outputted from the sub-frame start code detecting circuit 28, till the time when the input data-data row length data reading completion signal (see FIG. 27(d)) is generated from the sub-frame start code detecting circuit 28, whereby the input data-data row length data DLK(i) corresponding to this node are read from the input signals each having a sub-frame structure (see FIG. 27(a)) in the input data-data row length setting circuit 14a. The switch SW7 is shifted to ON for a period of time from the time when the input data-data row length data reading completion signal is generated, till the time when the output data-data row length reading completion signal (see FIG. 27(e)) is generated from the output data-data row length setting circuit 14b, whereby the output data-data row length data DLK(o) corresponding to this node are read from the input signals each having a sub-frame structure (see FIG. 27(a)) in the output data-data row length setting circuit 14b. In this case, the data converting circuit 20 is constructed such that the inputted input signals each having a sub-frame structure (see FIG. 27(a)) are outputted with delay by the data row length corresponding to own node, i.e., the bit number corresponding to the data row length representing a sum of the input data-data row length data and the output data-data row length data. Thus, the switch SW4 is shifted from the state (A-B) to the state (A-C) in response to the output side sub-frame start code detection output from the sub-frame start code detecting circuit 29 and it is then shifted from the state (A-C) to the initial state (A-B) in response to the output side sub-frame stop code detection signal from the sub-frame stop code detecting circuit 30.

Figure 28:
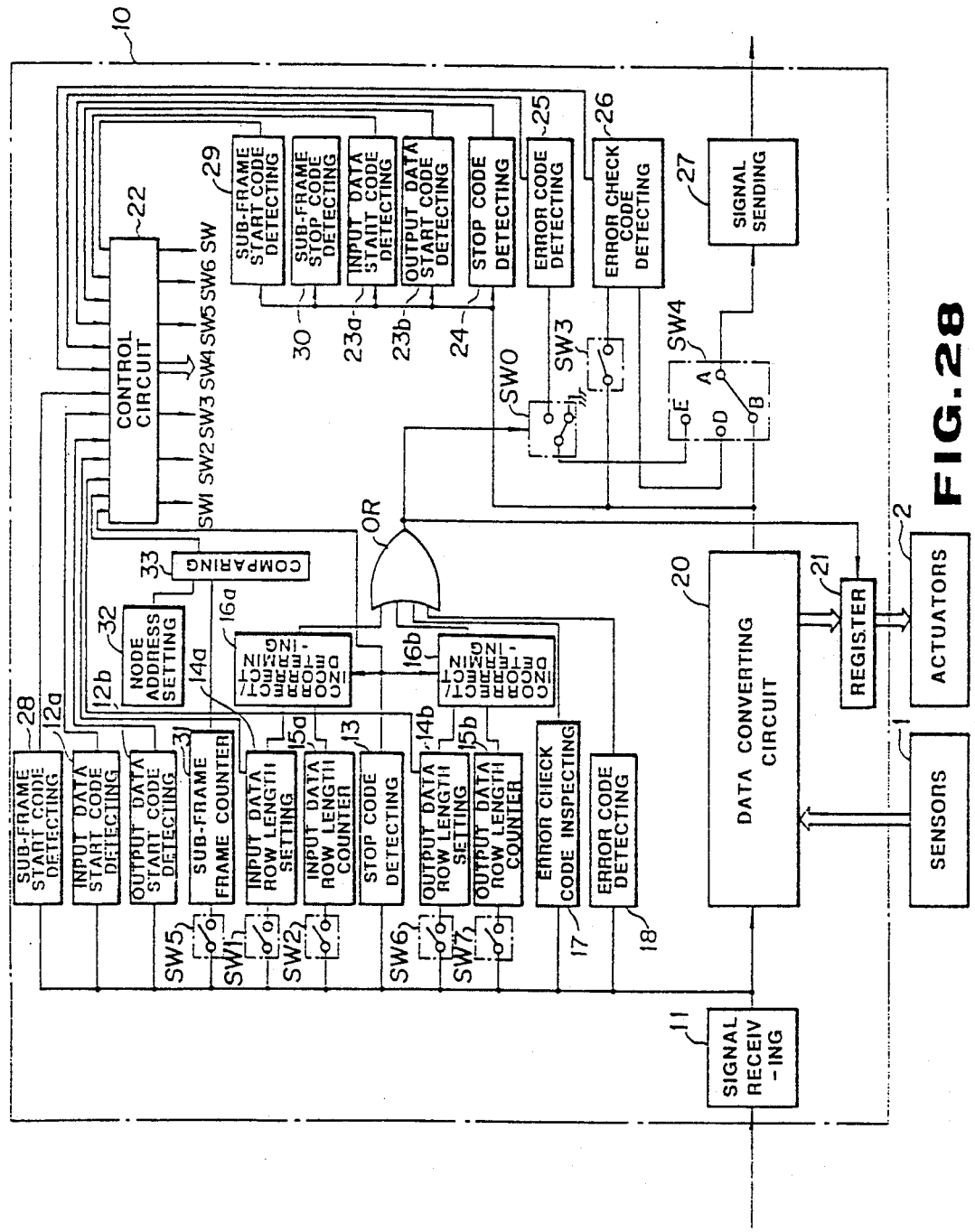
FIG. 28 is a block diagram which schematically illustrates by way of example the structure of a node for the apparatus in accordance with another embodiment of the present invention.

FIG. 28 is a block diagram which schematically illustrates the structure of a node in accordance with another embodiment of the present invention wherein the input data-data row length data and the output data-data row length data are delivered to each node in response to signals each having a sub-frame structure. According to this embodiment, a node address allocated to each node is set in the node address setting circuit 32 and the input data row length data and the output data row length data corresponding to each node are read from the input signals each having a sub-frame structure (see FIG. 29(a)) in the node using the above-described node address.

Operations to be performed at each node in accordance with this embodiment, in case where input signals each having a main frame structure are added, are identical to those represented by the timing charts in FIGS. 25 and 26.

Figure 29:
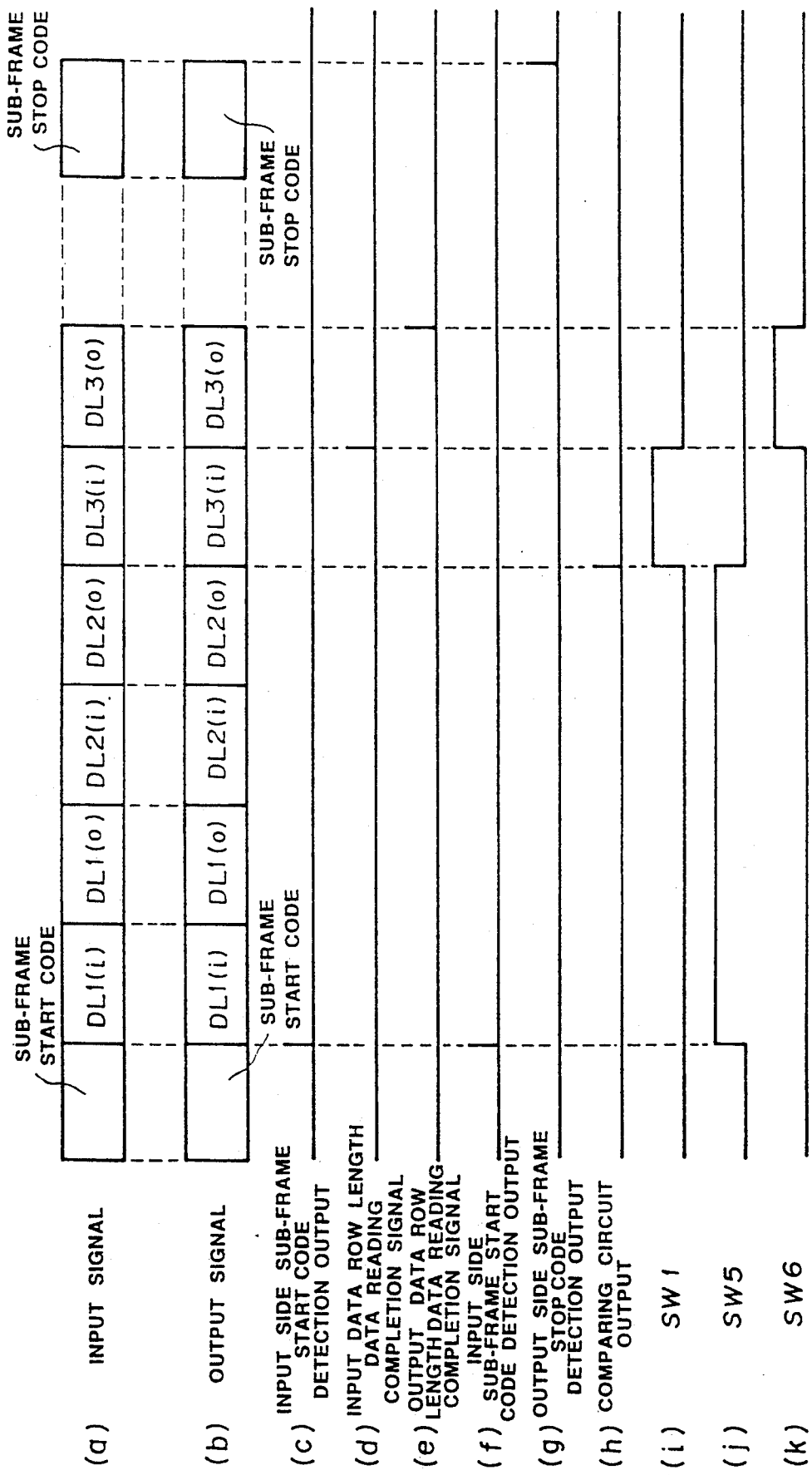
FIG. 29(a)-(k) show a plurality of timing charts which illustrate operations to be performed at the node shown in FIG. 28.

FIG. 29 shows a plurality of timing charts which represent operations to be performed at each node in accordance with this embodiment in case where input signals each having a sub-frame structure are added. Operations to be performed in response to the input signals each having a sub-frame structure are basically identical to those described above with reference to the timing charts in FIG. 15. In this case, however, since two kinds of data row length data, i.e., input data-data row length data and output data-data row length are used, an operation of the sub-frame counter 31 and operations of the input data-data row length setting circuit 14a and the output data-data row length setting circuit 14b are different from those in the case as shown in FIG. 15. Specifically, when an input side sub-frame start code detected output is outputted from the sub-frame start code detecting circuit 28 (see FIG. 29(c)), the switch SW5 is shifted to ON (see FIG. 29(f)) so that the sub-frame counter 31 starts its operation. According to this embodiment, however, since two kinds of data row length data, i.e., input data-data row length data and output data-data row length data are set to each node, the sub-frame counter 31 counts up by one count unit on detection of two data frames, i.e., a frame to which the input data-data row length data are allocated and a frame to which the output data-data row length data are allocated. In this case, a node 10 shown in FIG. 28 corresponds to a third node and data corresponding to "3" are set to the node address setting circuit 32. Thus, a coincidence signal (see FIG. 29(h)) is generated from the comparison circuit 33 in such a timing that the input data-data row length data corresponding to the third node are inputted thereinto, whereby the switch SW5 is shifted to OFF and the switch SW1 is shifted to ON. The switch SW1 is kept in such an operative state that it is shifted to ON, until an input data-data row length data reading completion signal (see FIG. 29(d)) is generated from the input data-data row length setting circuit 14a, whereby the input, data-data row length data DL3(i) corresponding to the node 10 are read from input signals each having a sub-frame structure (see FIG. 29(a)) in the input data-data row length setting circuit 14a. On the other hand, the switch SW6 is shifted to ON for a period of time from the time when the input data-data row length data reading completion signal is generated, till the time when the output data-data row length data reading completion signal (see FIG. 29(e)) is generated from the output data-data row length setting circuit 14b, whereby the output data-data row length data DL3(o) corresponding to the node 10 are read from the input signals (see FIG. 29(a)) in the output data-data row length setting circuit 14b.

This embodiment has been described above as to the node structure wherein data in a data region receive a predetermined coding so as to easily distinguish the start code and the stop code from the data in the date region or "0" is inserted per each predetermined number of bits. In such a case, however, there arises a problem that the data row length in the data region is elongated, resulting in a reduced transmission efficiency. For example, in the case of a coding structure wherein "0" is modified to "01" and "1" is modified to "10", a data row length in the data region is doubled in comparison with the case where no coding is effected.

Figure 30:
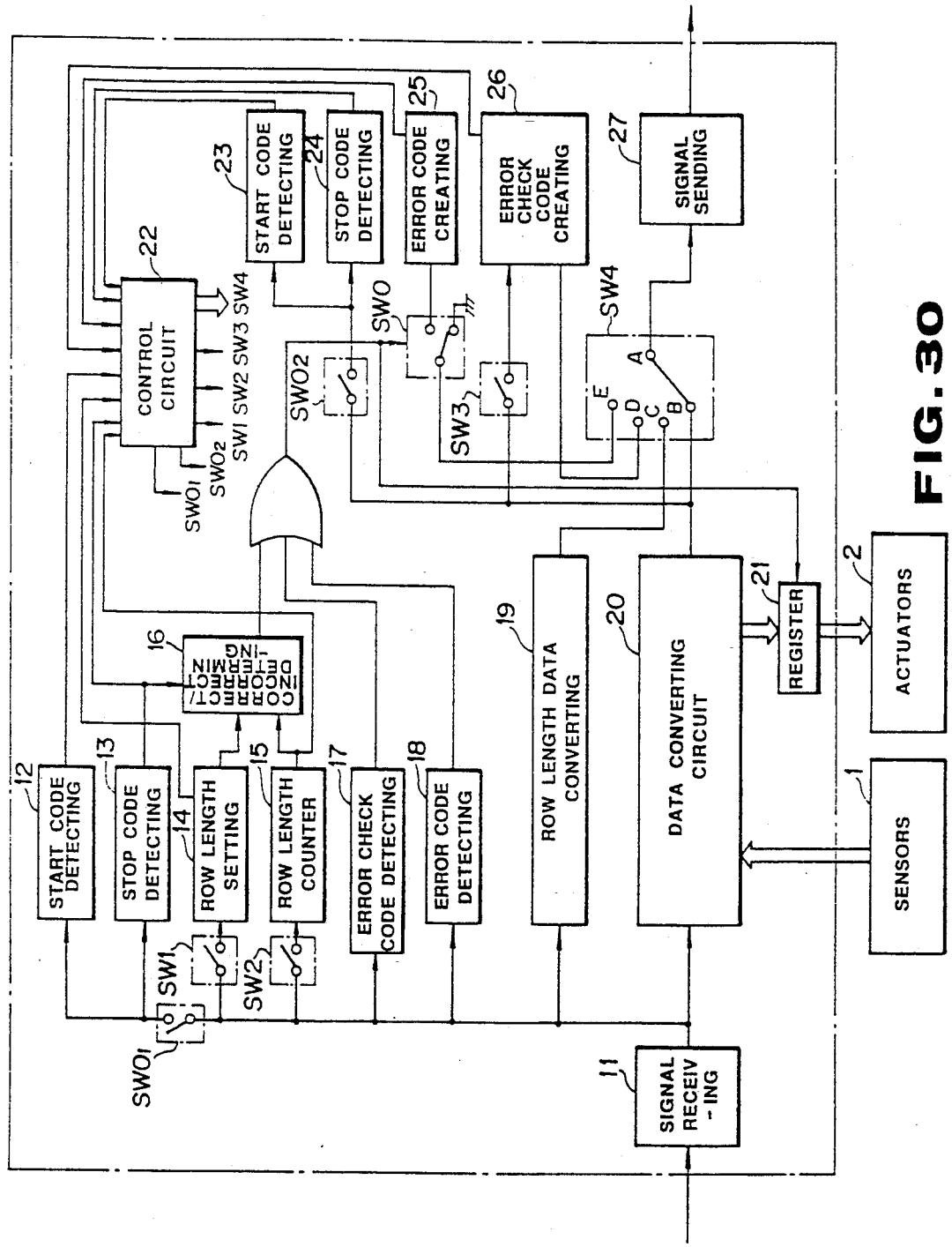
FIG. 30 is a block diagram which schematically illustrates by way of example the structure of a node for the apparatus in accordance with another embodiment of the present invention.

FIG. 30 is a block diagram which schematically illustrates the structure of a node in accordance with another embodiment of the present invention. According to this embodiment, in view of the fact that data row length data are given to each node, a switch SW01 and a switch SW02 are shifted to OFF during receiving of the data in the data region so that special code detecting circuits, i.e., start code detecting circuits 12 and 13 and stop code detecting circuits 13 and 24 become inoperative, respectively. This assures that the data in the data region are not required to receive a special coding, since there is no fear that the data in the data region are incorrectly detected as a special code. Consequently, the above-described node structure can prevent a transmission efficiency from being reduced due to elongation of the data row length.

Figure 31:
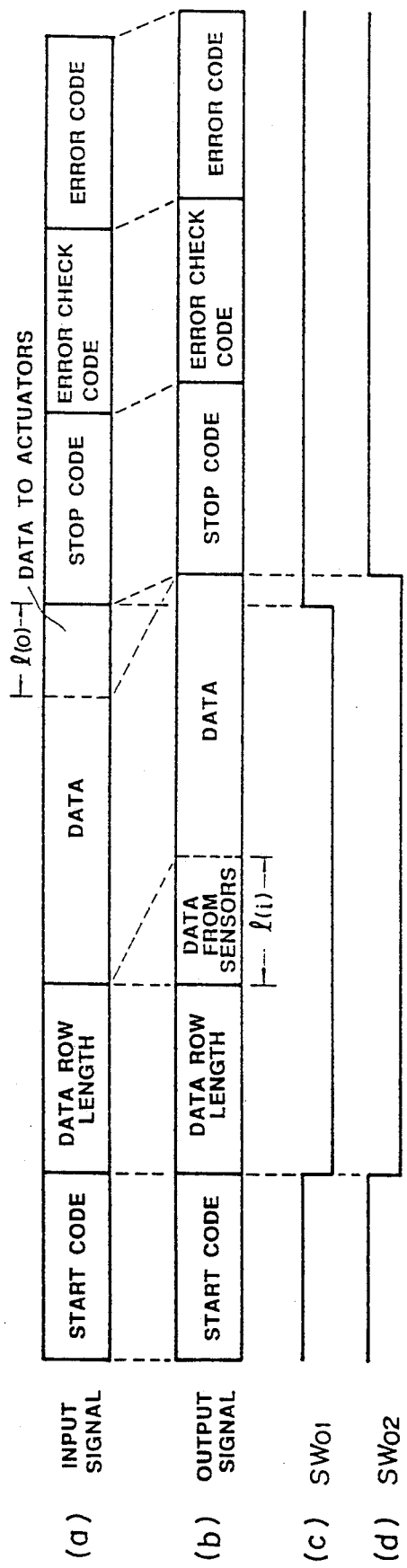
Figure 32:
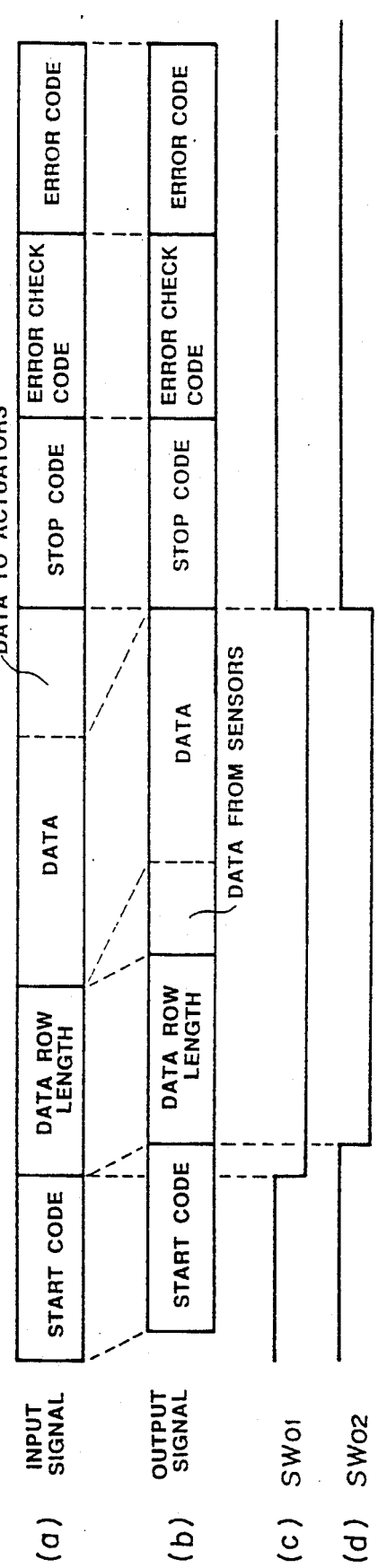

FIGS. 31 and 32 show a plurality of timing charts, respectively, which represent operations to be performed by the switch SW01 and SW02 in case where the aforementioned node structure is employed. Specifically, FIG. 31 shows a case where a data row length l(i) of data to be added to the data region is larger than a data row length l(o) of data to be extracted from the data region and FIG. 32 shows a case where the data row length l(i) of data to be added to the data region is smaller than the data row length l(o) of data to be extracted from the data region. The switch SW01 is shifted to OFF within the range from detection of a start code in response to the input signal see FIG. 31(a) or FIG. 32(a)) till the rear end of the data region (see FIG. 31(c) or FIG. 32(c)), and the start code detecting circuit 12 and the stop code detecting circuit 13 become inoperative within the above-described range. On the other hand, the switch SW02 is shifted to OFF within the region from detection of a start code in response to the output signal (see FIG. 31(b) or FIG. 32(b)) till the rear end of the data region (see FIG. 31(d) or 32 (d)), and the start code detecting circuit 23 and the stop code detecting circuit 24 become inoperative with the above-described range. Other operations to be performed in accordance with this embodiment are identical to those shown in FIG. 4.

The node structure in accordance with the embodiment shown in FIG. 30 is modified from the node structure shown in FIG. 4 such that when the input signals or the output signals remain within the data region and operations of the start code detecting circuit and the stop code detecting circuit both serving as a special code detecting circuit are inhibited. However, the present invention should not be limited only to this. Alternatively, the node structure shown in FIG. 30 may be modified from those shown in FIGS. 9, 14, 16, 21, 24 and 28 in the same manner as that shown in FIG. 4.

To practice the embodiment in, FIG. 30, signals each having a data frame as shown in FIG. 33(a) are used for the purpose of communication. In detail, the signal having a frame signal shown in the drawing is constructed such that a start code signal ST, a data row length data signal DL exhibiting a row length L of the subsequent data signal DATA (represented by a bit number), a data signal DATA, a stop code signal SP and an error code signal ERR exhibiting a variety of errors are arranged in such an order as shown in the drawing.

When signals each having such a data frame as shown in the drawing are used for the purpose of communication, the data row length code signal DL may exhibit the same signal pattern as that of the start code signal ST located just before the data row length code signal DL or the error code signal ERR may exhibit the same signal pattern as that of the stop code signal S located just before the error code signal ERR. For the reason, the signal receiving side should take an adequate measure for preventing incorrect detection of the data row length code signal DL as a start code or incorrect detection of the error code signal ERR as an error code. For example, the data signal DATA may be incapable of being exactly read, if it is detected incorrectly.

To prevent such incorrect detecting as mentioned above, a mask signal of which intensity is raised up to a high level for a period of time from a start time point $t_1$ of the data row length code signal DL to an end time point $t_2$ of the same as well as for a period of time from a start time point $t_3$ of the error code signal ERR to an end time point $t_4$ of the same may be formed, as shown in FIG. 33(b), in order to conceal the data row length code signal DL and the error code signal ERR thereby to correctly read the data signal DATA.

In this case, however, since the data row length code signal DL and the error code signal ERR are arranged before and behind the data signal DATA, an intensity of the mask signal should be raised up to a high level two times. Thus, there is a need of providing a pair of detecting circuits for detecting two start time pints $t_1$ and $t_3$ of the data row length code signal DL and the error code signal ERR and a pair of measuring circuits for measuring a length of the data row length code signal DL from the start time point $t_1$ till the end time point $t_2$ and a length of the error code signal ERR from the start time point $t_3$ till the end time point $t_4$ in the form of time lapse. However, provision of such circuits is disadvantageous from the viewpoint of simplification of circuit design.

To obviate the above disadvantage, according to an embodiment which will be described hereinbelow, a data row length code signal is arranged adjacent to other signal to be concealed in response to a mask signal, in accordance with a serial data communication system wherein at least the data row length code signal is concealed in response to the mask signal, when signals each having a data frame having at least a data signal and a data row length code signal exhibiting a length of the data signal arranged peripheral thereto are received. This embodiment assures that the start time point when an intensity of the mask signal is raised up to a high level and the end time point when an intensity of the mask signal is restored to a low level are required at one time.

According to this embodiment, receipt/delivery of data are executed using data frame signals each having a frame structure as shown in FIG. 34(a). In detail, the data frame signal is constructed such that a start code signal ST is placed in the first place and an input/output data signal DATA is arranged in such an order of input data (representing data received from the group of sensors) located behind the start code signal ST and output data (representing data to be delivered to the group of actuators) as shown in the drawing. According to this embodiment, the input data are always inserted just behind the start code ST and the output data are always extracted from the rearmost end of the data signal DATA. In this case, a data length variable system wherein no empty data bit is present is employed for the embodiment. Because of employment of the data length variable system, input data $D_{in}$, $D_{in-1}$—are not included in the data signal DATA immediately after the data frame signal is sent from the main controller 100. Further, when the data signal DATA is inputted into the main controller 100 via the respective nodes 10-1 to 10-n, no output data is present. A stop code signal SP is arranged behind the data signal DATA and a data row length code signal DL exhibiting a data row length L of the data signal DATA (representing a bit number) is arranged behind the stop code signal SP. An error signal ERR exhibiting a variety of errors is arranged behind the data row length code signal DL. The error code signal ERR can exhibit various kinds of contents of errors in dependency on the content of an error code. For example, one of the contents may be such that a data row length exhibited by the data row length code signal is compared with an actual data row length to determine whether the exhibited data row length coincides with the actual data row length or not and if noncoincidence is detected, it is displayed.

Figure 35:
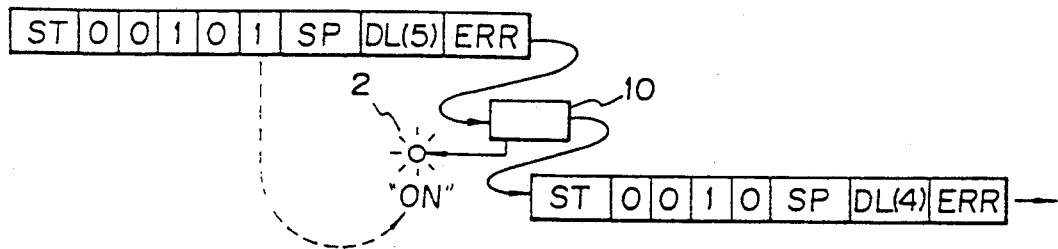
FIGS. 35 and 36 are an explanatory view, respectively, which illustrates a manner of adding data at each node as well as a manner of extracting data at each node for the apparatus in accordance with the embodiment shown in FIG. 30.
Figure 36:
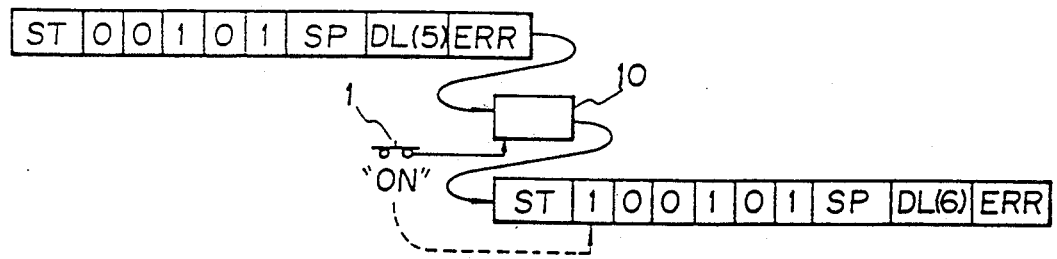

A manner of receiving and delivering the data at the respective nodes 10-1 to 10-n in case where data frame signals each having a frame structure as shown in FIG. 34(a) is illustrated in FIGS. 35 and 36.

FIG. 35 is an explanatory view which schematically illustrates input/output of a data frame signal relative to the node 10 including a single actuator 2. The inputted data frame signal is processed in the node 10 such that one bit is extracted from the rearmost end of a data signal DATA portion and the extracted one bit is added to the relevant actuator 2 arranged for the node 10. The data row length code signal DL is converted in the node 10 into a data row length code signal DL corresponding to a data row length of the remaining data with the rearmost data extracted (4 in the shown case) and thereafter a data frame signal is outputted.

FIG. 36 is an explanatory view which schematically illustrates input/output of a data frame signal relative to the node 10 including a single sensor 1. In this case, a signal detected by the sensor 1 ("1" in the shown case) is inserted in the node 10 at the fore end of the data signal DATA portion of the inputted data frame signal, and the data row length code signal DL is converted into a data row length code corresponding to the data row length which has increased by inserting the detected sensor signal. Thereafter, the data frame signal is outputted.

Referring to FIG. 34(a) again, sometimes the data row length code signal DL and the error code signal ERR may exhibit the same signal pattern as that of the start code signal St or the stop code signal SP. To prevent an occurrence of such malfunction, the data row length code signal DL and the error code signal ERR are concealed in response to the mask signal as shown in FIG. 34(b). According to this embodiment, since the data row length code signal DL and the error code signal ERR are arranged adjacent to each other, a time point $T_1$ when an intensity of the mask signal is raised up to a high level and a time point $T_2$ when an intensity of the mask signal is reduced to a low level are required at one time only.

Figure 37:
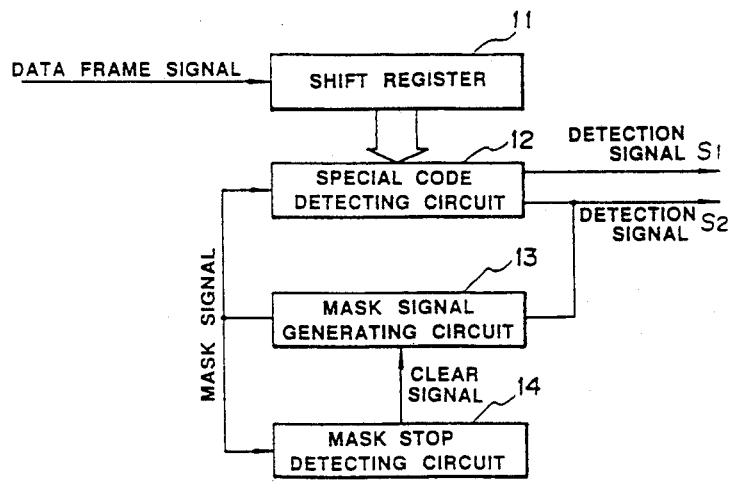
FIG. 37 is a block diagram which illustrates a plurality of circuits required for a mask signal for the apparatus in accordance with the embodiment shown in FIG. 30.

FIG. 37 is a block diagram which illustrates a plurality of circuits relating to the mask signal. The data frame signal shown in FIG. 34(a) is first inputted into a shift register 11. The sift register 11 is such that the data frame signal is inputted thereinto from the first bit of the data frame signal to store a bit row having a predetermined bit row length, and after the bit row having the predetermined bit row length is stored in the shift register 11, the data frame signal is cleared from the first bit thereof as the next data frame signal is inputted from the first bit thereof. A predetermined bit row length by which a bit row can be stored in the shift register 11 is required to be larger than a bit row length of each of the start code signal ST and the stop code signal SP. That is to say, the shift register 11 has a capacity of allowing the start code signal ST and the stop, code signal SP to be stored therein.

A special code detecting circuit 12 includes a first pattern corresponding to the start code signal ST and a second signal pattern corresponding to the stop code signal SP so that a signal pattern indicative of the bit row in the shift register 11 is compared with the first signal pattern and the second signal pattern. When the signal pattern representing the bit row in the shift register 11 becomes equal to the first signal pattern, a detection signal $S_1$ indicating that the start code signal ST has been detected is outputted from the special code detecting circuit 12 When the signal pattern representing the bit row in the shift register 11 becomes equal to the second pattern, a detection signal $S_2$ indicating that the stop code signal Sp has been detected is outputted from the special code detecting circuit 12. Consequently, the detection signal $S_1$ of the start code signal ST is outputted from the special code detecting circuit 12 at the time point T' (shown in FIG. 34(b)) when shifting of the start code ST to the shift register 11 is completed, and the detection signal $S_2$ of the stop code signal SP is outputted from the special code detecting circuit 12 at the time point $T_1$ (shown in FIG. 34(b)) when shifting of the stop code signal SP to the shift register 11 is completed. The data signal DATA communicated between the start code signal St and, the stop code signal SP is read in a circuit (not shown) in response to these signals $S_1$ and $S_2$.

On the other hand, the detection signal $S_2$ of the stop code signal SP is added to a mask signal generating circuit 13. When the detection signal $S_2$ is inputted into the mask signal generating circuit 13, an intensity of the mask signal shown in FIG. 34(b) is raised up to a high level from the time point $T_1$. The mask signal is added to the special code detecting circuit 12 and a mask stop detecting circuit 14.

When an intensity of the mask signal is raised up to a high level at the time point $T_1$, the mask stop detecting signal 14 measures a time range from the time point $T_1$ to the time point $T_2$ shown in FIG. 34(b). Namely, the mask stop detecting signal 14 measures a known bit row length from the first bit of the data row length code signal DL to the final bit of the error code signal ERR so that a clear signal is added to the mask signal generating circuit 13 at the time point $T_2$ when the aforementioned measurement is completed. When this clear signal is inputted into the mask signal generating circuit 13, an intensity of the mask signal is reduced to a low level from the high level. Accordingly, an intensity of the mask signal is raised up to a high level within a time range from the $T_1$ when the data row length code signal DL is received, till the time point $T_2$ when the error code signal ERR is received.

The special code detecting circuit 12 interrupts comparison of the the signal pattern in the sift register 11 with the first signal pattern and the second signal pattern within the time range from the time point $T_1$ to the time point $T_2$ in which an intensity of the mask signal is raised up to a high level. Thus, the detection signal $S_1$ and the detection signal $S_2$ are not outputted from the special code detecting circuit 12, even though the signal pattern of the data row length code signal DL and the signal pattern of the error code ERR become equal to the first signal pattern or the second signal pattern. Consequently, there does not arise such an error that the data signal DATA is incorrectly read when the signal pattern of the data row length code signal DL and the signal pattern of the error code signal ERR become equal to the signal pattern of the start code signal ST or the signal code of the stop code signal SP.

According to such embodiment, the data row length code signal DL and the error code signal ERR are concealed so as to read the data signal DATA without mistake. Since the data row length code signal DL and the error code signal ERR are arranged adjacent to each other, it suffices that the start time point $T_1$ when an intensity of the mask signal is raised up to a high level and the end time point $T_2$ when an intensity of the mask signal is reduced to a low level are detected at one time only with the result that circuits required for the node structure can be designed and constructed simply.

Figure 38A:
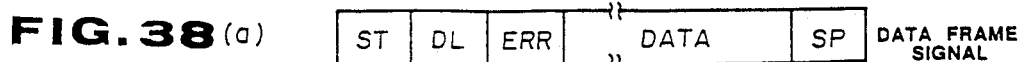
FIGS. 38(a) and. 38(b) show timing charts which illustrate a relationship of a data frame signal to a mask signal for the apparatus in accordance with a modified embodiment of the present invention.
Figure 38B:
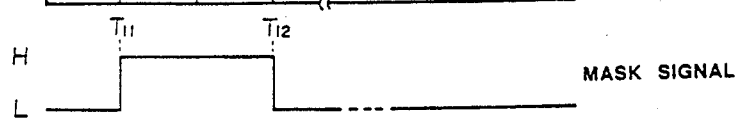

It should be noted that the present invention should not be limited only to the node structure that the data row length code signal DL and the error code signal ERR are arranged just behind the stop code signal SP. Alternatively, as shown in FIG. 38(a), the data row length code signal DL and the error code signal ERR may be inserted just after a start code ST in the data frame signal. In this case, as shown in FIG. 38(b), an intensity of the mask signal is raised up to a high level at time point $T_{11}$ when the start code signal St is ended. Thereafter, an intensity of the mask signal is reduced to a low level at a time point $T_{12}$ when counting of a data bit length of the data row length code signal DL and the error code signal ERR is completed so that the data row length signal DL and the error code signal ERR are concealed in response to the mask signal.

Figure 39A:
FIGS. 39(a) and 39(b) show timing charts which illustrate a relationship of a data frame signal to a mask signal for the apparatus in accordance with other modified embodiment of the present invention.
Figure 39B:
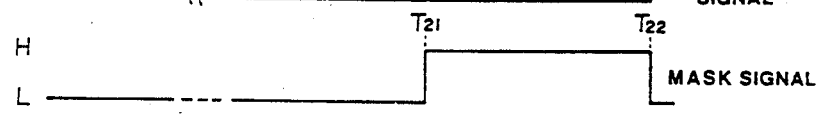

The present invention has been exemplified above as to a case where the data row length code signal DL and the error code signal ERR are used as signals to be concealed in response to the mask signal. However, the present invention should not be limited only to this. Alternatively, a code error check signal CRC may be added to the data frame signal so as to execute a circular redundancy check with respect to the data frame signal. In this case, as shown in FIG. 39(a), the data row length signal DL, the error code signal ERR and the code error check code signal CRC are arranged one after another in the shown order. Further, as shown in FIG. 39(b), an intensity of the mask signal is raised up to a high level within a time region from a time point $T_{21}$ to a time region $T_{22}$ thereby to conceal the data row length code signal DL, the error code signal ERR and the code error check code signal CRC in response to the mask signal. With this signal structure, kinds of signals to be concealed in response to the mask signal increases. However, since these signal are arranged one after another in that way, there is no fear that circuits required for forming the mask signal becomes complicated in structure.

A circular redundancy check code (hereinafter referred to as a CRC code) in the data frame signal is provided on the signal sending side just before its sending and it is used on the signal receiving side to detect any communication error. However, though an error code is caused with the data frame DATA for some reason when the data content of the data frame DATA is rewritten on the signal receiving side, the CRC code is formed later based on the bit row including an error code so that a data frame signal including the CRC check code, is communicated between the signal sending side and the signal receiving side. In this case, the signal receiving side which has received the data frame signal can not detect an error code in the data frame DATA irrespective of how far it carries out circular redundancy check.

In this manner, even through a communication error in the data frame signal sent from the signal sending side to the signal receiving side can be detected based on the CRC code, the signal receiving side can not detect an error code which may be caused, e.g., at the time when the data content of the data frame signal is rewritten on the signal receiving side before the CRC code is formed on the signal sending side.

In view of the foregoing problem, the node structure in accordance with another embodiment of the present invention which will be described hereinbelow includes converting means for converting at least a part of serial data communicated between the signal sending side and the signal receiving side into a biphase code, extracting means for successively extracting the biphase code corresponding to each one bit of at least a part of the serial data and a logic circuit for deriving an exclusive logical sum with respect to each value of the biphase code extracted by the extracting means so that an error in at least a part of the serial data is detected based on the exclusive logical sum derived by the logic circuit.

According to this embodiment, at least a part of the serial data is converted into a biphase code which in turn is communicated from the signal sending side to the signal receiving side. Then, when an error in at least a part of the serial data is detected, a biphase code corresponding to each one bit of the serial data is successively extracted so that the error in the serial data is detected based on an exclusive logical sum of each value of the extracted biphase codes.

Figure 40:
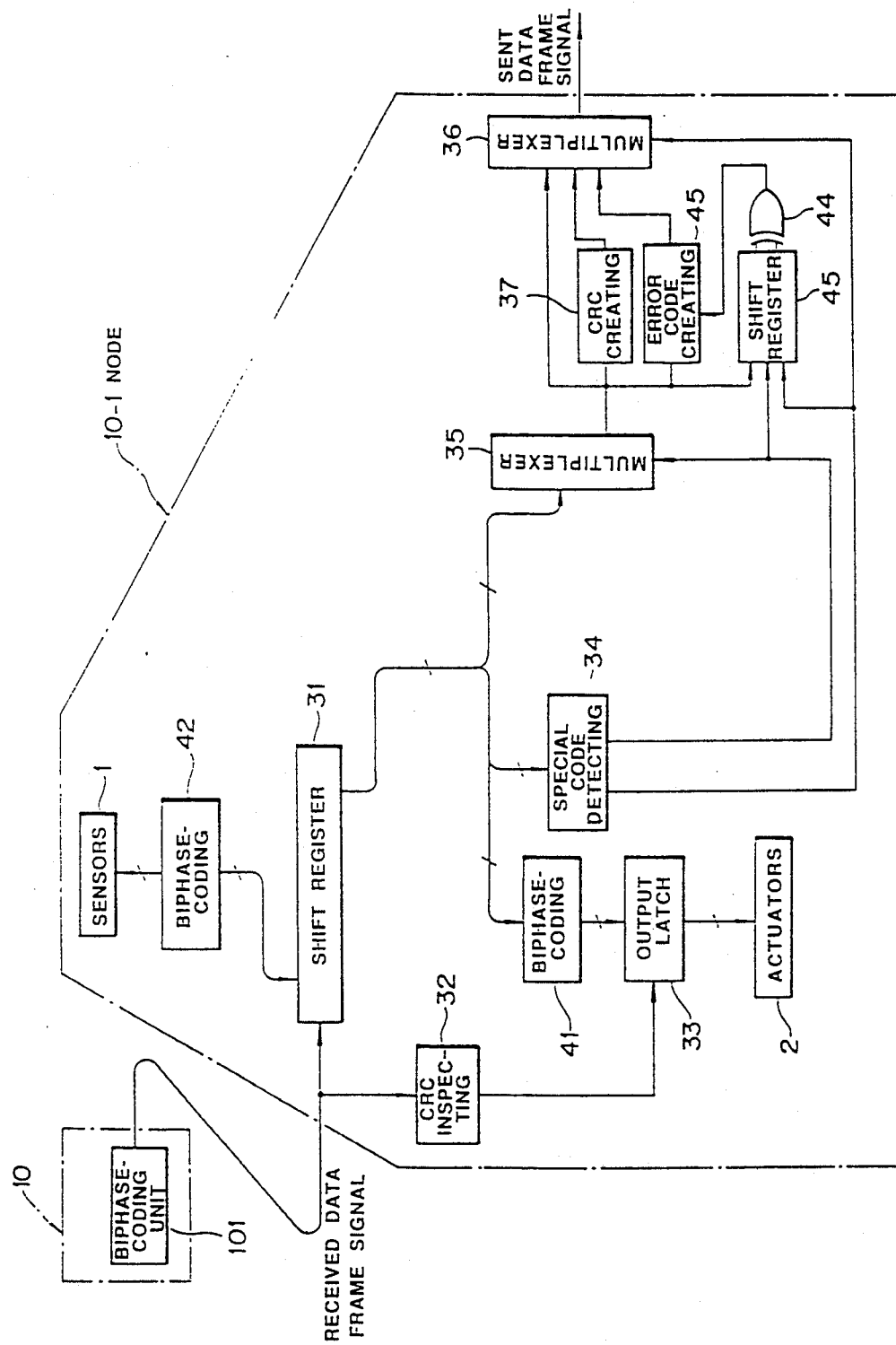
FIG. 40 is a block diagram which schematically illustrates by way of example the structure of a node in accordance with another embodiment of the present invention.

FIG. 40 is a block diagram which schematically illustrates the structure of a node in accordance with the foregoing embodiment.

Referring to FIG. 40, the main controller 100 includes a biphase coding unit 101. As shown in FIG. 41(a), the biphase coding unit 101 converts only a data frame DATA in the data frame signal into a biphase code to send the data frame signal including the data frame DATA identified by the biphase code.

For example, as shown in FIG. 42, the biphase code represents a binary value identified by one bit of the original data, in the form of a signal including two bits. In this case, a value 1 identified by one bit of the original data is represented by a biphase code including two bits which varies from the value 1 to a value 0 and moreover a value 0 identified by one bit of the original data is represented by a biphase code including two bits which varies from the value 0 to a value 1. Therefore, two bits in the biphase code corresponding to one bit in the original data comprise a combination of the value 1 and the value 0 and thereby an exclusive logical sum of these values results in a value 1 without fails.

The data frame signal including the data frame data DATA identified by the biphase code is sent from the main controller 100 so that it is added to each of a shift register circuit 31 and a circular redundancy check inspecting circuit (hereinafter referred to as a CRC inspecting circuit) 32. The CRC inspecting circuit 32 carries out circular redundancy check based on the CRC code in the data frame signal shown in FIG. 41(a), and if it is found as a result derived from the circular redundancy check that no error is present in the data frame DATA, the main controller 100 adds to an output latch circuit 33 the signal which indicates that any error is not present therein.

On the other hand, the data frame signal is successively inputted into the shift register circuit 31, from its start code ST (as shown in FIG.41(a)) so that it is successively stored therein. At this moment, a biphase coding circuit 41 extracts each output data to be given to the group of actuators 2, from the rearmost end of the data frame DATA stored in the shift register circuit 31. These output data are represented in the form of a biphase code including two bits for each value 1 and value 2 to be given to each actuator among the group of actuators 2. The respective output data each having a biphase code are successively coded in the biphase coding circuit 41 to form an output data bit which indicates a value 1 and a value 0 to be given to each actuator for each one bit. The output data bit is once latched in the output latch circuit 33. Thereafter, the output latch circuit 33 responds to a signal from the CRC inspecting circuit 32 which indicates that any error is not present in the data frame DATA and then the signal is delivered to each actuator via the output latch circuit 33. These actuators respond to the output data bit so that they are actuated in response to it.

An input data bit is sent from each sensor in the group of sensors 1 by one bit to indicate a value 1 and a value 0 for each bit. The respective input data bit is inputted into the biphase coding circuit 42 which in turn codes it in the form of a biphase code for each one bit to form input data indicating a value 1 and a value 0, for each two bits. The respective biphase-coded input data are inputted into the shift register circuit 31 in which they are inserted into the data frame DATA from the location just behind the start code ST in the data frame signal.

Consequently, the data content of the data frame DATA stored in the shift register circuit 31 is rewritten as it is held in the form of a biphase code.

Next, a special code detecting circuit 34 detects a start code ST and a stop code SP of the data frame signal stored in the shift register circuit 31. First, when the special code detecting circuit 34 detects the start code ST, a shift signal is added to a first multiplexer 35 and a shift register circuit 43 in a predetermined timing relationship. When the special code detecting circuit 34 detects the stop code SP later, a shift signal is added to a second multiplexer 36 and the shift register circuit 43 in a predetermined timing relationship. When the shift signal from the special code detecting circuit 34 corresponding to the start code ST is inputted into the first multiplexer 35, an input from the shift register circuit 31 in parallel with the input from the special code detecting circuit 43 is converted into serial inputs which in turn are outputted in the form of a serial data frame signal, i.e., a data frame signal including a start code ST, a date frame DATA, a stop code ST and a CRC code CRC to be sent from the first multiplexer 35 in the shown order.

When the data frame signal from the first multiplexer 35 is inputted into a CRC generating circuit 37, a new CRC code is generated in response to the, data frame DATA in the data frame signal so that the new CRC code is added to the second multiplexer 36.

The data frame signal from the first multiplexer 35 is successively inputted and stored in the shift register circuit 34 for a period of time from the time when a shift signal from the special code detecting circuit 34 corresponding to the start code ST is inputted thereinto till the time when a shift signal from the same corresponding to the stop code is inputted thereinto. This causes all code items from the start code ST to the stop code SP in the data frame signal to be once accumulated in the shift register circuit 43. Then, the data frame DATA exclusive the start code ST and the stop code SP each having a known bit row length is extracted from the shift register circuit 43 and then the data frame DATA is added in the form of a biphase code including two bits to an exclusive logic summing circuit 44 from the head portion of the data frame DATA. Further, the thus biphase-coded data frame DATA is successively added to the exclusive logic summing circuit 44 by two bits. The exclusive logic summing circuit 44 derives an exclusive logic sum of the respective values represented by two bits every time when the biphase-coded data frame DATA is inputted into the exclusive logic summing circuit 44 by two bits. Then, a signal indicating this exclusive logic sum is added to an error code generating circuit 45. It should be noted that the biphase code represents the original values 1 and 2 using two bits each comprising a combination of value 1 and value 0. Accordingly, the exclusive logic summing circuit 44 outputs a signal indicative of a value 1 every time when the biphase code is inputted thereinto by two bits if it is found that any error is not present in the biphase code. In case where it is found that an error is present in the biphase code and both of two bits of the biphase code to be added to the exclusive logic summing circuit 44 indicate either a value 1 or a value 0, the exclusive logic summing circuit 44 adds a signal indicative of a value 0 to the error code generating circuit 45.

The data frame signal from the first multiplexer 35 is inputted into the error code generating circuit 45 in the same manner as the shift register circuit 43, and as the data frame signal is inputted thereinto in that way, it detects a signal sent from the shift register circuit 43 via the exclusive logic summing circuit 44. If the error code generating circuit 45 indicates a value 0 in response to the data frame signal, i.e., in case where it is found that an error is present in the biphase-coded data frame DATA, the error code generating circuit 45 forms an error code ER including an error information which indicates that an error is caused in the data frame signal, and a count information which indicates a counted value 0. Then, the error code ER is added to the second multiplexer 36. If the signal sent from the shift register circuit 43 via the exclusive logic summing circuit 44 indices a value 1, i.e., in case where it is found that any error is not present in the biphase-coded data frame DATA, the error code generating circuit 45 does not form any error code, whereby no error code is added to the second multiplexer 36.

Next, the second multiplexer 36 delivers the data frame signal from the first multiplexer 35 to the stop code SP before a shift signal corresponding to the stop code from the special code detecting circuit 34 is inputted into the second multiplexer 36. When the shift signal is inputted into the second multiplexer 36, the second multiplexer 36 selects the CRC generating circuit 37 to deliver a new CRC code from the CRC generating circuit 37. Then, after the second multiplexer 36 delivers the CRC code having a known bit row length, it selects the error generating circuit 45. If it is found that any error is not present in the data frame DATA of the data frame signal delivered from the first multiplexer 35, the data frame signal delivered from the second multiplexer 36 comprises a start code ST, a data frame DATA, a start code ST and a new CRC code CRC, as shown in FIG. 41(a). If it is found that an error is present in the data frame DATA of the data frame signal delivered from the first multiplexer 35, the data frame signal delivered from the second multiplexer 36 is added with an error code ER, as shown in FIG. 41(b).

Consequently, a node 10-2 situated behind the node 10-1 receives the data frame signal as shown in FIG. 41(a) or the data frame signal as shown in FIG. 41(b). In the case where the data frame signal shown in FIG. 41(a) is received in the node 10-2 at the subsequent state, the node 10-2 performs a data processing and a CRC code processing in the same manner as at the node 10-1 at the preceding state and detects an error caused during the data processing, based on the exclusive logic sum provided by two bits with respect to the biphase-coded data frame DATA. When the error is detected at the node 10-2, the node 10-2 creates an error code.

In the case where the data frame signal shown in FIG. 41(b) is received at the node 10-2, the node 10-2 performs a data processing and a CRC code processing in the same manner as at the node 10-1 at the preceding state and detects an error code ER included in the data frame signal, in the error code generating circuit 45. Then, the error code generating circuit 45 advances by one count unit the counted value 0 indicated with the count information of the error code ER thereby to create a count information indicative of the counted value 1, whereby the error code ER including the count information is delivered to the second multiplexer 36. Thus, the data frame signal sent from the node 10-2 has a structure as shown in FIG. 41(b) and indicates the count value 1 based on the count information of the error code ER.

Thereafter, other node 10-3 to 10-n situated behind the node 10-2 performs the same processing as those at the node 10-2. For example, when it is assumed that the error code ER including a count information indicative of a counted value 1 is outputted from the first node 10-1, the counted value of the count information is advanced by one count unit at the respective nodes 10-2 to 10-n to behind the node 10-1, whereby the counted value indicated with the count information sent from the last node 10-n to the main controller 100 becomes n-1. In this case, the main controller 100 can determine that an error is caused at the first node 10-1 during data processing, based on the counted value n-1 indicated with the count information of the error code ER received from the last node 10-n.

In this manner, at each node, the main controller 100 not only carries out circular redundancy check with respect to the data frame DATA included in the data frame signal but also successively derives an exclusive logic sum of the respective values by every two bits from the head portion of the biphase-coded data frame DATA thereby to detect a code error on the data frame DATA based on the exclusive logic sum. Therefore, the main controller 100 can detect not only a communication error but also an error caused during data processing. In the case where the main controller 100 detects an error caused during data processing at a certain node, an error code ER indicative of the error information and the count information is sent from this node so that the counted value indicated with the count information of the error code ER at each node situated at the later stage is advanced by one count unit. Consequently, the main controller 110 can determine on the basis of the counted value at what node an error is caused during data processing.

Figure 43:
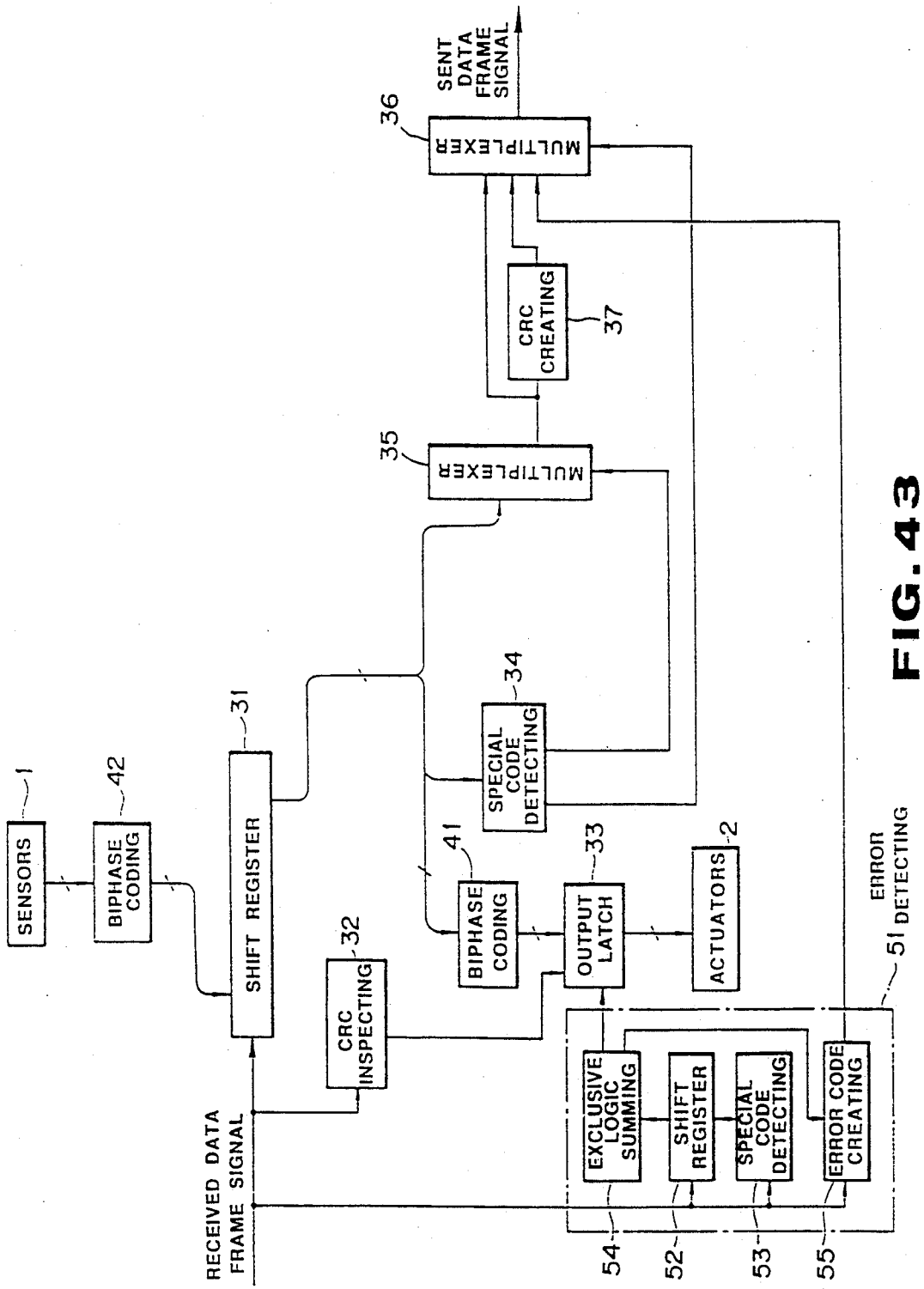
FIG. 43 is a block diagram which schematically illustrates by way of example the structure of a node for the apparatus in accordance with another embodiment of the present invention.

FIG. 43 is a block diagram which schematically illustrate the structure of a node in accordance with another embodiment of the present invention for which an error detecting method of the present invention is employed. According to this embodiment, the node is modified from the node shown in FIG. 40 such that the shift register circuit 43, the exclusive logic summing circuit 44 and the error code generation circuit 45 are removed but an error detecting circuit 51 is provided additionally.

Referring to FIG. 43, data frame signals from the main controller or the node at the preceding stage are inputted into a shift register section 52, a special code detecting section 53 and an error code generating section 55 each of which is included in the error detecting circuit 51. In detail, the special code detecting section 53 is intended to detect a start code ST and a stop code SP included in each data frame signal. When the special code detecting section 53 detects the start code ST, the detected signal corresponding to the start code ST is added to the shift register section 52 and thereafter when the special code detecting section 53 detects the stop code SP, the detected signal corresponding to the stop code SP is added to the shift register section 52. The shift register section 52 is such that the data frame signal is successively accumulated therein from the start code ST and a biphase-coded data frame DATA is extracted therefrom based on a known bit row length of each of the start code ST and the stop code SP at the time point when the respective detected signals from the special code detecting section 53 are inputted thereinto so that the data frame DATA is added to an exclusive logic summing section 42 by every two bits in the error detecting circuit 51 from the head portion thereof. As the data frame DATA is successively inputted into the exclusive logic summing section 54 by every two bits, the exclusive logic summing section 52 successively derives an exclusive logic sum having two values indicated by two bits. When it is found that all the logic sums reveal a value 1, i.e., any code error is not present in the data frame DATA, a signal indicating the foregoing fact is added, to the output latch circuit 33. Only when both the foregoing signal and a signal from the CRC inspecting circuit 32 indicating the absence of any error are inputted into the output latch circuit 33, the respective output data bits are delivered to the group of actuators 2 from the shift register circuit 31 via a biphase-coding circuit 41. Thus, only in the case where any code error is not detected by an error detecting circuit 51 and any error is not detected by the CRC inspecting circuit 32, the respective output data bits latched in the output latch circuit 33 are delivered to the group of actuators 2.

If it is found that any one of the logic sums derived by the exclusive logic summing section 54 in the error detecting circuit 51 indicates a value 0, i.e., an code error is present in the data frame DATA, the exclusive logic summing section 54 adds a signal indicative of the foregoing fact to an error code generating section 52 in the error detecting circuit 51. When the error code generating section 55 has this signal inputted thereinto, it generates an error code ER including an error information indicating that an error is caused in the data frame signal as well as a count information indicative of a counted value 0, and the thus generated error code ER is then added to the second multiplexer 36. In this case, a data frame signal having the structure as shown in FIG. 41(b) is delivered from the second multiplexer 36.

Since the error code generating section 55 has data frame signals inputted thereinto, it detects from the data frame signals an error code ER generated in the node at the preceding stage. When the error code generating section 55 detects the error code generated in the node at the preceding stage, it does not generate an error code relative to the relevant node, in spite of the fact that a signal from the exclusive logic summing section 54 indicating that an error is present is inputted thereinto, but it advances by one count unit the counted value indicated with the count information from the node at the preceding state concerning the error code ER and then the error code ER is added to the second multiplexer 36.

In case where a code error relative to the data frame signal received in the above-described manner is detected by the error detecting circuit 51 prior to data processing, provided that an error is caused in the node 10-1, e.g., as shown in FIG. 1, this error is detected by the error detecting circuit 51 in the node 10-2 at the subsequent stage so that the data frame signal having the error code ER added thereto is sent from the node 10-2. Since the counted value indicated with the count information on the error code ER indicates a value 0 at the node 10-2 and it is successively advanced by one count unit at the nodes 10-3 to 10-$n$, the main controller 100 displays a value n-2. Therefore, the main controller 100 determines that an error is caused at the first node 10-1, if it displays the counted value n-2 based on the count information concerning the error code ER. In addition, since a code error in the received data frame signal is detected by the error detecting circuit 51 prior to data processing, the main controller 100 can simultaneously detects not only errors caused during data processing in the node at the preceding stage but also errors caused during communication of the data frame signals from the node at the preceding stage to the relevant node. Consequently, the controller 100 can doubly detect communication errors in connection with the aforementioned circular redundancy check with the result that any communication error can be checked more strictly.

The above two embodiments have been described as to a case where only data frames DATA included in data frame signals are communicated using a biphase code. However, the present invention should not be limited only to this. Alternatively, start codes ST, stop codes SP, CRC codes CRC and error code ER may be communicated along with data frames DATA using the biphase code. In this case, any error code can be detected with respect to the data frame signals from the first to the end thereof based on an exclusive logic sum of each value represented by two, bits, by successively deriving the exclusive logic sum.

INDUSTRIAL APPLICABILITY

As described above, according to the present invention, a data row length abnormality can be detected reliably, whereby an occurrence of malfunction such as incorrect operation or reckless running of an equipment or installation can be prevented without fail. In case where the node structure is constructed such that a data row length code is arranged adjacent to other signals adapted to be concealed by a mask signal, a start time point when an intensity of the mask signal is raised up to a high level and an end time point when an intensity of the mask signal is reduced to low level are required at one time only and thereby circuits required for generating the mask signal can be simplified in structure. In addition, in case where the node structure is constructed such that at least a part of data is converted into a biphase code for the purpose of communication, any error included in the data can easily be detected by successively extracting the biphase code corresponding to at least one bit and deriving an exclusive logic sum of each value representing the biphase code. Accordingly, it can be concluded that an apparatus for carrying out serial control and a method of controlling the apparatus in accordance with the present invention are preferably employable for a centralized control system for various machinery such as press, machine tool, construction machine, ship, aircraft or the like machine as well as a centralized control system for unmanned warehouse or the like installation.

What is claimed is:

1. An apparatus for carrying out serial control, said apparatus including a plurality of nodes which are connected in series one after another, each of said nodes having one or plural terminals connected thereto, each node being such that a signal from the terminals connected to own node is added to data included in a signal from the node at the preceding stage and a signal to the terminals connected to said own node is then removed from said data thereby to send a resultant signal to the node at the subsequent stage, wherein said signal from the node at the preceding stage includes data row length data representing a row length of data included in said signal, and said each node includes;

counting means for counting a data row length of data included in the signal from the node at the preceding stage, comparing means for comparing a counted value counted by said counting means with said data row length data, said comparing means generating an error signal when it is found that said counted value counted by said counting means does not coincide with a data row length represented by said data row length data, and data row length data converting means for converting the data row length data included, in the signal from the node at the preceding node into data row length data corresponding to a data row length of data outputted from own node, said data row length data converting means being such that the thus converted data row length data are delivered to the node at the subsequent stage while they are included in a signal to be sent to the node at the subsequent stage.

2. An apparatus for carrying out serial control as claimed in claim 1, wherein said signal from the node at the preceding stage includes a serial signal comprising a start code, data row length data representative of a row length of data delivered from the node at the preceding stage, data delivered from the node at the preceding stage and a stop code which are arranged one after another in this order.

3. An apparatus for carrying out serial control as claimed in claim 2, wherein said comparing means includes;
a data row length setting circuit for setting a data low length by reading the data row length data included in the signal from the node at the preceding stage in response to detection of said start code and
a comparing circuit for comparing the data row length set in said data row length setting circuit with an output from said counting means.

4. An apparatus for carrying out serial control as claimed in claim 2, wherein the respective data in the data region delivered from the node at the preceding stage are coded in the form of plural bits so as to allow a start code to be easily distinguished from a stop code and vice versa.

5. An apparatus for carrying out serial control as claimed in claim 2, wherein the respective data in the data region delivered from the node at the preceding stage have "0" inserted therein per a predetermined number of bits so as to allow a start code to be distinguished from a stop code and vice versa.

6. An apparatus for carrying out serial control as claimed in claim 1, wherein the signal from the node at the preceding state includes a data region and data to be delivered to the terminals connected to own node, at the fore end or the rear end of said data region, and
each node removes said data to be delivered to the terminals connected to own node, from the fore end or the rear end of said data region.

7. An apparatus for carrying out serial control as claimed in claim 1, wherein the signal from the node at the preceding stage includes a data region and data to be delivered to the terminals connected to own node, at the fore end or the rear end of said data region, and
each node adds data from the terminals connected to own node, to the fore end or the rear end of said data region and removes said data to be delivered to the terminals connected to own node, from the fore end or the rear end of said data region.

8. An apparatus for carrying out serial control as claimed in claim 1, wherein said data row length data converting means includes adding/subtracting means for adding a data row length of the data added at own node to the data row length represented by the data row length data included in the signal from the node at the preceding state or subtracting a data row length of the data removed at said own node from the data row length represented by the data row length data included in the signal from the node at the preceding stage thereby to deliver the resultant data row length to the node at the subsequent node.

9. An apparatus for carrying out serial control as claimed in claim 1, wherein the signal from the node at the preceding stage includes a data region and each node adds data from the terminals connected to own node to the fore end or the rear end of said data region.

10. An apparatus for carrying out serial control as in claim 1 further including error code adding means for adding an error code indicative of generation of an error signal to a signal to be delivered to the node at the subsequent stage when said error code is generated from said comparing means, said error code being delivered to the node at the subsequent stage.

11. An apparatus for carrying out serial control as claimed in claim 1 further including inhibiting means for inhibiting an error signal from being delivered to the terminals connected to own node when said error signal is generated from said comparing means.

12. An apparatus for carrying out serial control as claimed in claim 1, wherein the signal from the node at the preceding stage includes a serial signal comprising a start code, data row length data representative of a data row length of data delivered from the node at the preceding stage, data delivered from the node at the preceding stage, a stop code, an error check code for detecting any error in said data delivered from the node at the preceding stage and an error code which are arranged one after another in this order in case where said error code is delivered from the preceding stage.

13. An apparatus for carrying out serial control as claimed in claim 12 further including error check code inspecting means for detecting a data error in the data delivered from the node at the preceding stage by detecting and an error check code delivered from the node at the preceding node, said error check code inspecting means generating an error signal when it is found that a data error is present.

14. An apparatus for carrying out serial control as claimed in claim 13 further including error code adding means for adding an error code to the signal to be sent to the node at the subsequent stage in case where an error signal is generated from said comparing means, in case where an error signal is generated from said error check code inspecting means or in case where said error code is generated from the node at the preceding stage.

15. An apparatus for carrying out serial control as claimed in claim 1, wherein the plural nodes are connected one after another in a closed-loop configuration with a main controller included therein.

16. An apparatus for carrying out serial control as claimed in claim 1, wherein the plural nodes are connected one after another in an opened-loop configuration with a main controller included therein.

17. An apparatus for carrying out serial control as claimed in claim 1, wherein the terminals comprise a sensor(s) or an actuator(s), respectively.

18. An apparatus for carrying out serial control as claimed in claim 1, wherein the signal from the node at the preceding stage includes a serial signal comprising an input data start code, data row length data, an input data, an output data and a stop data which are arranged one after another in this order, said input data corresponding to data inputted from the terminals, said output data corresponding to data outputted from the terminals and said data row length data corresponding to a data row length representing a sum of a data row length of the input data and a data row length data of the output data.

19. An apparatus for carrying out serial control as claimed in claim 18, wherein said data row length data converting means includes adding/subtracting means for adding a data row length of data added to the input data at own node, to the data row length represented by the data row length data included in the signal from the node at the preceding stage and then subtracting a data row length of data removed from the output data at said own node, from the data row length represented by the data row length data included in the signal from the node at the preceding stage thereby to create a data row length to be delivered to the node at the subsequent stage.

20. An apparatus for carrying out serial control as claimed in claim 1, wherein the signal from the node at the preceding stage includes an input start code, input data, an output data start code, data row length data, output data and a stop code which are arranged one after another in this order, said input data corresponding to data inputted from the terminals, said output data corresponding to data outputted to the terminals and said data row length data corresponding to a data row length of said output data.

21. An apparatus for carrying out serial control as claimed in claim 1, wherein the signal from the node at the preceding node includes an input data start code, input data-data row length data, input data, an output data start code, output data-data row length data, output data and a stop code which are arranged one after another in this order, said input data corresponding to data inputted from the terminals, said output data corresponding to data outputted from the terminals, said input data-data row length data corresponding to a data row length of said input data and said output data-data row length data corresponding to a data row length of said output data.

22. An apparatus for carrying out serial control as claimed in claim 21, wherein said comparing means includes;
- a first data row length setting circuit for setting an input data-data row length data by reading the input data-data row length data included in the signal from the node at the preceding stage in response to detection of the input data start code,
- a second data row length setting circuit by reading the output data-data row length data included in the signal from the node at the preceding stage in response to detection of the output data start code,
- a first comparing circuit for comparing the input data-data row length set by said first data row length setting circuit with the counted value counted by said first counting means and
- a second comparing circuit for comparing the data row length set by said second data row length setting circuit, with the counted value counted by said second counting means.

23. An apparatus for carrying out serial control, said apparatus including a plurality of nodes which are connected in series one after another, said nodes being connected to a main controller, each of said nodes having one or plural terminals connected thereto, each node being such that a signal from the terminals connected to own node is added to data included in a signal from the node at the preceding stage and a signal to the terminals connected to said own node is then removed from said data thereby to send a resultant signal to the node at the subsequent stage, wherein said apparatus includes;
distributing means for distributing data row length data corresponding to a data row length outputted from each node, to each node from said main controller,
counting means disposed at each node for counting a data row length included in a signal from the node at the preceding stage and
comparing means for comparing an output from said counting means with the data row length data distributed by said distributing means, said comparing means generating an error signal when it is found that said counted value counted by said counting means does not coincide with a data row length represented by said data row length data.

24. An apparatus for carrying out serial control as claimed in claim 23, wherein said distributing means includes signal sending means for sending a signal to each node as a sub-frame, said signal including a serial signal comprising a sub-frame start code, data row length data representative of a data row length outputted from each node and a sub-frame stop code which are arranged one after another in this order, and
said signal from each node includes a main frame comprising a main frame comprising a start code, data and a stop code which are arranged one after another in this order.

25. An apparatus for carrying out serial control as claimed as in claim 24, wherein said sub-frame signal sent from the node at the preceding stage includes data row length data corresponding to own node at the fore end of a data row length data region, and said distributing means including;
- a data row length setting circuit disposed at each node to set a data row length by reading data row length data at the fore end of the data row length data region in response to detection of the start code in the sub frame and
- a data row length data processing circuit disposed at each node to remove data row length data at the fore end of the data row length data in the sub-frame and then deliver the resultant data row length data to the node at the subsequent stage.

26. An apparatus for carrying out serial control as claimed in claim 24, wherein said distributing means includes;
detecting means disposed at each node to detect a data row length corresponding to own node from a data row length data region in the sub-frame and
data row length setting means disposed at each node to set a data row length by reading data row length data detected by said detecting means.

27. An apparatus for carrying out serial control as claimed in claim 26, wherein said detecting means includes;
- a frame setting circuit for setting a frame number corresponding to own node,
- a frame number counting circuit for counting the number of frames in the sub frame and
- a comparing circuit for detecting as own data row length data a coincidence of the number of frames set by said frame number setting means with the counted value counted by said frame number counting means when it is found that the number of frames set by said, frame number setting means coincides with the counted value counted by said frame number counting means.

28. An apparatus for carrying out serial control as claimed in claim 23, wherein the signal from the node at the preceding stage comprises a main frame including an input data start code, input data, an output data start code, output data and a stop code which are arranged one after another in this order, said input data corresponding to data to be inputted from the terminals and said output data corresponding to data to be outputted to the terminals.

29. An apparatus for carrying out serial control as claimed in claim 28, wherein said distributing means includes;
   sending means for sending to each node a sub-frame including data row length data representative of a sum of a data row length of the input data and a data row length of the output data at each node and
   data row length setting means disposed at each node to set a data row length by reading data row length data corresponding to own node from among the sub-frame.

30. An apparatus for carrying out serial control as claimed in claim 28, wherein said distributing means includes;
   sending means for sending to each node a sub-frame including data row length data representing a data row length of the output data at each node and
   data row length setting means disposed at each node to set a data row length by reading data row length data corresponding to own node from among the sub-frame.

31. An apparatus for carrying out serial control as claimed in claim 28, wherein said distributing means includes;
   sending means for sending to each node a sub-frame including input data-data row length data representative of a data row length of the input data and output data-data row length data representative of a data row length of the output data at each node,
   first data row length setting means disposed at each node to set an input data-data row length by reading the input data-data row length data corresponding to own node from among the sub-frame and
   second data row length setting means disposed at each node to set an output data-data row length by reading the output data-data row length data corresponding to own node from among the sub-frame.

32. An apparatus for carrying out serial control, said apparatus including a plurality of nodes which are arranged in series one after another, each of said nodes having one or plural terminals connected thereto, each node being such that a signal from the terminals connected to own node is added to data included in a signal from the node at the preceding stage and a signal to the terminals connected to said own node is then removed from said data thereby to send the resultant signal to the node at the subsequent stage, wherein
   said signal from the node at the preceding stage includes a start code, data row length data representative of a row length of data included in said signal and a stop code, and said each node includes;
   start code detecting means for detecting said start code,
   stop code detecting means for detecting said stop code, and
   inhibiting means for inhibiting said start code detecting means and said stop code detecting means from performing a detecting operation for a period of time from the time when the start code is detected by said start code detecting means till the time when a data row length indicated by said data row length data is reached.

33. A method of controlling an apparatus for carrying out serial control, said method being adapted to conceal at least a data row length code signal based on a mask signal when a data frame signal including at least a data signal and a data row length code signal representative of a length of said data signal is received, said data signal and said data row length code signal being arranged one after another, wherein
   said data row length code signal is arranged adjacent to other signals adapted to be concealed in response to said mask signal.

34. An apparatus for carrying out serial control, wherein said apparatus includes;
   converting means for converting at least a part of serial data to be communicated into a biphase code,
   extracting means for successively extracting said biphase code corresponding to each one bit representing at least a part of said serial data,
   a logic circuit for deriving an exclusive logic sum of each value of the biphase code extracted by said extracting means, and
   an error in at least a part of said serial data is detected based on said exclusive logic sum derived by said logic circuit.

35. An apparatus for carrying out serial control as claimed in claim 34, wherein said apparatus further includes one or plural relays for relaying said data in the form of a biphase code converted by said converting means,
   each of said relays including at least an extracting circuit and a logic circuit, and wherein said apparatus further includes;
   sending means for sending an information indicative of an error in said data and a count information representative of a predetermined count value based on the exclusive logic sum derived by said extracting means and said logic circuit when said error in said data is detected, said error information and said count information being added to said data and
   advancing means for advancing by one count unit the count value indicated by the count information added to said data when said error is indicated by the error information added to said data, and
   a history of the error relative to said data is indicated by the error information and the count information.

36. An apparatus for carrying out serial control as claimed in claim 35, wherein said relays perform an error detecting operation with respect to said data based on the exclusive logic sum in the form of a biphase code either after said data are processed or before said data are processed.

* * * * *